(12) United States Patent
Kan et al.

(10) Patent No.: US 8,161,138 B2
(45) Date of Patent: Apr. 17, 2012

(54) REPLICATION SYSTEM HAVING THE CAPABILITY TO ACCEPT COMMANDS AT A STANDBY-SYSTEM SITE BEFORE COMPLETION OF UPDATING THEREOF

(75) Inventors: Masaki Kan, Minato-ku (JP); Jun-ichi Yamato, Minato-ku (JP); Yuji Kaneko, Minato-ku (JP)

(73) Assignee: NEC Corporation, Tokyo (JP)

( * ) Notice: Subject to any disclaimer, the term of this patent is extended or adjusted under 35 U.S.C. 154(b) by 32 days.

(21) Appl. No.: 12/687,645

(22) Filed: Jan. 14, 2010

(65) Prior Publication Data

US 2010/0235324 A1 Sep. 16, 2010

Related U.S. Application Data

(62) Division of application No. 11/148,411, filed on Jun. 9, 2005, now abandoned.

(30) Foreign Application Priority Data

Jun. 25, 2004 (JP) .................................. 2004-188414

(51) Int. Cl.
*G06F 15/177* (2006.01)
*G06F 17/00* (2006.01)
(52) U.S. Cl. ........................................ 709/220; 707/626
(58) Field of Classification Search .................. 709/204, 709/220–226, 219; 714/15, 6–10; 705/6, 705/1, 28, 26, 27, 56, 35, 37, 44, 10; 717/121, 717/126, 177, 101; 707/100, 10, 204; 711/121, 711/126, 177, 161, 162
See application file for complete search history.

(56) References Cited

U.S. PATENT DOCUMENTS

| 6,658,540 B1 * | 12/2003 | Sicola et al. .................. 711/162 |
| 6,691,139 B2 * | 2/2004 | Ganesh et al. .......................... 1/1 |
| 7,054,960 B1 * | 5/2006 | Bezbaruah et al. ............. 710/33 |
| 7,076,620 B2 * | 7/2006 | Takeda et al. ................. 711/161 |
| 2003/0217119 A1 * | 11/2003 | Raman et al. ................. 709/219 |

(Continued)

FOREIGN PATENT DOCUMENTS

JP 08-212095 A 8/1996

(Continued)

OTHER PUBLICATIONS

Product software information from EMC² website.

*Primary Examiner* — Joseph Avellino
*Assistant Examiner* — Mark O Afolabi
(74) *Attorney, Agent, or Firm* — Sughrue Mion, PLLC

(57) ABSTRACT

A replication system rapidly switches from a normal-system site to a standby-system site in the event of a problem and reliably maintains functions, and moreover, reduces drops in performance. A first site provides system functions that accompany writing and reading of data. A relay transfer device receives update information from the first site, causes completion of processes for replication in the first site, and continuously executes processes for successively transferring the update information to a second site. The second site receives the update information of the first site and applies this update information to itself to retain a replica of the data of the first site. If, when executing a write request command or a read request command to provide at least a portion of the system functions, the second site has not yet retained the most recent data that are the target of the command, the second site acquires the necessary update information and then executes the command.

4 Claims, 53 Drawing Sheets

U.S. PATENT DOCUMENTS

2005/0015663 A1 * 1/2005 Armangau et al. .......... 714/15

FOREIGN PATENT DOCUMENTS

| | | | |
|---|---|---|---|
| JP | 09-259096 | A | 10/1997 |
| JP | 2000-132343 | A | 5/2000 |
| JP | 2001-067188 | A | 3/2001 |
| JP | 2001-249707 | A | 9/2001 |
| JP | 2003-218911 | A | 7/2003 |
| JP | 2004-086721 | A | 3/2004 |
| WO | 2004/031957 | A1 | 4/2004 |

* cited by examiner

FIG. 42
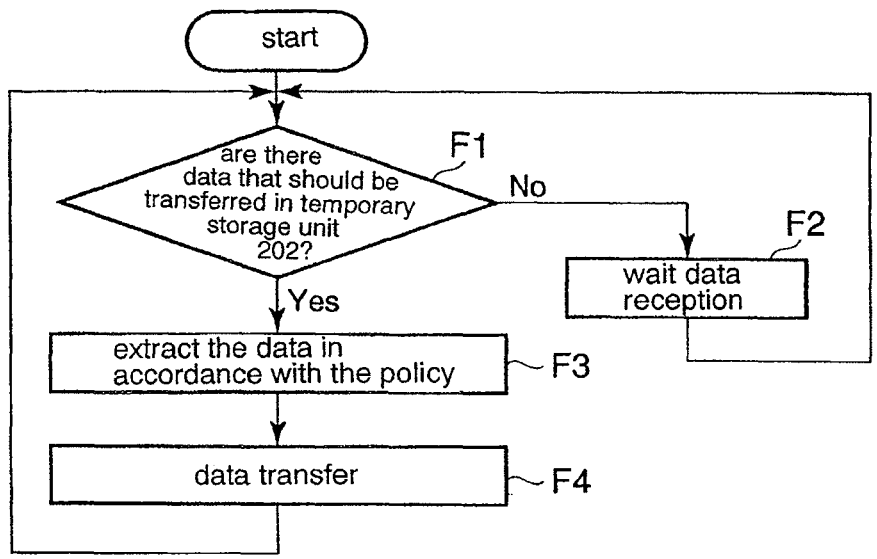
FIG. 43
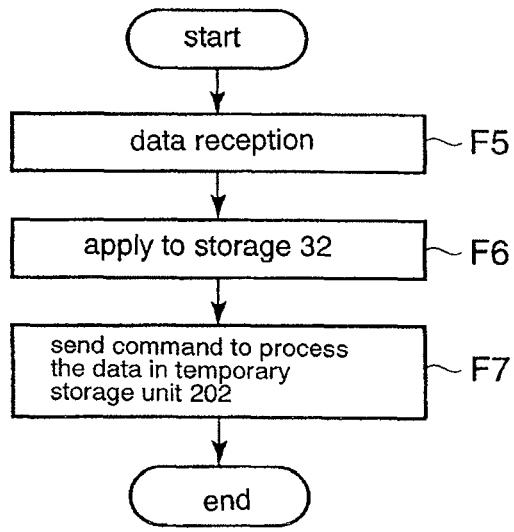
FIG. 44
| data type | transfer priority |
|---|---|
| data 121 | 1 |
| data 122 | 3 |
| data 123 | 2 |

| data type | transfer priority | permissible transfer time | prohibited transfer time |
|---|---|---|---|
| data 121 | 1 | 5 minutes | not set |
| data 122 | 3 | 5 minutes | not set |
| data 123 | 2 | 5 minutes | not set |

| data type | transfer priority | permissible transfer time | prohibited transfer time |
|---|---|---|---|
| data 121 | 1 | 5 minutes | 2004.01.01.00:00 |
| data 122 | 3 | 5 minutes | 2004.01.01.00:00 |
| data 123 | 2 | 5 minutes | 2004.01.01.00:00 |

REPLICATION SYSTEM HAVING THE CAPABILITY TO ACCEPT COMMANDS AT A STANDBY-SYSTEM SITE BEFORE COMPLETION OF UPDATING THEREOF

CROSS REFERENCE TO RELATED APPLICATIONS

This application is a divisional of U.S. patent application Ser. No. 11/148,411, filed Jun. 9, 2005, which claims priority from Japanese Patent Application No. 2004-188414, filed Jun. 25, 2004, the contents of all of which are incorporated herein by reference.

BACKGROUND OF THE INVENTION

1. Field of the Invention

The present invention relates to a replication system for implementing replication between a normal-system site and a standby-system site.

2. Description of the Related Art

Conventionally, computer systems have been used that are provided with a normal-system site (or an operating system site) and a standby-system site for maintaining functions even in the event of a disaster, such computer systems being referred to as "replication systems." For example, the normal-system site normally operates to provide system functions, and the standby-system site operates in place of the normal-system site when the normal-system site is unable to operate normally.

In order to provide the functions of a computer system, the normal-system site and standby-system site each have storage unit for storing data. In a replication system, the data in the storage of the normal-system site are replicated and retained in the storage of the standby-system site such that the standby-system site is able to operate in place of the normal-system site, this process being referred to as "replication."

In order to maintain the functions that were being implemented in the normal-system site when a difficulty occurs in the normal-system site in this type of replication system, the functions that were being carried out in the normal-system site are switched to the standby-system site.

A replication system has been proposed wherein, instead of transmitting data directly from the normal-system site to the standby-system site in the replication process, a relay transfer device is provided between the normal-system site and standby-system site and data are transmitted from the normal-system site to the standby-system site by way of a relay transfer device (refer, for example, to JP-2004-086721-A). The relay transfer device retains data either temporarily or permanently and transfers the data between the normal-system site and standby-system site.

Replication systems that use relay transfer devices include both synchronous systems in which the normal-system site and standby-system site are "synchronized" (hereinbelow referred to as "synchronous replication") and asynchronous systems (hereinbelow referred to as "asynchronous replication").

In synchronous replication, the writing of data to storage in the normal-system site prompts the writing of the same data to the storage of the standby-system site. In asynchronous replication, in contrast, writing to the storage of the standby-system site is not prompted by writing to the normal-system site but is carried out at a later time.

However, the above-described technology has the following problems:

In the event of a problem, it is essential that operations quickly switch from the normal-system site to the standby-system site, and moreover, that the functions of the normal-system site be reliably continued in the standby-system site to reduce any repercussions upon the functions of the computer system.

In the replication system of the prior art, however, synchronous or asynchronous replication from the normal-system site to the standby-system site takes time, and rapid switching was therefore problematic when switching after updating the data of the standby-system site. If switching occurs before completing data update in the standby-system site, data that preceded the update were accessed. Further, in order to guarantee that the most recent data are accessed, when accessing before completion of updating, an inquiry can be submitted to the relay transfer device to ascertain whether the object of the access is data that have been updated. However, such a procedure causes drops in performance such as an increase in the amount of processing and a reduction in throughput.

In addition, when a logical error occurs in the normal-system site, the replication process may cause the logical error to be reproduced in the standby-system site, preventing normal operation despite the switch to the standby-system site.

Finally, data of various levels of importance for the functioning of the computer system are included within retained data, and priority should be given to protecting data having greater importance when a problem occurs. However, data of high importance are in some cases not protected in replication systems of the prior art.

SUMMARY OF THE INVENTION

It is an object of the present invention to provide a replication system that, upon the occurrence of a problem, rapidly switches from a normal-system site to a standby-system site and reliably continues functions, and moreover, that reduces drops in performance. The replication system of the present invention further includes a first site, a second site, and a transfer device.

The first site provides system functions that accompany the writing or reading of data.

The second site receives update information of the first site and retains a replica of data of the first site by applying this update information to itself. The second site is further able to receive a command such as a write request or a read request to provide at least a portion of the functions of the system in place of the first site or as assistance to the first site even when the second site has not yet applied all of the update information of the first site, and when executing the command, if the most recent data that is the object of this command has not yet been retained, acquires the necessary update data and then executes the command.

The transfer device has the functions of receiving the update information from the first site, causing completion of the processing for replication in the first site, and continuously executing processes for successively transferring the update information to the second site.

The above and other objects, features, and advantages of the present invention will become apparent from the following description with reference to the accompanying drawings, which illustrate examples of the present invention.

BRIEF DESCRIPTION OF THE DRAWINGS

FIG. 42 is a flow chart for explaining the operations of the relay transfer device in the replication system of the second embodiment;

FIG. 43 is a flow chart for explaining the operations of the standby-system site in the replication system of the second embodiment;

FIG. 44 shows policy settings in the second embodiment;

DETAILED DESCRIPTION OF THE PREFERRED EMBODIMENTS

First Embodiment

Figure 1:
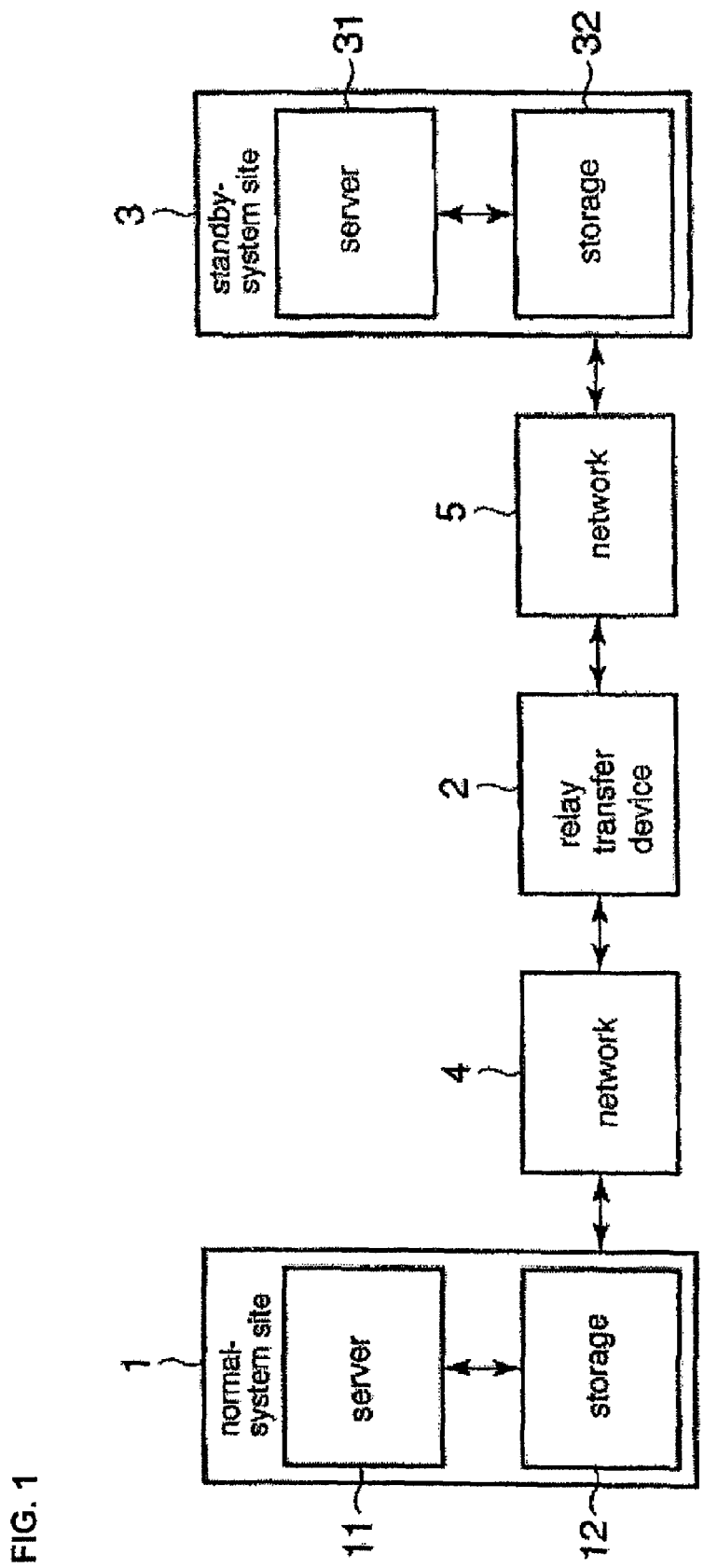
FIG. 1 is a block diagram showing the replication system of the first embodiment of the present invention.

FIG. 1 is a block diagram showing the replication system of the first embodiment of the present invention. The replication system of the first embodiment is a computer system that provides services and that includes normal-system site 1, standby-system site 3, and relay transfer device 2. Normal-system site 1 and relay transfer device 2 are connected by network 4; and standby-system site 3 and relay transfer device 2 are connected by network 5.

Normal-system site 1 is the site that is used during normal operation and includes server 11 and storage unit 12.

Storage 12 is a memory device for storing data. As an example, storage 12 may be a single disk device or a disk array device that is composed of a plurality of disk devices. As another example, storage 12 may be a magneto-optical device or an array device that is a collection of such devices. As yet another example, storage 12 may be a memory device that is realized by a single or a plurality of semiconductor memories.

Server 11 is a computer that causes the operation of an application, a database, and an operating system for realizing services that are used on normal-system site 1 and that uses storage 12 to perform processing.

Standby-system site 3 is a site for replicating and retaining the data of normal-system site 1 and for providing services as necessary. Standby-system site 3 includes server 31 and storage 32.

Cases that might call for the operation of standby-system site 3 include, for example, a case in which standby-system site 3 is used to continue service in place of normal-system site 1 when normal-system site 1 is halted or in the event of a disaster, and a case in which standby-system site 3 assumes responsibility for processing such as searching to distribute the load upon normal-system site 1. In order to continue service in place of normal-system site 1, to distribute the load upon normal-system site 1, or to back up data of normal-system site 1, standby-system site 3 replicates or backs up the data of normal-system site 1 at a remote location.

Server 31 is a computer that causes operation of an application, a database, and an operating system for realizing services that are used at standby-system site 3 in place of normal-system site 1 or in concert with normal-system site 1 and that uses storage 32 to carry out processing. Storage 32 therefore serves the function of retaining the same data as storage 12.

Similar to storage 12, storage 32 is composed of a single or a plurality of disk devices, a single or a plurality of magneto-optical devices, or a memory device that is realized by a single or plurality of semiconductor memories.

Relay transfer device 2 is connected to normal-system site 1 by way of network 4 and connected to standby-system site 3 by way of network 5, and relays the transfer of data that are transferred in replication between normal-system site 1 and standby-system site 3.

Network 4 is a communication network such as the Internet or a private line and connects relay transfer device 2 with server 11 or storage 12 of normal-system site 1. Network 5 is a communication network such as the Internet or a private line and connects relay transfer device 2 with server 31 or storage 32 of standby-system site 3. Further, server 11 and storage 12 are similarly connected by a communication network, and server 31 and storage 32 are similarly connected by a network. The communication networks used in these cases are, for example, SCSI, Fiber Channels, ATA, S-ATA, Ethernet, or Infiniband.

FIG. 1 shows a configuration having only one normal-system site 1, one standby-system site 3, and one relay transfer device 2, but a plurality of each site is also possible.

Figure 2:
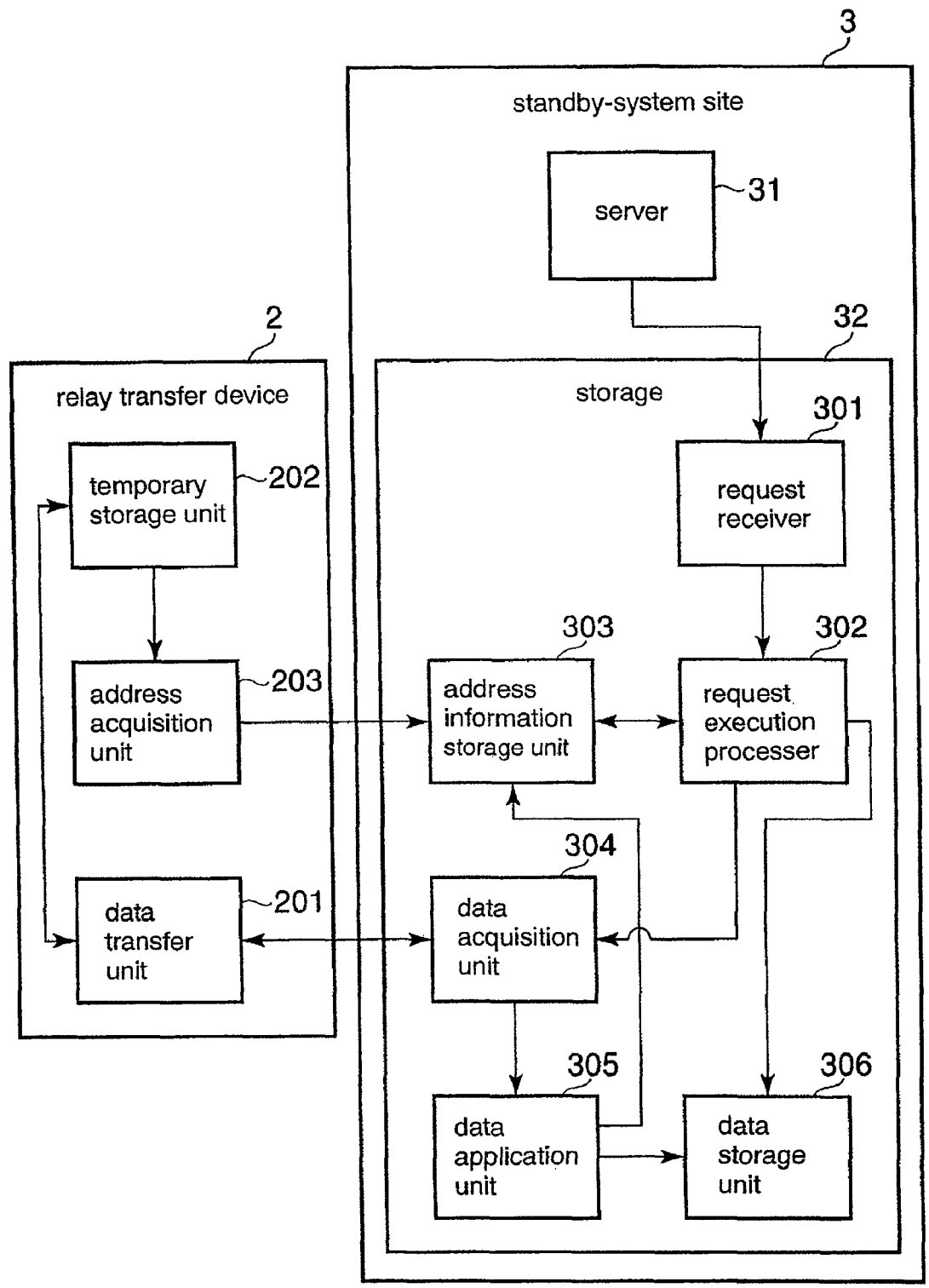
FIG. 2 is a block diagram showing details of the relay transfer device and standby-system site in the first embodiment.

FIG. 2 is a block diagram showing the details of the relay transfer device and the standby-system site in the first embodiment. Referring to FIG. 2, relay transfer device 2 includes data transfer unit 201, temporary storage unit 202, and address acquisition unit 203.

Data transfer unit 201 regularly transfers data that are stored in temporary storage unit 202 to standby-system site 3 in the order of arrival at relay transfer device 2. In addition, upon receiving a request from storage 32 of standby-system site 3, data transfer unit 201 extracts the data that correspond to the requested address from temporary storage unit 202 and transfers the data to standby-system site 3.

Temporary storage unit 202 is a medium storage for temporarily storing the update information of normal-system site 1 and has the function of storing data. The semiconductor memory or storage device that is provided in relay transfer device 2 may be used as temporary storage unit 202. In this case, "update information" refers to information that indicates updating of normal-system site 1 that is still not reflected in standby-system site 3. Update information may be information that represents the update content in a prescribed format, or may be the updated data itself.

For example, as one embodiment, temporary storage unit 202 may store as update information a command that is a write request to normal-system site 1. Commands include write commands and read commands and, these commands contain address information. Thus, when temporary storage unit 202 stores a command that is a write request to normal-system site 1, data transfer unit 201 successively transfers the command to standby-system site 3 and updates standby-system site 3.

As another embodiment, temporary storage unit 202 retains an absolute replica of the data of normal-system site 1, and when the data of normal-system site 1 are updated, may both update the replica of these data and record information of the addresses that have been updated.

Address acquisition unit 203 acquires address information that is stored in temporary storage unit 202 and transmits the address information to storage 32 of standby-system site 3. Addresses that are contained in the address information of temporary storage unit 202 are addresses for which the update of normal-system site 1 are still not reflected in standby-system site 3, i.e., addresses for which the data of normal-system site 1 and standby-system site 3 do not match.

In an embodiment in which a command for a write request is stored in temporary storage unit 202, address acquisition unit 203 acquires the addresses at which data are written in accordance with this command. In an embodiment in which a replica of all data of normal-system site 1 is stored in temporary storage unit 202, address acquisition unit 203 may acquire the addresses of the target of updating.

Storage 32 of standby-system site 3 includes: request receiver 301, request execution processor 302, address information storage unit 303, data acquisition unit 304, data application unit 305, and data storage unit 306.

Request receiver 301 receives commands that are sent from server 31 to storage 32 through the functioning of an application or operating system in server 31. Commands in standby-system site 3 also include write request commands and read request commands. Write requests and read requests will together be called "R/W requests."

Upon reception by request receiver 301 of a R/W request to storage 32, request execution processor 302 checks whether update information of the data block of the address that is the target of the R/W request is stored in temporary storage unit 202 of relay transfer device 2 based on the information of address information storage unit 303. If update information is not stored in temporary storage unit 202, request execution processor 302 immediately executes a R/W request to storage 32. However, if update information is stored in temporary storage unit 202, request execution processor 302 first instructs data acquisition unit 304 to acquire the update information of the data block, and waits for the update of the data of data storage unit 306. When the data of data storage unit 306 have been updated, request execution processor 302 executes a R/W request to data storage unit 306.

Address information storage unit 303 retains the address information that is sent in from address acquisition unit 203.

Data acquisition unit 304 submits a request to data transfer unit 201 of relay transfer device 2 for data that it has been instructed to acquire by request execution processor 302 and thus acquires the data, and then transmits the data to data application unit 305. Data acquisition unit 304 further receives data that are regularly transferred from data transfer unit 201 of relay transfer device 2 and sends these data to data application unit 305.

Data application unit 305 applies to data storage unit 306 the data that have been transferred from data transfer unit 201 to data acquisition unit 304 and thus updates the data of standby-system site 3.

Data storage unit 306 functions as the storage unit of storage 32. The data of data storage unit 306 are updated by the execution of the R/W request from server 31 by request execution processor 302, or by the application of the data from relay transfer device 2 by data application unit 305.

Explanation next regards the operation when activating the standby-system site in the replication system of the first embodiment.

Figure 3:
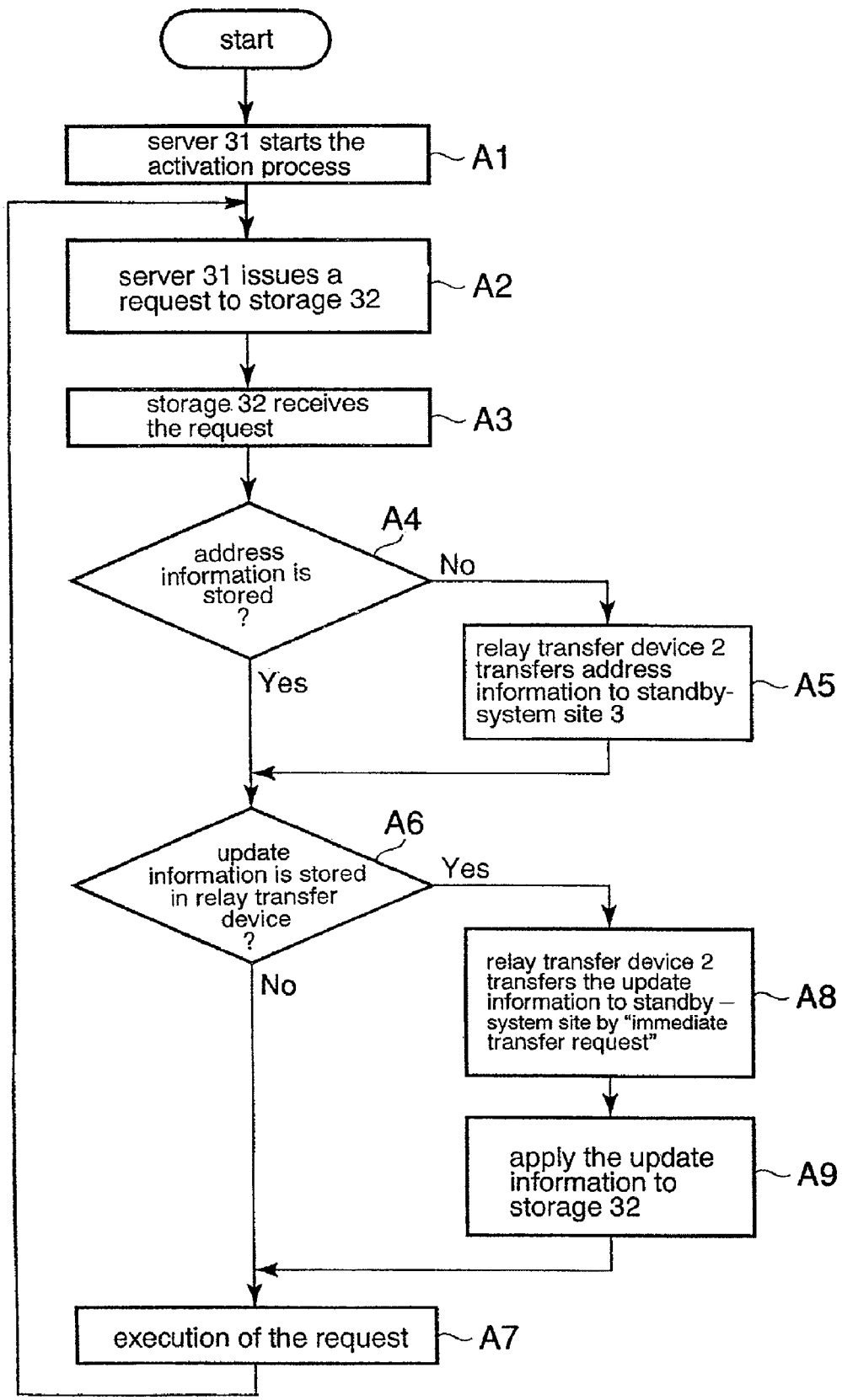
FIG. 3 is a flow chart for explaining the operations of the replication system of the first embodiment.

FIG. 3 is a flow chart for explaining the operations of the replication system of the first embodiment.

It is here assumed that normal-system site 1 is unable to continue operation due to some reason. Referring to FIG. 3, at this time, server 31 of standby-system site 3 first starts the activation process of the operating system and applications in order to continue the services that were being used at normal-system site 1 (Step A1).

Here, the activation process is a process in which the server activates, for example, the OS, the middle-ware, and the applications for starting the services. If necessary, operations such as optimization of storage, modification of the hardware settings, and modification of connections are carried out before these processes. When storage 32 of standby-system site 3 is only implementing replication from normal-system site 1, server 31 of standby-system site 3 is in some cases unable to provide services. In this case, optimization of storage here refers to placing server 31 in a state that allows services to be provided in such cases.

In addition, this activation process may be performed automatically when the need arises for server 31 of standby-system site 3 to start a service, or may accompany operations by an operator.

When server 31 issues a R/W request to storage 32 during the activation process or during use of the system following the activation process (Step A2), request receiver 301 of storage 32 receives this R/W request (Step A3). Request execution processor 302 then determines whether or not the address information of update information that is stored in temporary storage unit 202 of relay transfer device 2 is retained in address information storage unit 303 (Step A4).

If no address information is stored in address information storage unit 303 in the determination of Step A4, address information storage unit 303 submits a request for the transfer of address information to address acquisition unit 203 of relay transfer device 2. This request is hereinbelow referred to as an "address information transfer request."

Address information is then transferred from relay transfer device 2 to standby-system site 3 by means of an "address information transfer process" of relay transfer device 2 that will be explained hereinbelow, and this address information is retained in address information storage unit 303 of standby-system site 3 (Step A5).

Request execution processor 302 next analyzes the R/W request, and, based on the information of address information storage unit 303, determines whether or not the update information of the data block of the address that is the target of the R/W request is stored in temporary storage unit 202 of relay transfer device 2 (Step A6).

If it is determined in the determination of Step A6 that the update information of the data block of the address that is the target of the R/W request does not exist in temporary storage unit 202, request execution processor 302 immediately executes a R/W request to data storage unit 306 (Step A7).

Alternatively, if it is found in the determination of Step A6 that the update information of the data block of the address that is the target of the R/W request exists in temporary storage unit 202, data acquisition unit 304, under the instruction of request execution processor 302, submits a request to data transfer unit 201 of relay transfer device 2 for the transfer of the update information of the block (Step A8). This request is hereinbelow referred to as an "immediate transfer request."

When the update information of the data block is transferred from data transfer unit 201 to data acquisition unit 304, data application unit 305 applies the update of the data block to data storage unit 306 of standby-system site 3 (Step A9), and deletes the address information of the data block from address information storage unit 303.

In this way, the update information that was temporarily stored in relay transfer device 2 is applied to standby-system site 3, whereby request execution processor 302 executes a R/W request that is received in Step A2 to data storage unit 306 (Step A7). The series of processes from Step A8 to Step A9 that proceed to Step A7 is referred to as "immediate transfer process."

Upon completion of execution of the R/W request, request execution processor 302 reports the completion of the R/W request to server 31 and waits for the next R/W request.

Figure 4:
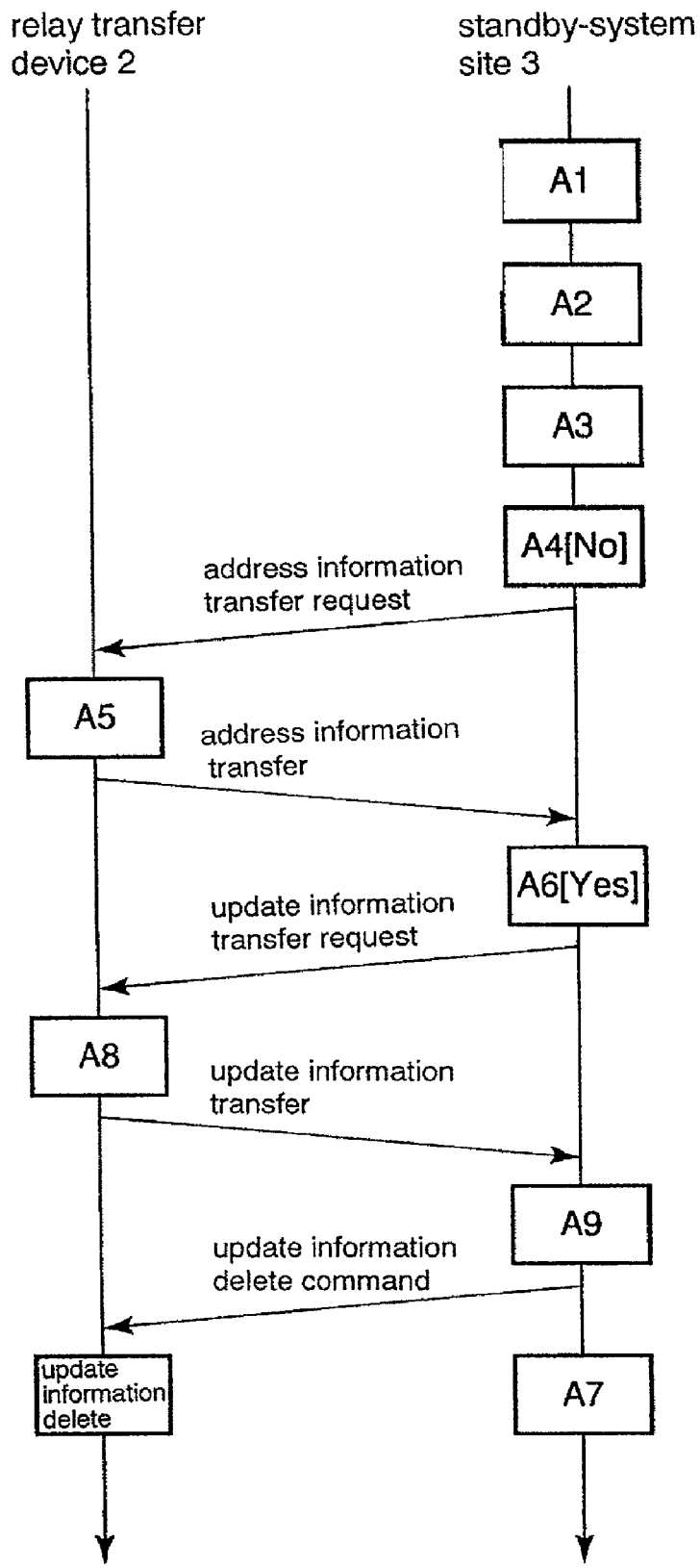
FIG. 4 is a sequence chart showing the inter-device operation when the determination of Step A4 is "NO" and the determination of Step A6 is "YES" in the operations shown by the flow chart of FIG. 3.

FIG. 4 is a sequence chart showing the inter-device operations when the determination of Step A4 is "NO" and the determination of Step A6 is "YES" in the operations that are shown in the flow chart of FIG. 3. Referring to FIG. 4, standby-system site 3 determines in Step A4 that succeeds Steps A1-A3 whether or not the address information of the update information is retained in address information storage unit 303. In this case, the address information is not retained in address information storage unit 303, and standby-system site 3 therefore sends to relay transfer device 2 a command requesting the transfer of the address information and waits for the address information to be sent in. Relay transfer device 2, having received this request command, transfers the address information to standby-system site 3 in the process of Step A5.

Standby-system site 3, having received the address information, uses this address information to make the determination of Step A6, i.e., the determination of whether or not the update information of the data block of the address that is the target of the R/W request is stored in relay transfer device 2. In this case, the update information is stored in relay transfer device 2, and standby-system site 3 therefore sends an update information transfer request to relay transfer device 2 and waits for the update information to be sent in. Relay transfer device 2, having received this request, transfers the update information to standby-system site 3 by the process of Step A8 and waits for an update information delete command.

Standby-system site 3, having received the update information, applies this update information to itself and then sends an update information delete command to relay transfer device 2. Upon receiving this update information delete command, relay transfer device 2 deletes the update information that was sent to standby-system site 3 from its own temporary storage unit 202.

After having transmitted the update information delete command, standby-system site 3, which is now in the most recent state that has been realized by application of the update information, executes the requested process by means of Step A7.

Figure 5:
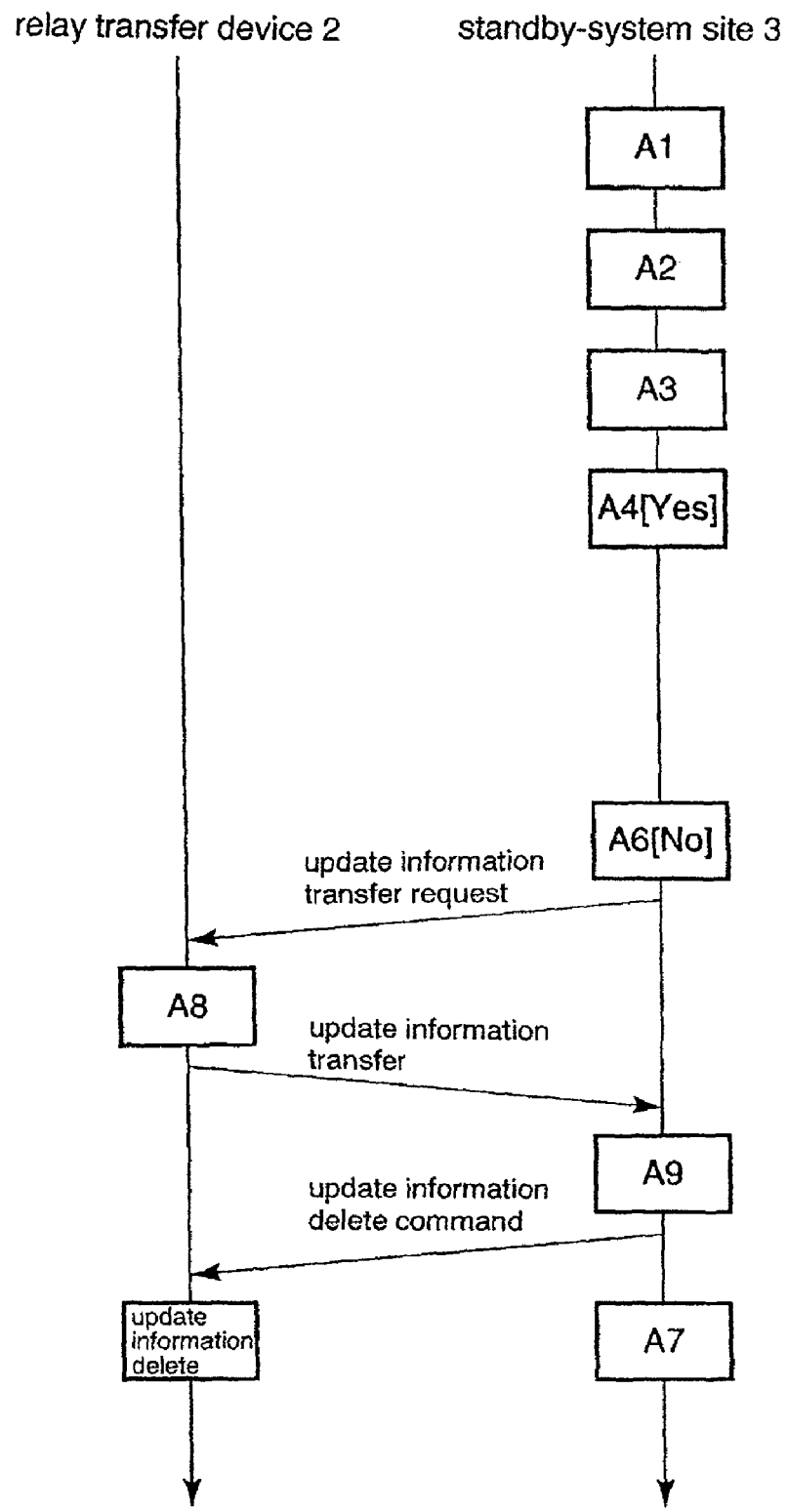
FIG. 5 is a sequence chart showing the inter-device operations when the determination of Step A4 is "YES" and the determination of Step A6 is "YES" in the operations shown in the flow chart of FIG. 3.

FIG. 5 is a sequence chart showing the inter-device operations when the determination of Step A4 is "YES" and the determination of Step A6 is "YES" in the operations shown in the flow chart of FIG. 3. Referring to FIG. 5, the determination of Step A4 is "YES," i.e., standby-system site 3 retains address information, and FIG. 5 therefore differs from FIG. 4 in that it lacks the process in which address information is sent from relay transfer device 2 to standby-system site 3 in response to the request from standby-system site 3.

Figure 6:
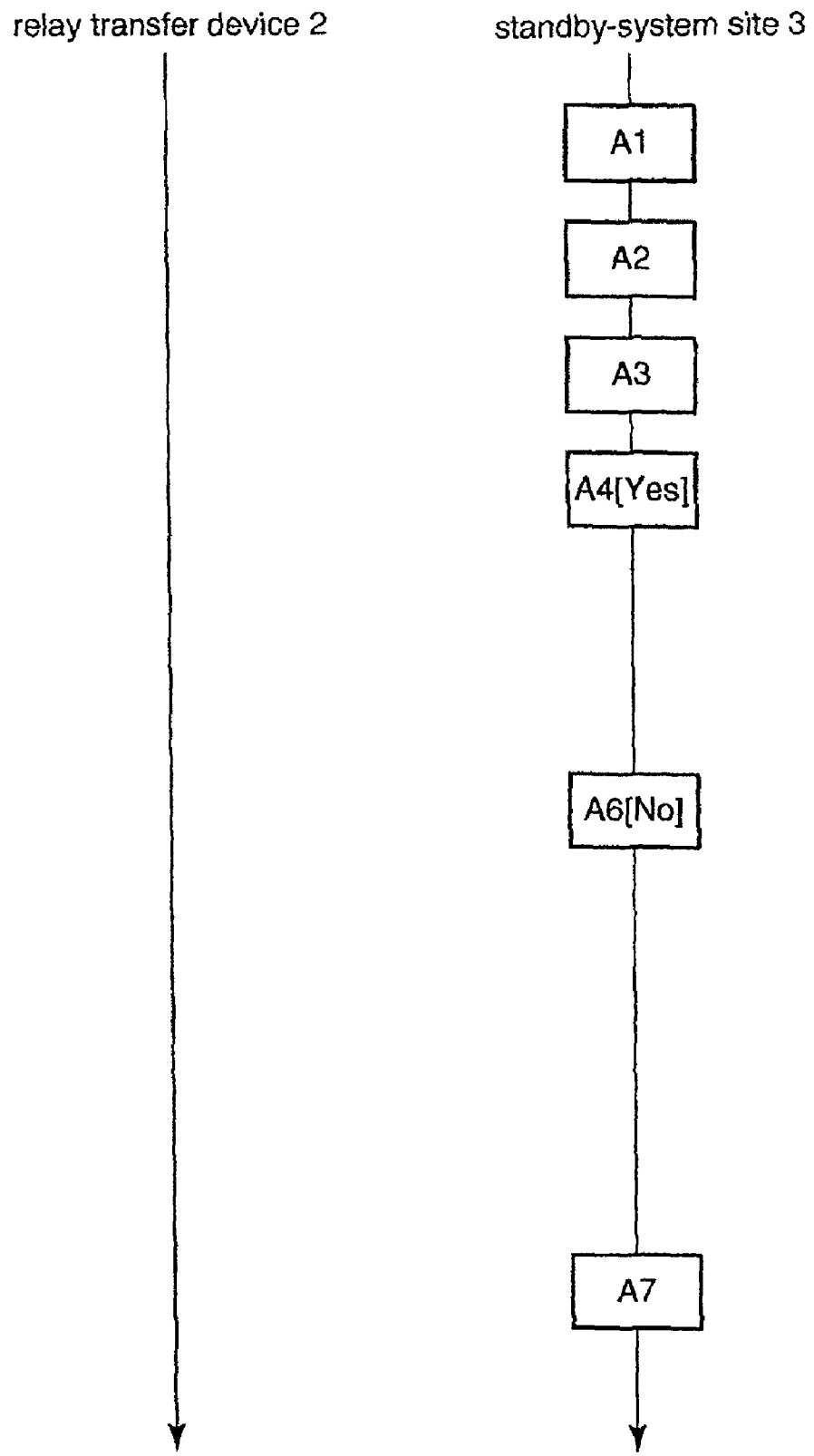
FIG. 6 is a sequence chart showing the inter-device operations when the determination of Step A4 is "YES" and the determination of Step A6 is "NO" in the operations shown in the flow chart of FIG. 3.

FIG. 6 is a sequence chart showing the inter-device operations when the determination of Step A4 is "YES" and the determination of Step A6 is "NO" in the operations shown in the flow chart of FIG. 3. Referring to FIG. 6, the processing in FIG. 6 is similar to that of FIG. 5 in that, because the determination of Step A4 is "YES," there is no process for sending address information from relay transfer device 2 to standby-system site 3. In addition, because the determination of Step A6 is "NO," i.e., update information that is the target of the R/W request is not stored in relay transfer device 2, standby-system site 3 simply executes the requested process without further operations.

Figure 7:
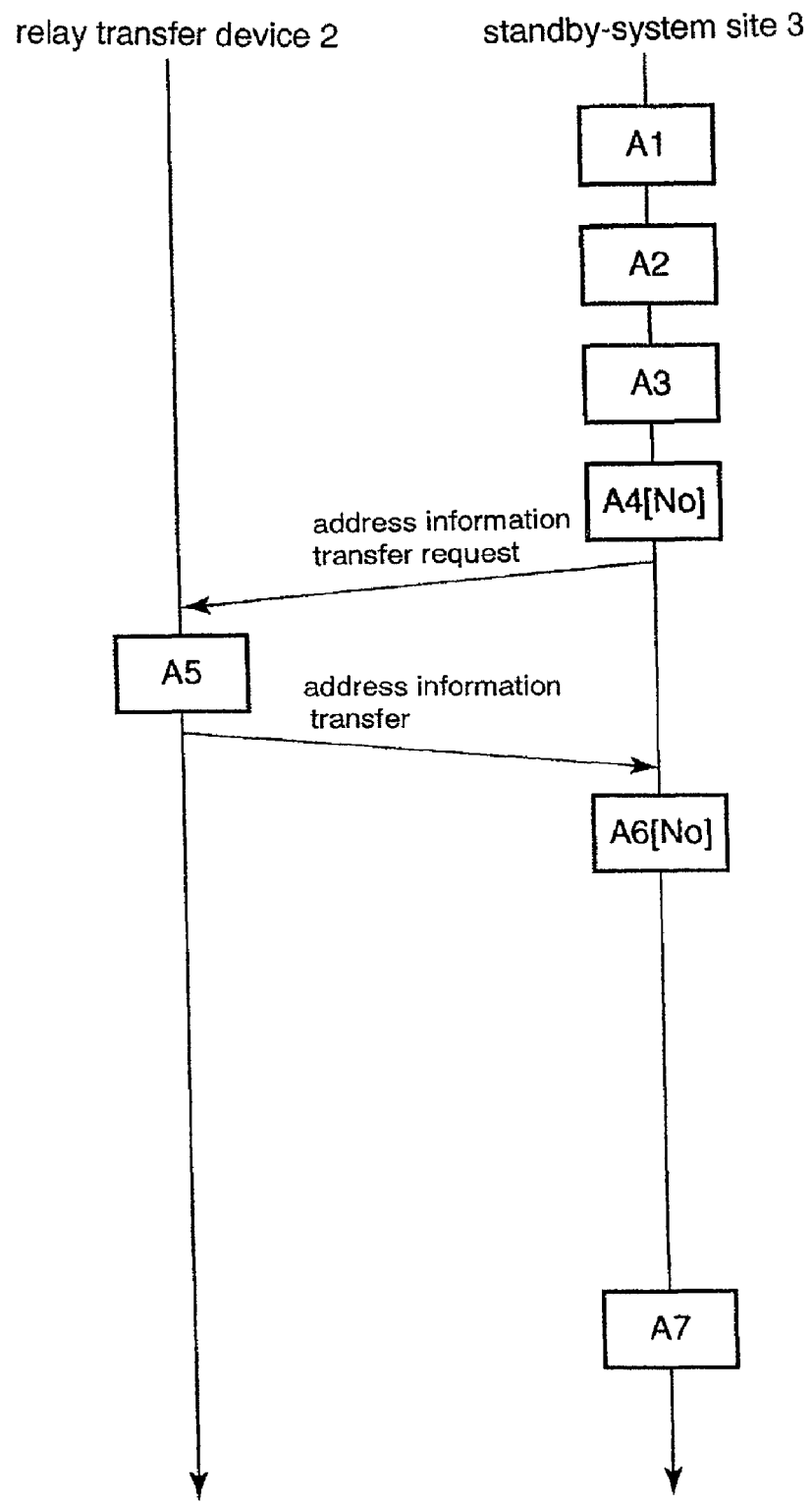
FIG. 7 is a sequence chart showing the inter-device operations when the determination of Step A4 is "NO" and the determination of Step A6 is "NO" in the operations shown in the flow chart of FIG. 3.

FIG. 7 is a sequence chart showing the inter-device operations when the determination of Step A4 is "NO" and the determination of Step A6 is "NO" in the operations shown in the flow chart of FIG. 3. Referring to FIG. 7, since the determination of Step A4 is "NO" address information is transferred from relay transfer device 2 to standby-system site 3 as in FIG. 4. In addition, since the determination of Step A6 is "NO," similar to FIG. 6, standby-system site 3 simply executes the request process without obtaining and applying update information.

Explanation next regards the operations for a write request in the normal-system site in the first embodiment.

Figure 8:
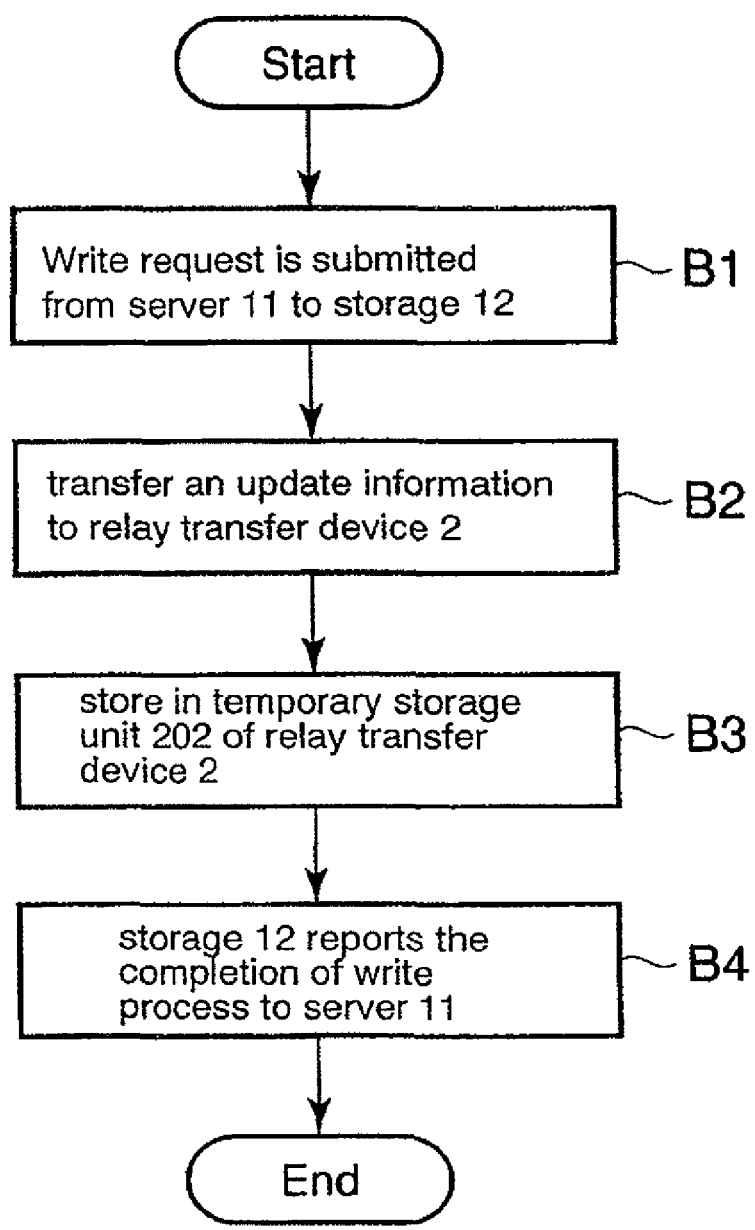
FIG. 8 is a flow chart for explaining the operations of the normal-system site of the first embodiment.

FIG. 8 is a flow chart for explaining the operations of the normal-system site in the first embodiment. Referring to FIG. 8, when a write request command is submitted from server 11 to storage 12 (Step B1), storage 12 applies the write request command to itself.

Normal-system site 1 next transfers this write request command as update information, or the address and data of the data block that is updated by this command, as update information to relay transfer device 2 by way of network 4 (Step B2).

In an embodiment in which the write request command is transferred as the update information, relay transfer device 2 that has received this write request command applies this command to temporary storage unit 202 or stores this command in temporary storage unit 202 (Step B3).

In an embodiment in which the address and data of the updated data block are transmitted as the update information, relay transfer device 2, having received this update information, applies these data to temporary storage unit 202 (Step B3). Upon completion of the application or storage to temporary storage unit 202, storage 12 finally reports the completion of the write process to server 11 (Step B4).

The process of FIG. 8 is repeated each time server 11 submits a write request command to storage 12, whereby all update information for storage 12 is transferred to relay transfer device 2. As a result, the updated data will not be lost despite the occurrence of a problem in normal-system site 1.

Figure 9:
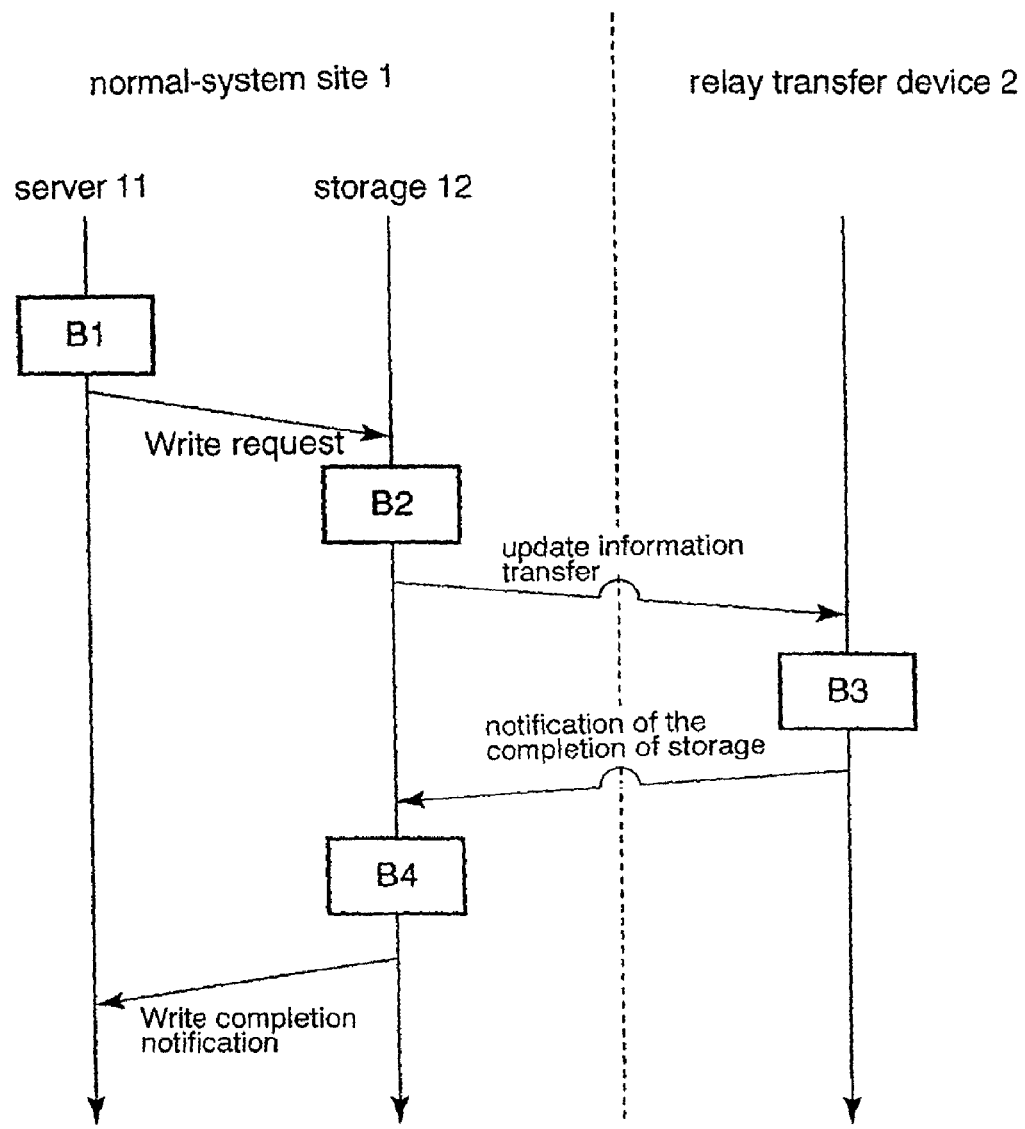
FIG. 9 is a sequence chart showing the inter-device operation in the system operations that are shown in the flow chart of FIG. 8.

FIG. 9 is a sequence chart showing the inter-device operations in the system operations that are shown in the flow chart of FIG. 8. Referring to FIG. 9, server 11 of normal-system site 1 submits a write request command to storage 12 by means of Step B1, and waits for notification of the completion of writing. Storage 12, having received this command, both applies the command to itself in Step B2 and transfers the update information to relay transfer device 2, and then waits for notification of the completion of storage from relay transfer device 2.

Relay transfer device 2, having received the update information, stores this update information in its own site and then sends to storage 12 notification of the completion of storage in Step B3. Server 11, in response to the reception of the notification of the completion of writing, verifies that the submitted write request has been normally processed.

Explanation next regards the operations of the relay transfer device of the first embodiment.

Figure 10:
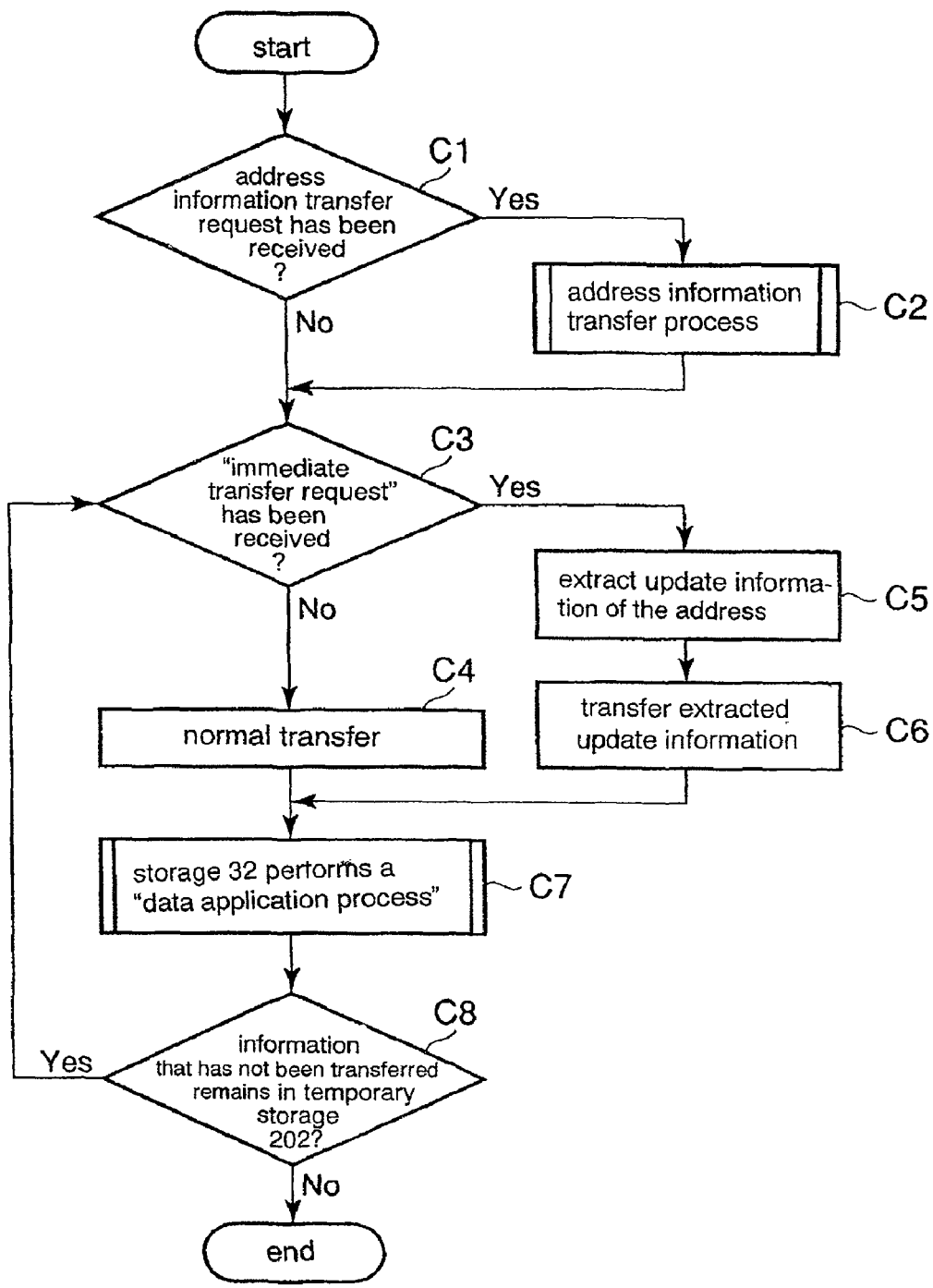
FIG. 10 is a sequence chart for explaining the operation of the relay transfer device of the first embodiment.

FIG. 10 is a flow chart for explaining the operations of the relay transfer device of the first embodiment. Referring to FIG. 10, relay transfer device 2 first determines whether or not address acquisition unit 203 of relay transfer device 2 has received an acquisition request for address information from storage 32 (Step C1). If an acquisition request has been received, address acquisition unit 203 performs an "address information transfer process" that is explained hereinbelow (Step C2).

If it is found in the determination of Step C1 that an acquisition request has not been received, or after carrying out the process of Step C2, relay transfer device 2 determines whether or not an "immediate transfer request" from data acquisition unit 304 that results from the process of Step A8 of FIG. 3 has been received by data transfer unit 201 (Step C3).

If an immediate transfer request has not been received, relay transfer device 2 transfers update information (or data) as usual (Step C4). In other words, data transfer unit 201 extracts in the order of arrival update information that has been stored in temporary storage unit 202, this update information being for data blocks that must be updated and transferred, and transfers this update information (or data that is indicated by this information) to storage 32 of standby-system site 3.

Further, if it is determined in the determination of Step C3 that an immediate transfer request has been received, data transfer unit 201 of relay transfer device 2 extracts from temporary storage unit 202 the update information of the data block of the address that has been requested by means of the immediate transfer request command (Step C5), and transfers the update information (or the data that is indicated by the update information) to storage 32 (Step C6). If there is a plurality of items of update information of such data blocks, data transfer unit 201 extracts and transfers all of the update information in the order of arrival. If there is a plurality of updates for the same data block, only the most recent update information is extracted and used, and update information that arrived before this information is discarded.

Upon completion of the transfer of update information to data acquisition unit 304 of storage 32 in Step C4 and Step C6, relay transfer device 2 deletes this update information from temporary storage unit 202. Alternatively, instead of deleting the information, it is also possible to, for example, implement a process for conferring some indication showing that transfer is unnecessary by a method such as conferring a flag indicating that transfer has been completed.

When relay transfer device 2 performs the process of Step C4 or Step C6, data acquisition unit 304 of storage 32 receives the update information (or data) that has been transferred from data transfer unit 201 of relay transfer device 2. Data acquisition unit 304 then performs a "data application process" for applying this information (or data) to data storage unit 306 (Step C7). The details of the "data application process" will be explained hereinbelow.

Finally, relay transfer device 2 determines whether or not update information that has not been transferred to storage 32 remains in temporary storage unit 202 (Step C8). If update information still remains, relay transfer device 2 returns to the process of Step C1 and repeats the data transfer. If no update information remains, relay transfer device 2 ends the process and waits for the reception of new update information in temporary storage unit 202.

Figure 11:
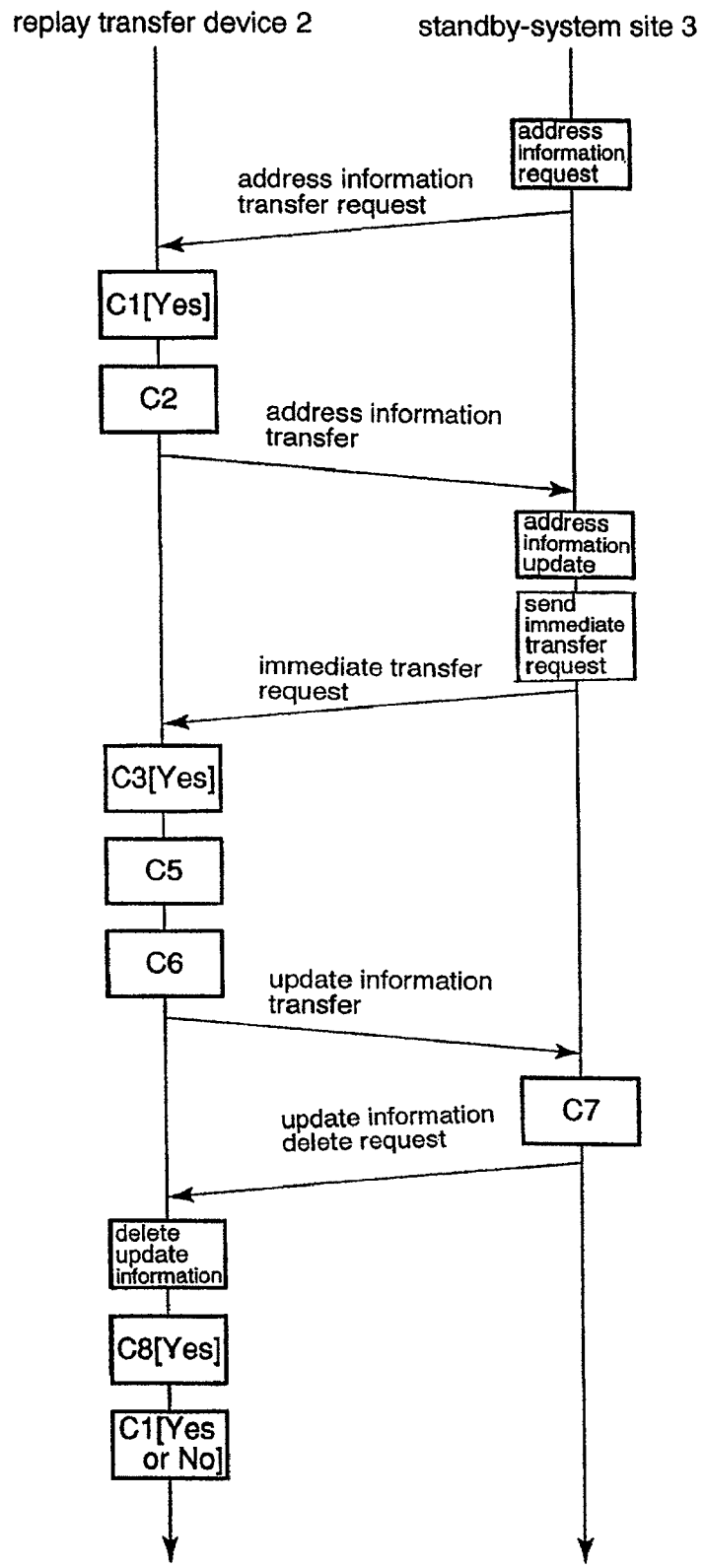
FIG. 11 is a sequence chart showing the inter-device operations when the determination of Step C1 is "YES" and the determination of Step C3 is "YES" in the operations shown in the flow chart of FIG. 10.

FIG. 11 is a sequence chart showing the inter-device operations when the determination of Step C1 is "YES" and the determination of Step C3 is "YES" in the operations that are shown in the flow chart of FIG. 10. Referring to FIG. 11, standby-system site 3 is submitting an address information request, and relay transfer device 2 therefore determines "YES" in Step C1. Relay transfer device 2 then transfers address information to standby-system site 3 in Step C2.

Standby-system site 3, having received the address information, uses this information to update the address information that it retains. It is here assumed that standby-system site 3 sends an immediate transfer request based on this address information to relay transfer device 2. The timing of the immediate transfer request shown in this case is one example, and the present invention is not limited to this form.

Relay transfer device 2 that has received the immediate transfer request has determined "YES" in Step C3 and therefore transfers the update information to standby-system site 3 in Steps C5 and C6. Standby-system site 3, having received the update information, applies this update information to itself in Step C7 and then submits a request to relay transfer device 2 to delete the update information. Relay transfer device 2 deletes the update information in accordance with this request. Alternatively, if further update information remains in relay transfer device 2, relay transfer device 2 determines "YES" in Step C8 and thus returns to the process of Step C1.

Figure 12:
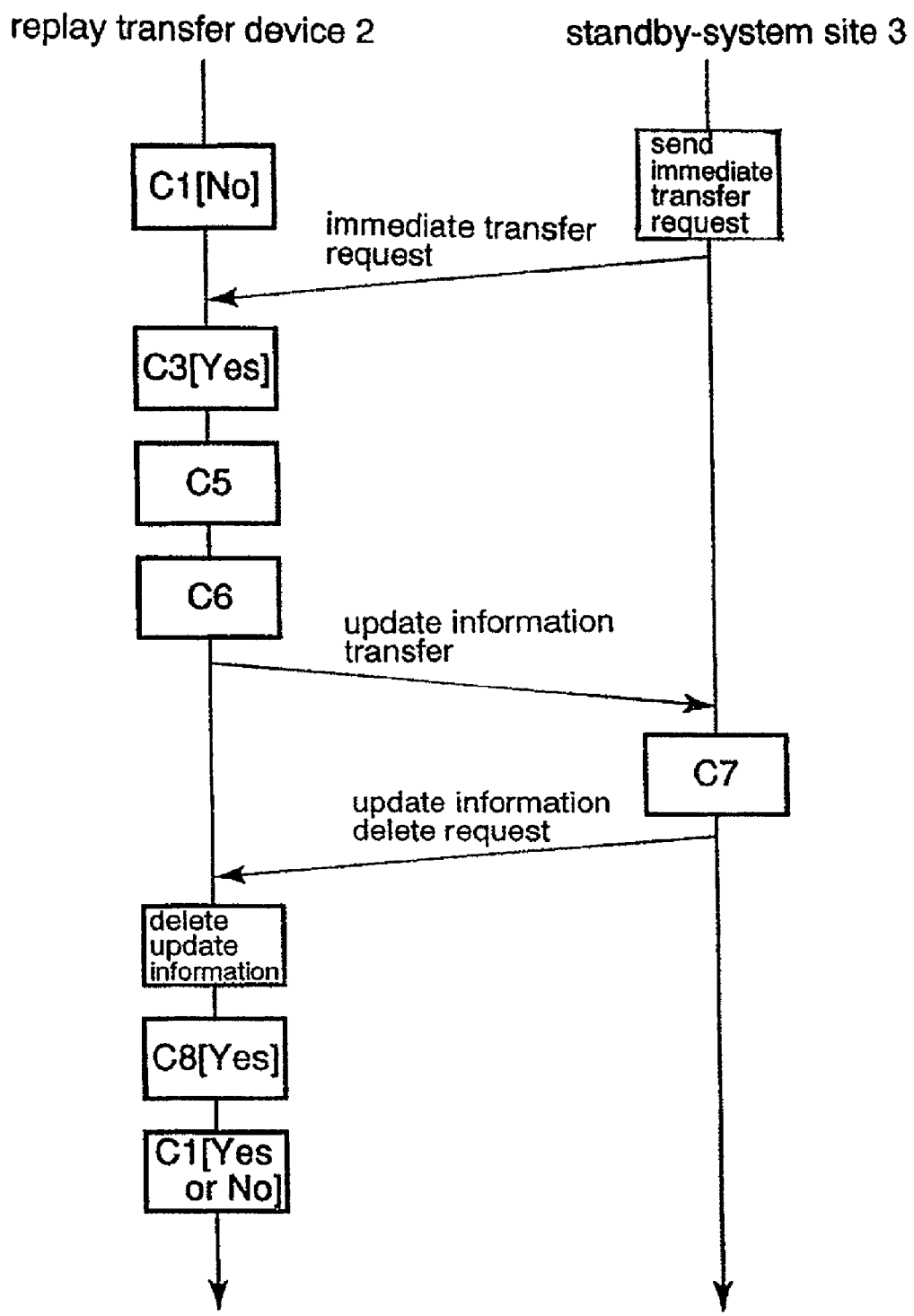
FIG. 12 is a sequence chart showing the inter-device operations when the determination of Step C1 is "NO" and the determination of Step C3 is "YES" in the operations shown in the flow chart of FIG. 10.

FIG. 12 is a sequence chart showing the inter-device operations when the determination of Step C1 is "NO" and the determination of Step C3 is "YES" in the operations that are shown in the flow chart of FIG. 10. Referring to FIG. 12, standby-system site 3 has not requested relay transfer device 2 for address information, and relay transfer device 2 therefore determines "NO" in Step C1. In addition, an immediate transfer request has been submitted from standby-system site 3 to relay transfer device 2, and relay transfer device 2 therefore determines "YES" in Step C3 and subsequently performs the same process as in FIG. 11.

Figure 13:
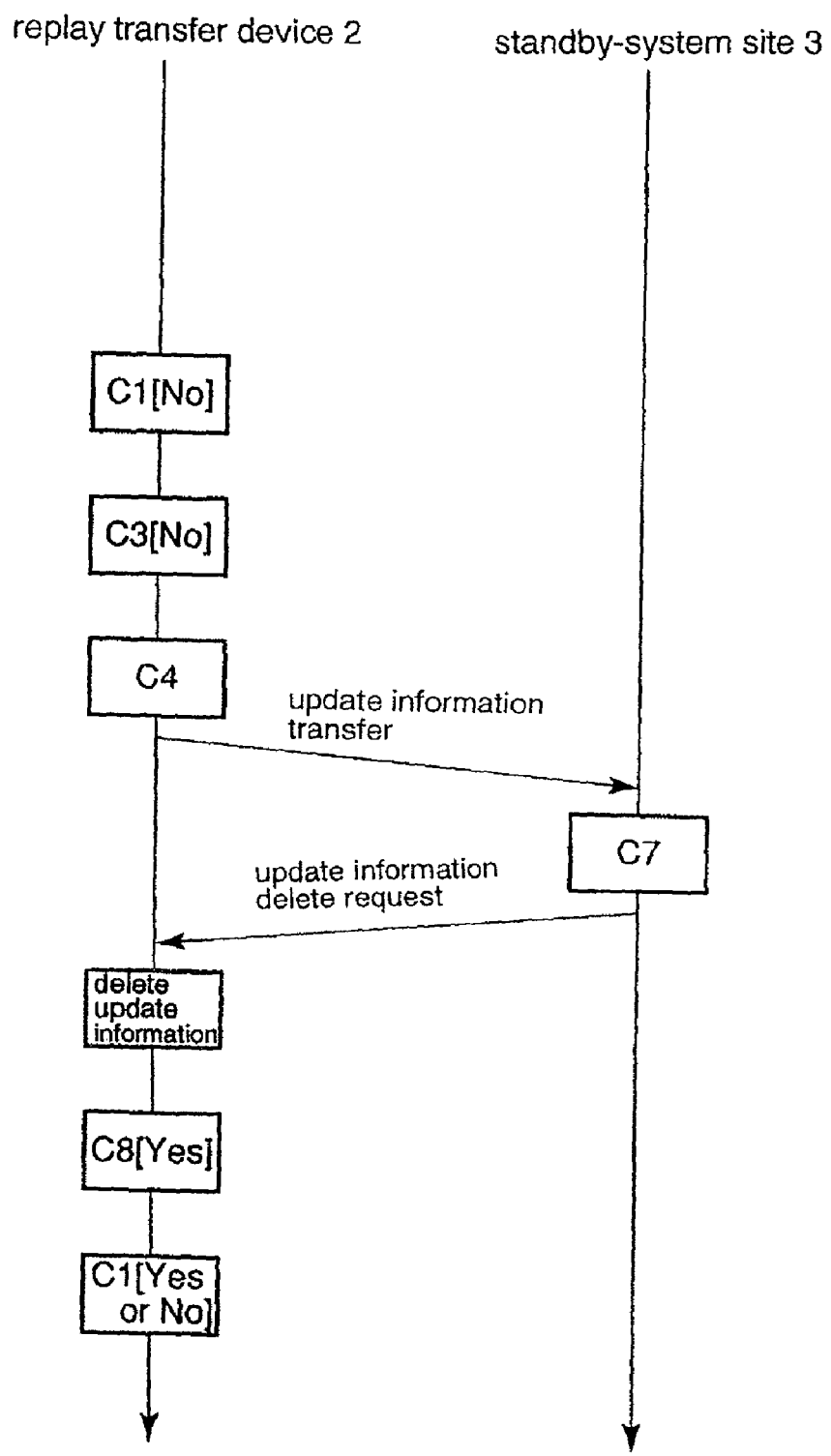
FIG. 13 is a sequence chart showing the inter-device operations when the determination of Step C1 is "NO" and the determination of Step C3 is "NO" in the operations shown in the flow chart of FIG. 10.

FIG. 13 is a sequence chart showing the inter-device operations when the determination of Step C1 is "NO" and the determination of Step C3 is "NO" in the operations that are shown in the flow chart of FIG. 10. Referring to FIG. 13, an immediate transfer request has not been submitted from standby-system site 3 to relay transfer device 2, and relay transfer device 2 therefore performs the regular transfer of update information as usual in Step C4. The processing of standby-system site 3 that has received the update information is the same as shown in FIG. 11.

Explanation next regards the details of the "address information transfer process" that is shown in Step C2 of FIG. 10.

Figure 14:
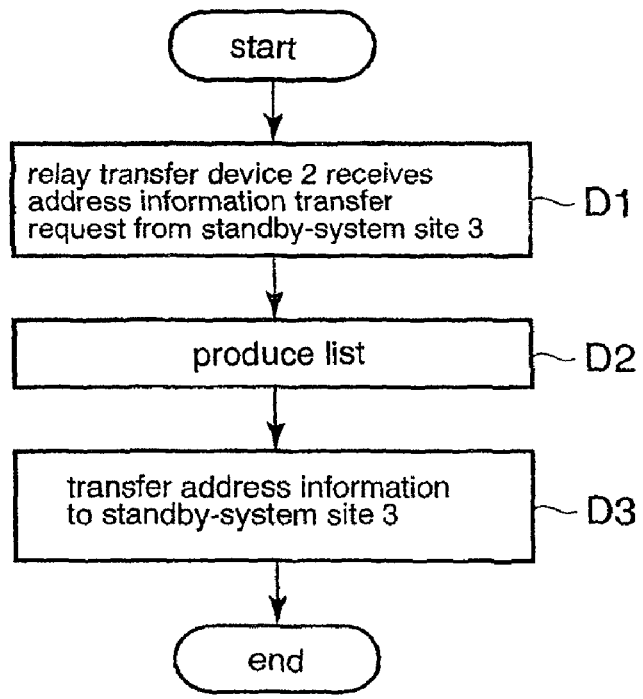
FIG. 14 is a flow chart for explaining the process of transferring address information in the first embodiment.

FIG. 14 is a flow chart for explaining the address information transfer process of the first embodiment. It is assumed that address acquisition unit 203 of relay transfer device 2 first receives an "address information transfer request" from storage 32 of standby-system site 3 requesting that address information be obtained from temporary storage unit 202 (Step D1). Address acquisition unit 203 scans temporary storage unit 202 and extracts the write request commands that are stored in temporary storage unit 202. Address acquisition unit 203 further analyzes these commands and produces address list information of the blocks that are the object of the commands (Step D2). Finally, address acquisition unit 203 transfers the address list information that has been produced to address information storage unit 303 of storage 32 (Step D3).

Explanation next regards the details of the "data application process" that is shown in Step C7 of FIG. 10.

Figure 15:
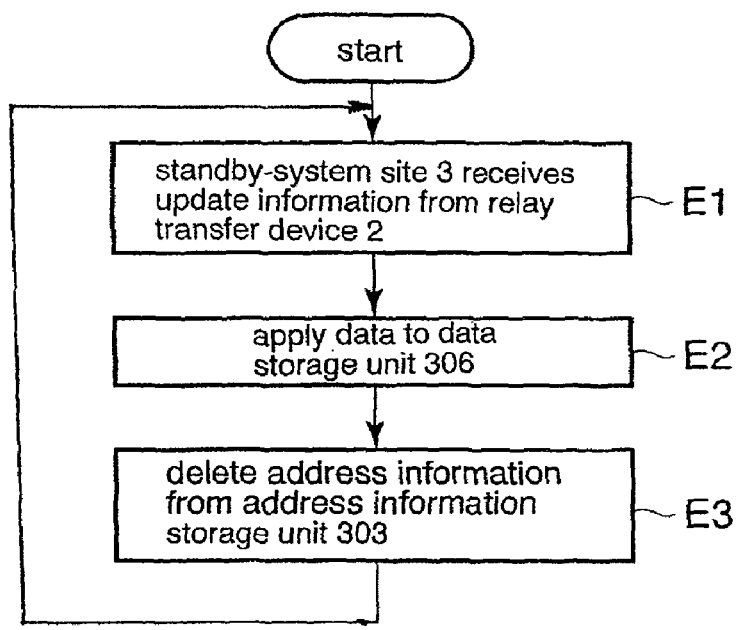
FIG. 15 is a flow chart for explaining the data application process of the first embodiment.

FIG. 15 is a flow chart for explaining the data application process of the first embodiment. Data acquisition unit 304 of storage 32 of standby-system site 3 first receives update information (or data) that has been transferred from data transfer unit 201 of relay transfer device 2 (Step E1) and then sends the information (or data) to data application unit 305.

Data application unit 305 next applies this update information (or data) to data storage unit 306 (Step E2), whereby the data of data storage unit 306 are updated. Finally, data application unit 305 deletes the address information of the block that is the object of data that have been applied in Step E2 from address information storage unit 303 (Step E3) and returns to the process of Step E1.

As described in the foregoing explanation, according to the first embodiment of the present invention, when an R/W request command is issued in standby-system site 3 during the activation process or following activation, standby-system site 3 checks whether or not the update information for the data block of the address that is the target of the command is stored in relay transfer device 2 (i.e., checks whether or not update information exists that have not yet been applied at its own site), and executes the R/W request command after applying necessary update information at its own site. As a result, standby-system site 3 can be quickly put to use and the functions of normal-system site 1 switched even before the application to storage 32 of the update information that is stored in temporary storage unit 202 of relay transfer device 2 that should be applied to storage 32 of standby-system site 3. In addition, functions can be continued reliably even for a command at a time at which the most recent data have yet not been applied to standby-system site 3.

Still further, when the most recent data of the target of a command have not yet been applied in standby-system site 3, standby-system site 3 issues an immediate transfer request to relay transfer device 2 in order to apply the necessary update information in its own site, and standby-system site 3 can therefore, from a state in which the most recent data have not yet been applied, complete preparation for executing a command in a short time.

In addition, according to the present embodiment, the target address information of the update information that is stored in temporary storage unit 202 of relay transfer device 2 is transferred to storage 32 of standby-system site 3 by a request that is submitted from standby-system site 3 to relay transfer device 2. As a result, even when an R/W request command is generated in standby-system site 3 that is in the activation process, standby-system site 3 can execute the R/W request command without having to submit an inquiry to relay transfer device 2 regarding the existence or lack of an update of data blocks for each command if the target address information has already been transferred, and as a result, standby-system site 3 will experience little reduction in storage access performance.

According to the present embodiment, moreover, when a R/W command has been issued, standby-system site 3 verifies whether or not update information of the target block of this command exists in relay transfer device 2, thereby eliminating the occurrence of errors that result when a R/W request is generated and old data of standby-system site 3 are accessed even though update information is present in relay transfer device 2.

According to the present embodiment, if for a read request command, update information exists in relay transfer device 2 for the target data block of the read request, standby-system site 3 carries out processing of the read request after immediately acquiring the update information from relay transfer device 2 and applying the update information, whereby the data that precede the update of standby-system site 3 are not accessed. In addition, because the transfer is immediate, the response time up to the completion of the read will not be extended unnecessarily.

According to the present embodiment, if for a write request command, update information for a data block that is the target of the write request exists in relay transfer device 2, standby-system site 3 performs processing of the write request after immediately acquiring the update information from relay transfer device 2 and applying the update information, whereby the data resulting from the write request of server 31 will not be subsequently overwritten.

Further, according to the present embodiment, the address information of a data block that is the target of update information that is stored in relay transfer device 2 is acquired and held by standby-system site 3, whereby standby-system site 3 can detect whether update is necessary or not without having to submit an inquiry to relay transfer device 2. As a result, the access performance for accessing standby-system site 3 will be virtually unaffected for addresses other than those of data blocks for which update information is stored in relay transfer device 2.

According to the present embodiment, standby-system site 3 acquires and holds address information of data blocks that are the target of update information that is stored in relay transfer device 2, and after applying the update information from relay transfer device 2, deletes the address information of the data blocks that have been applied. There is consequently no need for standby-system site 3 to repeatedly submit inquiries to relay transfer device 2 for address information.

FIG. 3 shows one example of processing in Step A6 in which the update information of target data blocks exists in relay transfer device 2, but a variety of other processes may also be employed.

Explanation next regards other examples of processing when update information is present in relay transfer device 2.

Modification 1 of the First Embodiment

Figure 16:
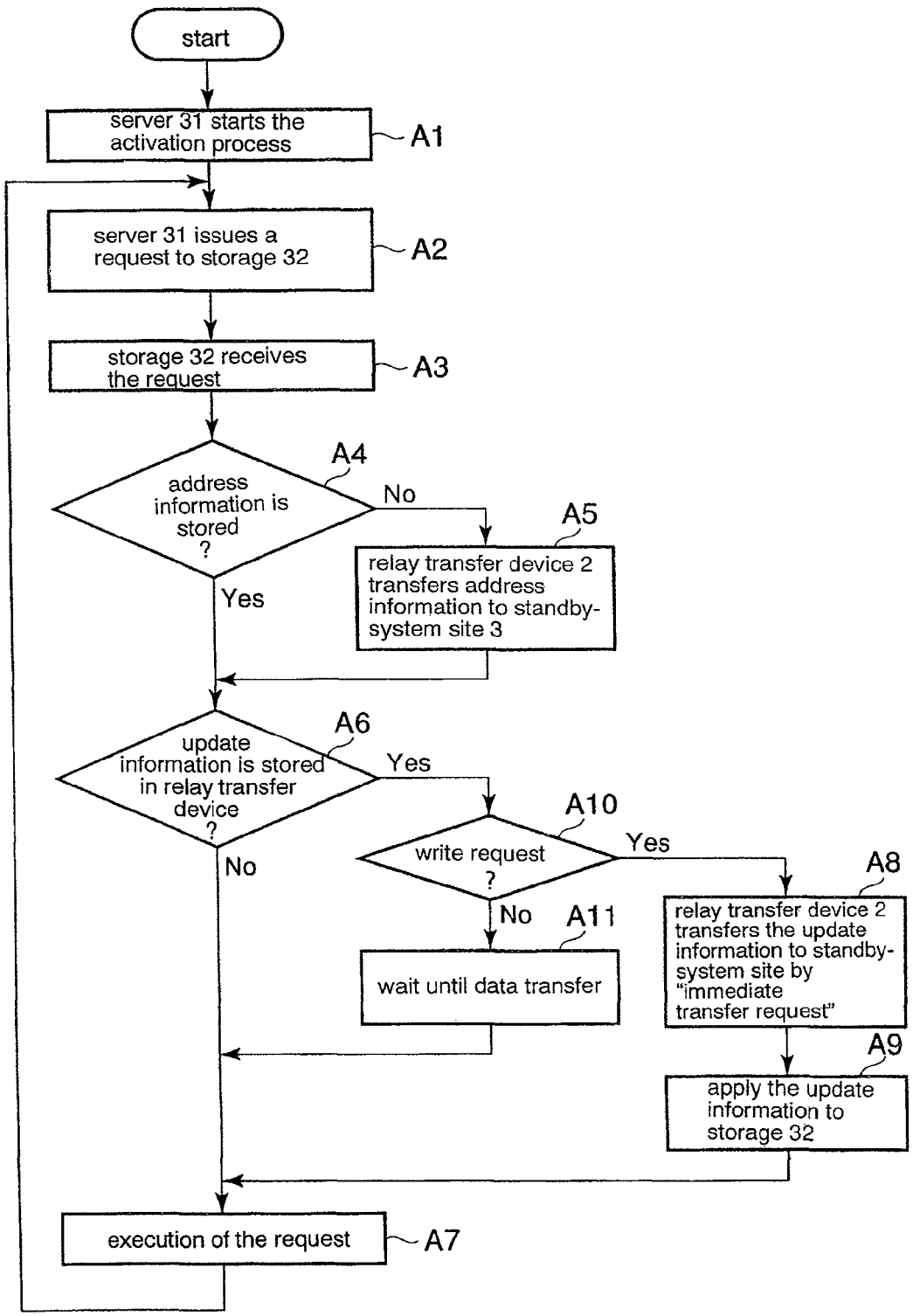
FIG. 16 is a flow chart showing another example of processing in the first embodiment.

FIG. 16 is a flow chart showing another example of processing in the first embodiment. Referring to FIG. 16, the processing of Steps A1-A9 is similar to that shown in FIG. 3. In the flow chart of FIG. 16, when it is found in the determination of Step A6 that update information of data blocks of addresses that are the target of a R/W request are present in temporary storage unit 202, request execution processor 302 examines this R/W request command to determine whether it is a write or read command (Step A10). If the command is a write request, the process proceeds to Steps A8 and A9 that are similar to FIG. 3 and the update information of relay transfer device 2 is immediately applied to standby-system site 3.

On the other hand, if the command is a read request, request execution processor 302 waits until data acquisition unit 304 has received the update information of the data blocks that are the target of this command and these data applied to data storage unit 306 by data application unit 305 (Step A11) before proceeding to the process of Step A7. In Step A11, instead of requesting the immediate transfer of update information that is in relay transfer device 2, as in the process of Step A8, request execution processor 302 carries out a process waiting until transfer is realized by the successive transfer by means of data transfer unit 201 of relay transfer device 2. The process of this Step A11 is hereinbelow referred to as a "transfer waiting process." In other words, in contrast to FIG. 3 in which an "immediate transfer process" is carried out when the R/W request command of standby-system site 3 is either a write or read command, in FIG. 16, an "immediate transfer process" is carried out for a write request and a "transfer waiting process" is carried out for a read request.

Figure 17:
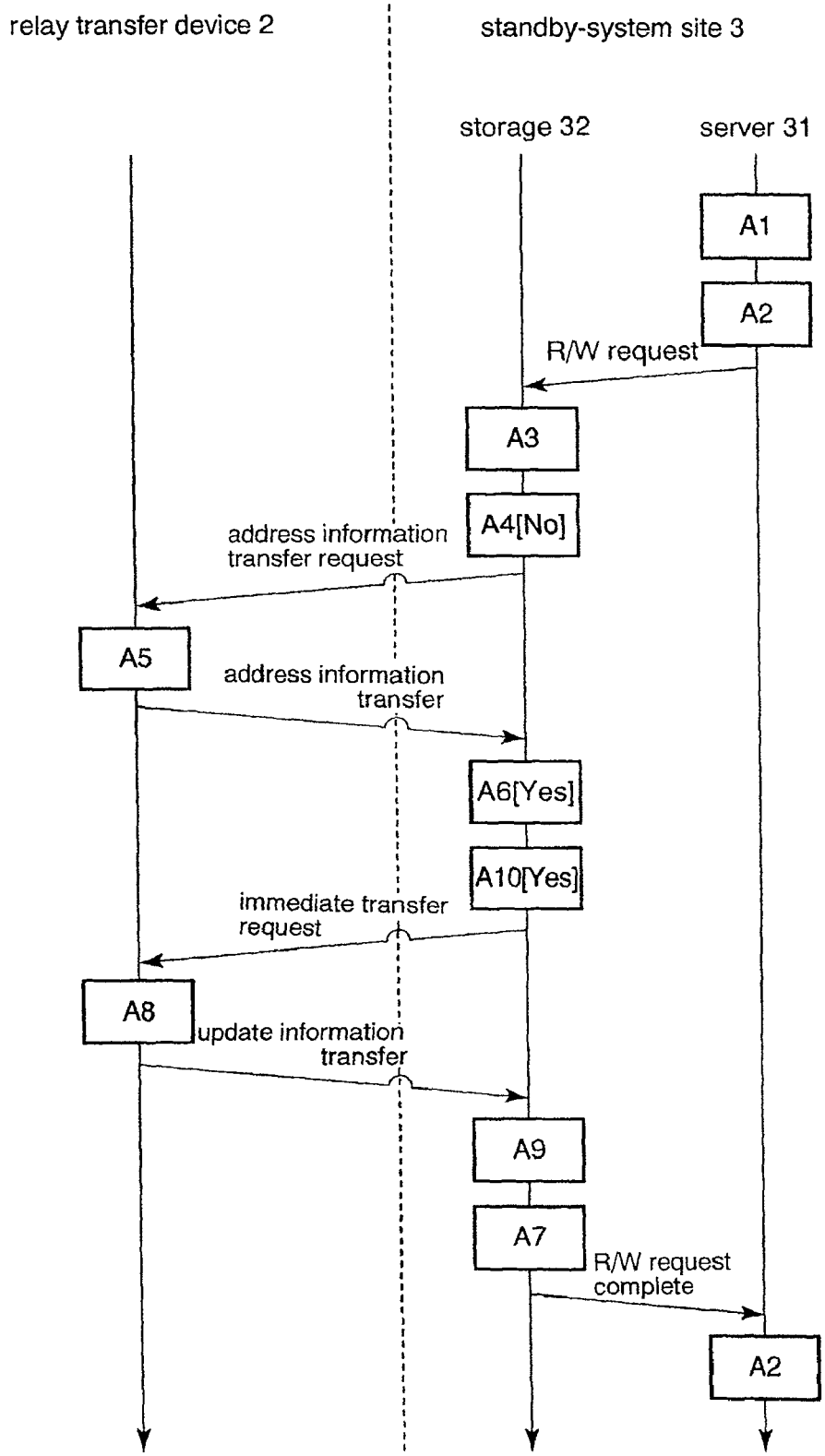
FIG. 17 is a sequence chart showing the inter-device operations when the determination of Step A4 is "NO," the determination of Step A6 is "YES," and the determination of Step A10 is "YES" in the operations shown in the flow chart of FIG. 16.

FIG. 17 is a sequence chart showing the inter-device operations when the determination of Step A4 is "NO," the determination of Step A6 is "YES," and the determination of Step A10 is "YES" in the operations that are shown in the flow chart of FIG. 16. Relay transfer device 2 also performs processes of successively transferring the update information that is stored in temporary storage unit 202 to standby-system site 3 and applying the update information to storage 32, but these processes are omitted here for the sake of simplifying the figures. (Hereinbelow, in the interest of simplifying the figures, the process of successively transferring update information is similarly omitted from sequence charts when not of key importance).

Server 31 of standby-system site 3 first issues a R/W request to storage 32 in Steps A1 and A2. Storage 32, having received the R/W request in Step A3, determines whether the address information is retained in address information storage unit 303 in Step A4. Because the determination is "NO" in this case, storage 32 submits a request to relay transfer device 2 for the transfer of the address information. Relay transfer device 2 transfers the address information to storage 32 in Step A5.

Storage 32, having acquired the address information, determines in Step A6 whether or not the update information of the data blocks that are the target of the R/W request is stored in relay transfer device 2. Because the determination is "YES" in this case, storage 32 further determines in Step A10 whether the R/W request is a write request or not. Since the determination is YES in this case, standby-system site 3 submits a request to relay transfer device 2 for the immediate transfer of the update information. Relay transfer device 2, having received this request, sends the update information to storage 32 in Step A8.

Storage 32, having acquired the desired update information, applies this information to its own site in Step A9, executes the requested process (in this case, the write request) in Step A7, and notifies server 31 of the completion of the processing of the R/W request.

Figure 18:
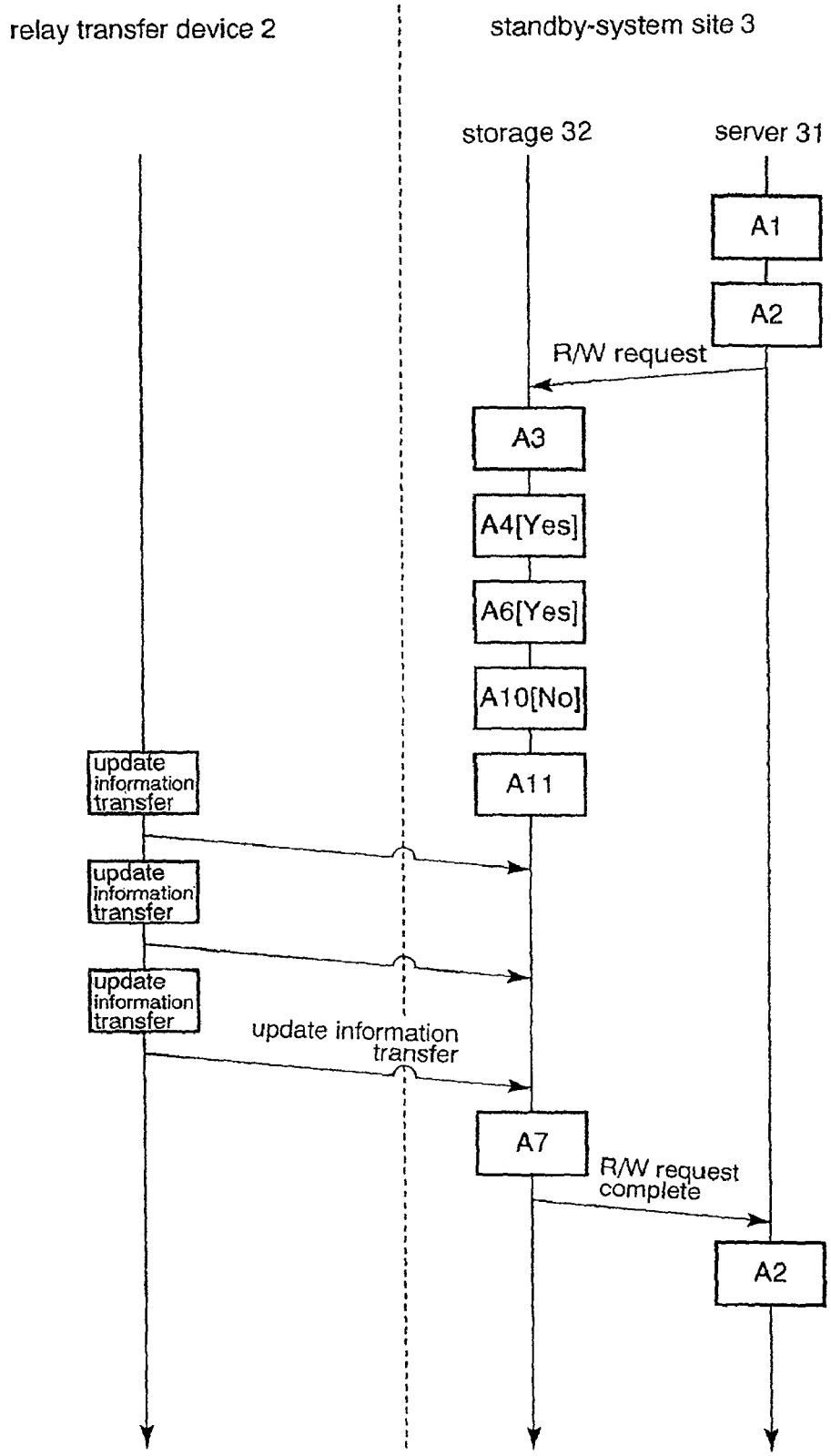
FIG. 18 is a sequence chart showing the inter-device operations when the determination of Step A4 is "YES," the determination of Step A6 is "YES," and the determination of Step A10 is "NO" in the operations shown in the flow chart of FIG. 16.

FIG. 18 is a sequence chart showing the inter-device operations when the determination of Step A4 is "YES," the determination of Step A6 is "YES," and the determination of Step A10 is "NO" in the operations shown in the flow chart of FIG. 16. Referring to FIG. 18, because the determination of Step A4 is "YES," the process advances to the determination of Step A6 without carrying out the process of transferring address information. Since the determination of Step A6 is "YES," storage 32 proceeds to the determination of the next Step A10.

Because the determination of Step A10 is "NO" in this case, i.e., the R/W request is a read request, storage 32 waits for the transfer of the update information of the desired data blocks in Step A11. During this interval as well, relay transfer device 2 successively transfers update information to storage 32. When the desired update information is transferred in (in the third transfer process in the figure), storage 32 executes the requested process (in this case, a read request) in Step A7.

Figure 19:
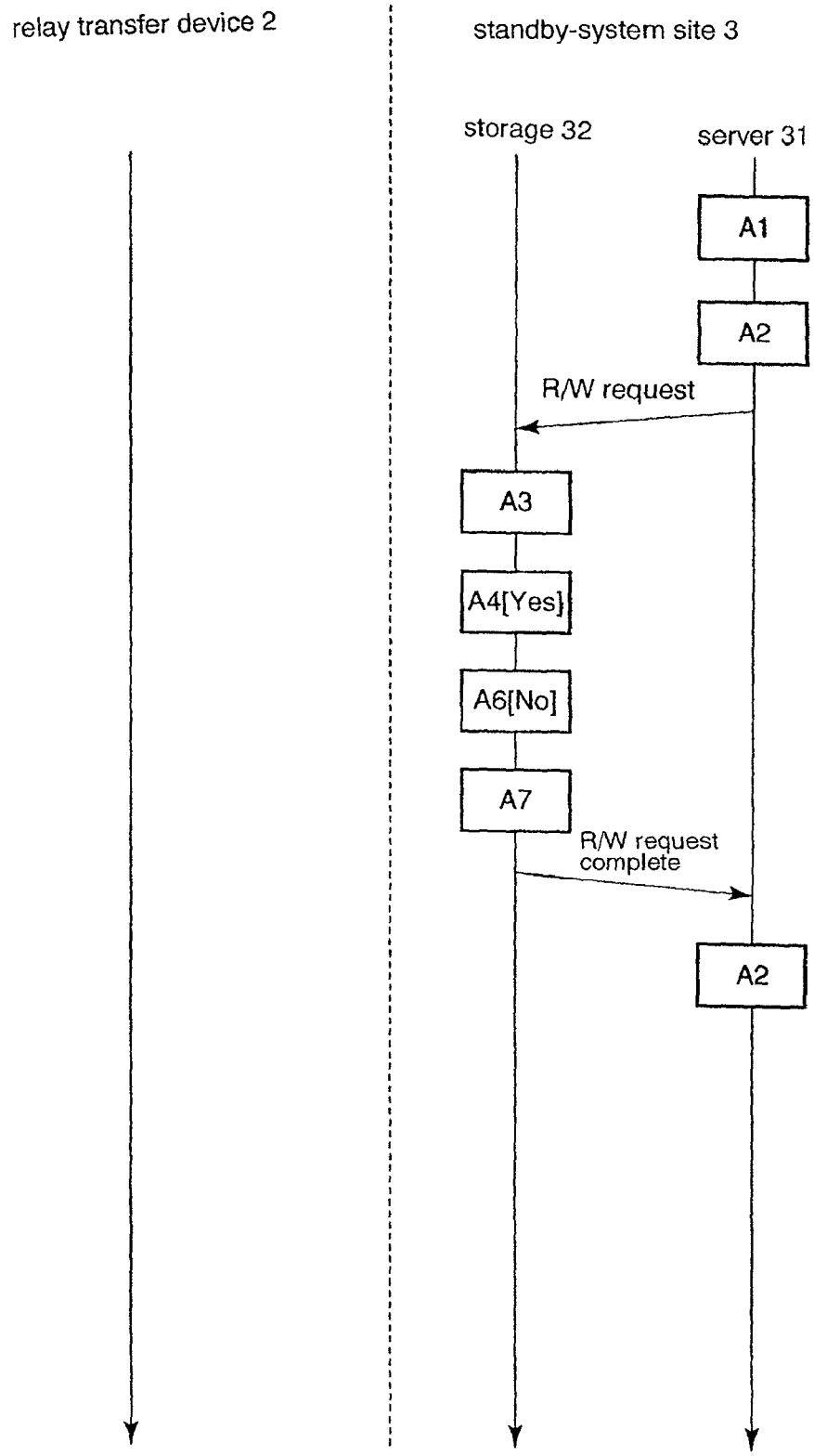
FIG. 19 is a sequence chart showing the inter-device operations when the determination of Step A4 is "YES" and the determination of Step A6 is "NO" in the operations shown in the flow chart of FIG. 16.

FIG. 19 is a sequence chart showing the inter-device operations when the determination of Step A4 is "YES" and the determination of Step A6 is "NO" in the operations that are shown in the flow chart of FIG. 16. Referring to FIG. 19, the determination of Step A4 is "YES," and the process therefore advances to the determination of Step A6 without carrying out the process for transferring address information. Because the determination of Step A6 is "NO" (i.e., there is no update information for the target address in relay transfer device 2), storage 32 immediately executes the requested process in Step A7.

As described in the foregoing explanation, according to the process of FIG. 16, a write request to standby-system site 3 is executed immediately but a read request is executed after waiting for regular transfer. This example of processing exhibits characteristics that approximate the disk access characteristics of using a typical cache in which, during reading, a disk is accessed if data are not present in a cache, and is therefore well suited to the processing of most applications.

In addition, the immediate transfer process contributes to the efficient execution of an application as long as the level of frequency is not high, but because it entails processes that have overhead, a concentration of requests in a short time interval may result in congested processing and may hinder the efficient execution of an application. In this example of processing, in an application having an access characteristic in which requests to read from the same data block are concentrated in a short time interval, waiting for regularly arranged transfers can ease the concentration of processing for immediate transfers.

Modification 2 of the First Embodiment

Figure 20:
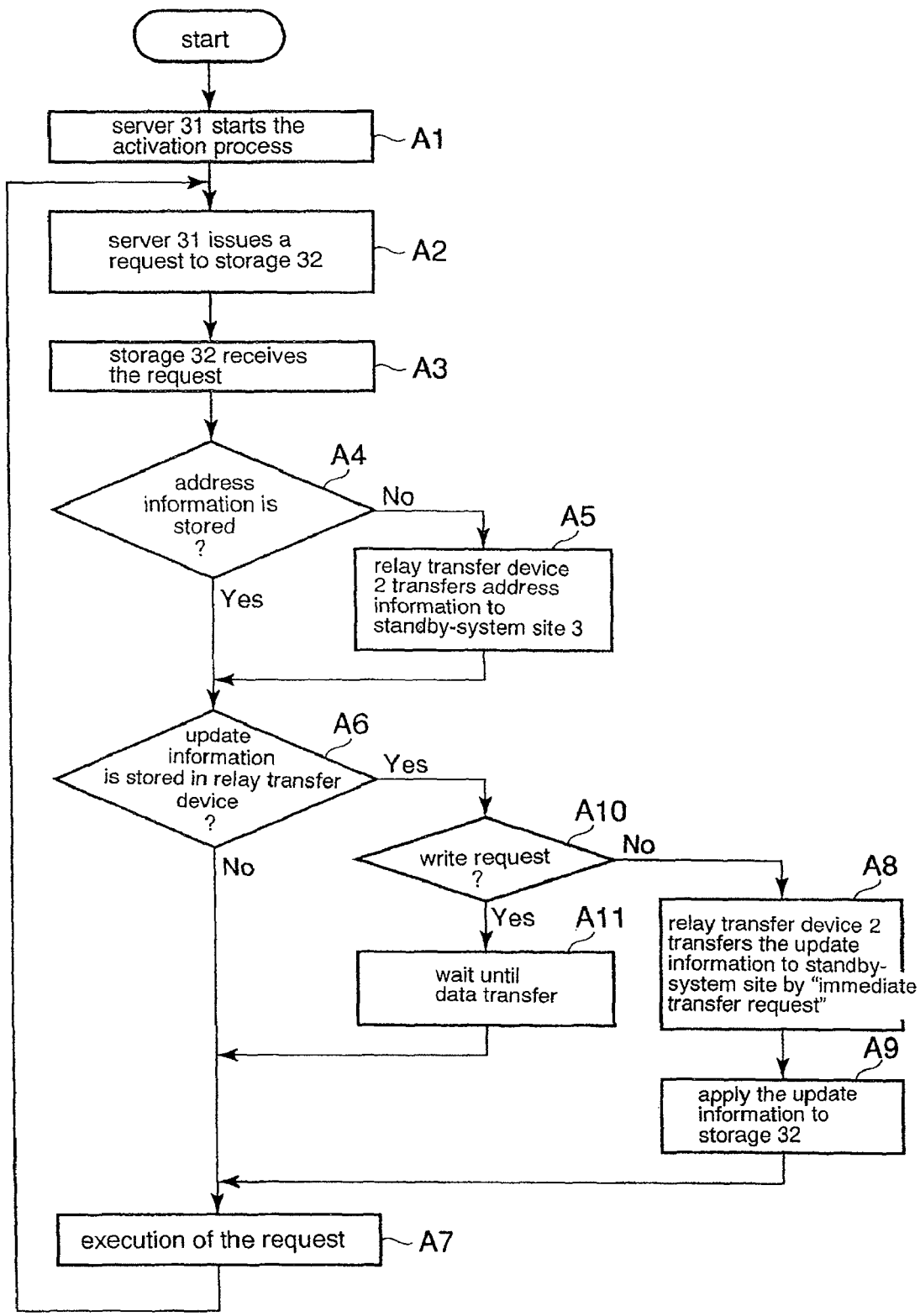
FIG. 20 is a flow chart showing yet another example of the processing in the first embodiment.

FIG. 20 is a flow chart showing another example of processing in the first embodiment. Referring to FIG. 20, the processing of Steps A1-A9 are similar to those shown in FIG. 16 (the example of Modification 1). In the flow chart of FIG. 20, if it is found in the determination of Step A10 that the R/W request command is a read request, the process advances to the processing of the same Steps A8 and A9 in FIG. 3. If the R/W request command is a write request, the process advances to the process of Step A11.

In other words, in contrast to Modification 1 in which an "immediate transfer process" is carried out if the R/W request command of standby-system site 3 is a write request and a "transfer waiting process" is carried out if the R/W request command is a read request, in Modification 2, an "immediate transfer process" is carried out if the R/W request command of standby-system site 3 is a read request, and a "transfer waiting process" is carried out if the R/W request command is a write request.

Figure 21:
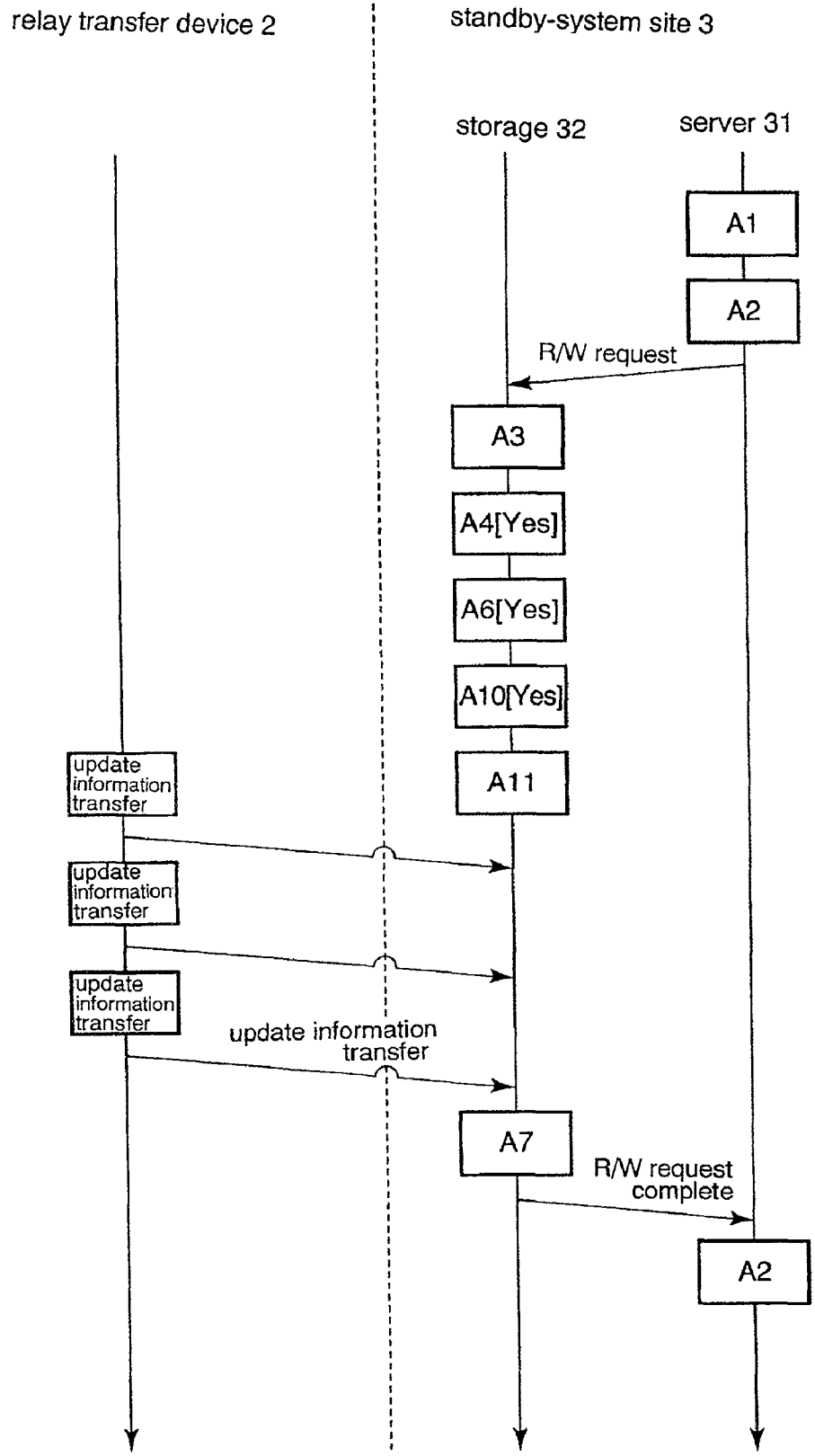
FIG. 21 is a sequence chart showing the inter-device operations when the determination of Step A4 is "YES," the determination of Step A6 is "YES," and the determination of Step A10 is "YES" in the operations shown in the flow chart of FIG. 20.

FIG. 21 is a sequence chart showing the inter-device operations when the determination of Step A4 is "YES," the determination of Step A6 is "YES," and the determination of Step A10 is "YES" in the operations that are shown in the flow chart of FIG. 20. Referring to FIG. 21, the process is the same as that of FIG. 18 as far as the determination of Step A10. Here, the determination in Step A10 is "YES" (i.e., a write request), and storage 32 therefore waits for the transfer of update information in Step A11 and then executes the requested process (in this case a write request) in Step A7.

Figure 22:
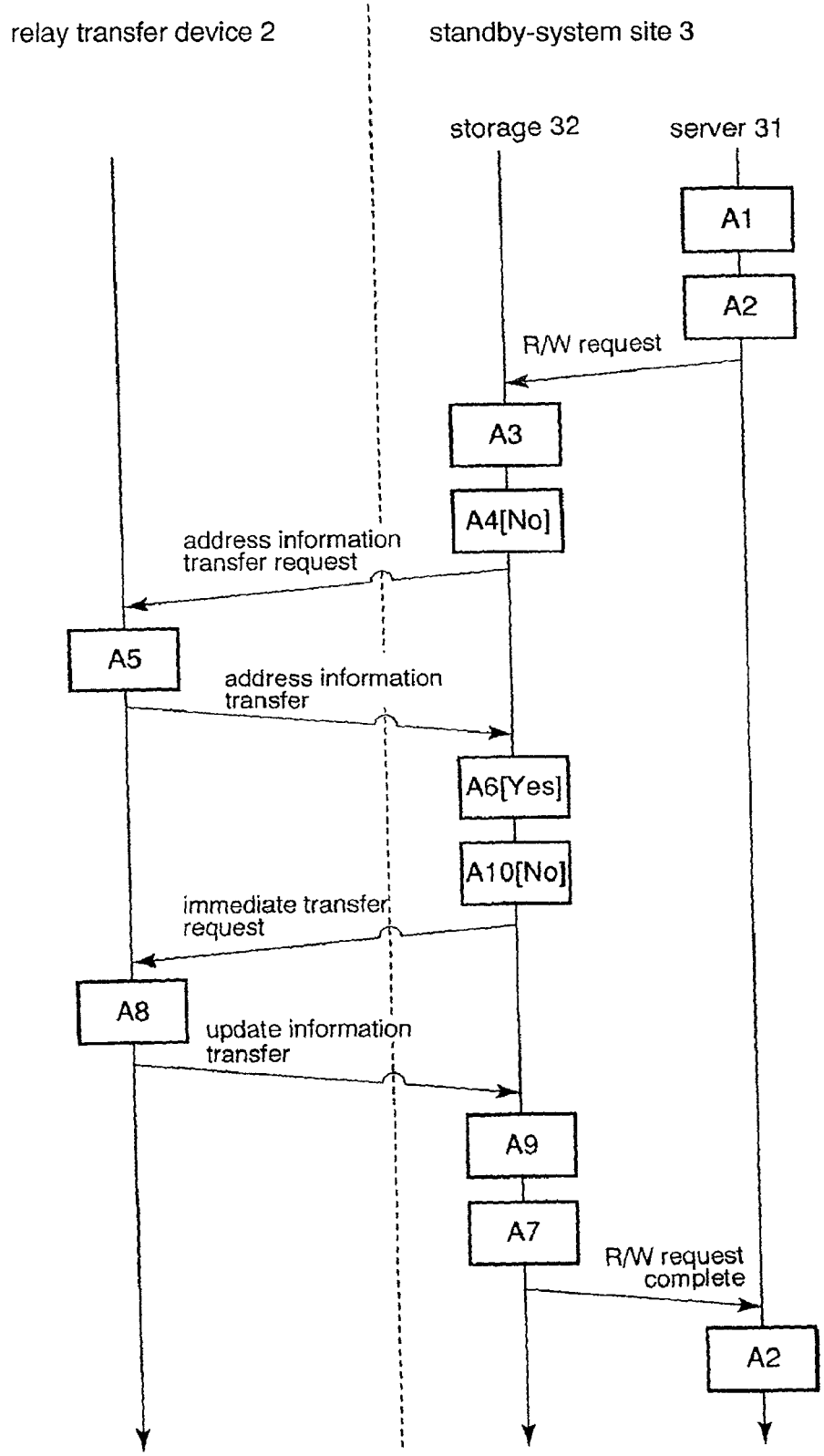
FIG. 22 is a sequence chart showing the inter-device operations when the determination of Step A4 is "NO," the determination of Step A6 is "YES," and the determination of Step A10 is "NO" in the operations shown in the flow chart of FIG. 20.

FIG. 22 is a sequence chart showing the inter-device operations when the determination of Step A4 is "NO," the determination of Step A6 is "YES," and the determination of Step A10 is "NO" in the operations that are shown in the flow chart of FIG. 20. Referring to FIG. 22, the process is the same as that of FIG. 17 as far as the determination of Step A10. In this case, the determination of Step A10 is "NO" (i.e., a read request), and storage 32 therefore immediately acquires update information in Steps A8 and A9 as with the write request in FIG. 17, and executes the requested process in Step A7.

As described above, an immediate transfer process contributes to the efficient execution of an application as long as the level of frequency is not high, but entails processes that become overhead and therefore, when concentrated in a short time interval, may cause processing to become congested and thus hinder the efficient execution of the application. In this example of processing, waiting for regularly arranged transfers can ease the concentration of processing for immediate transfers in an application having an access characteristic in which requests to write to the same data block are concentrated in a short time interval.

Modification 3 of the First Embodiment

Figure 23:
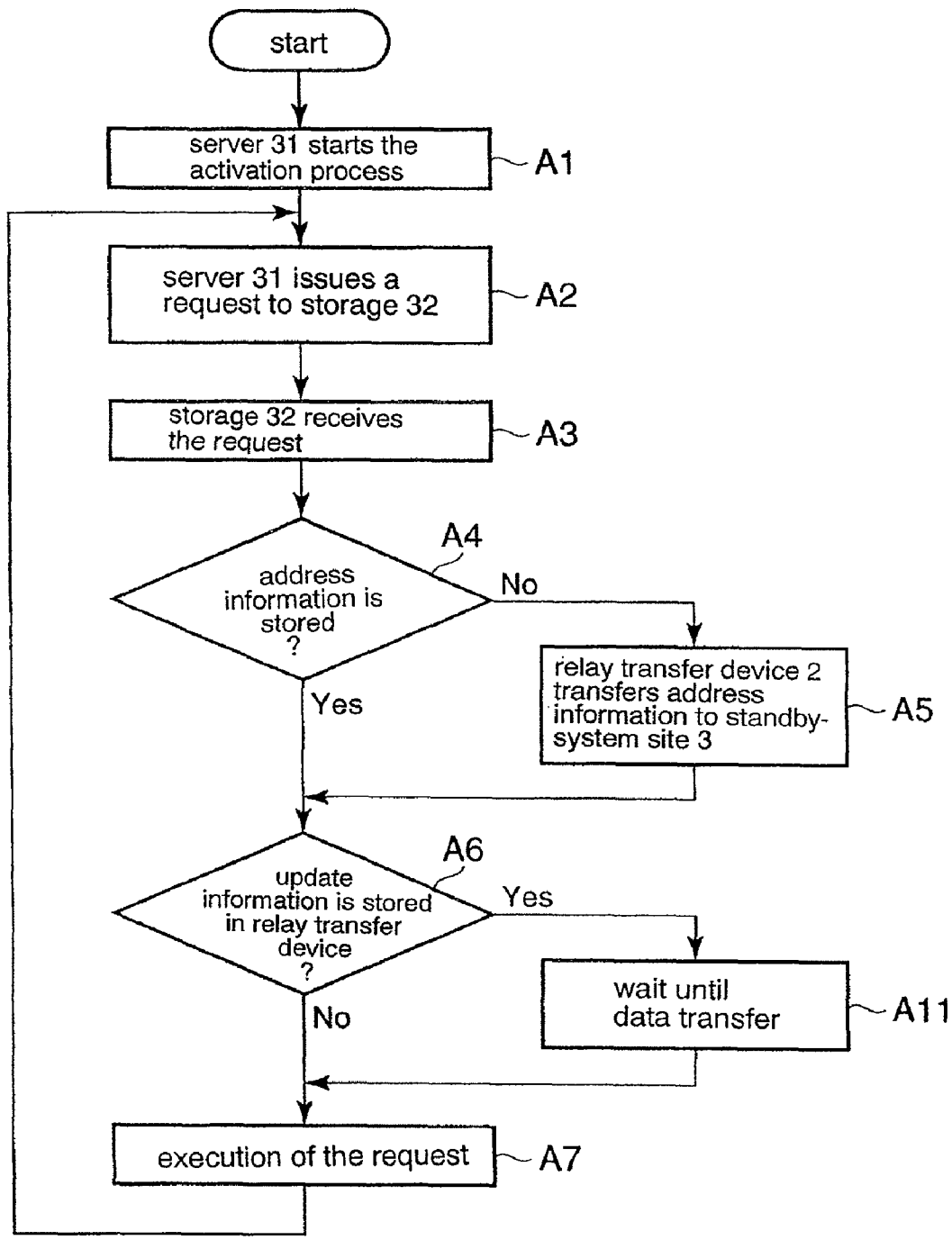
FIG. 23 is a flow chart showing yet another example of the processing in the first embodiment.

FIG. 23 is a flow chart showing yet another example of processing in the first embodiment. Referring to FIG. 23, the processing of Steps A1-A7 and A11 is the same as that in Modifications 1 and 2 that are shown in FIGS. 16 and 20. In the flow chart of FIG. 23, when update information of data blocks of addresses that are the target of a R/W request is found to exist in temporary storage unit 202 in the determination of Step A6, request execution processor 302 advances to the process of Step A11 that is also included in FIGS. 16 and 20.

In other words, in contrast to FIG. 3 in which an "immediate transfer process" is carried out for both write and read requests, a "transfer waiting process" is carried out for both a write request and a read request in Modification 3 of FIG. 23.

Figure 24:
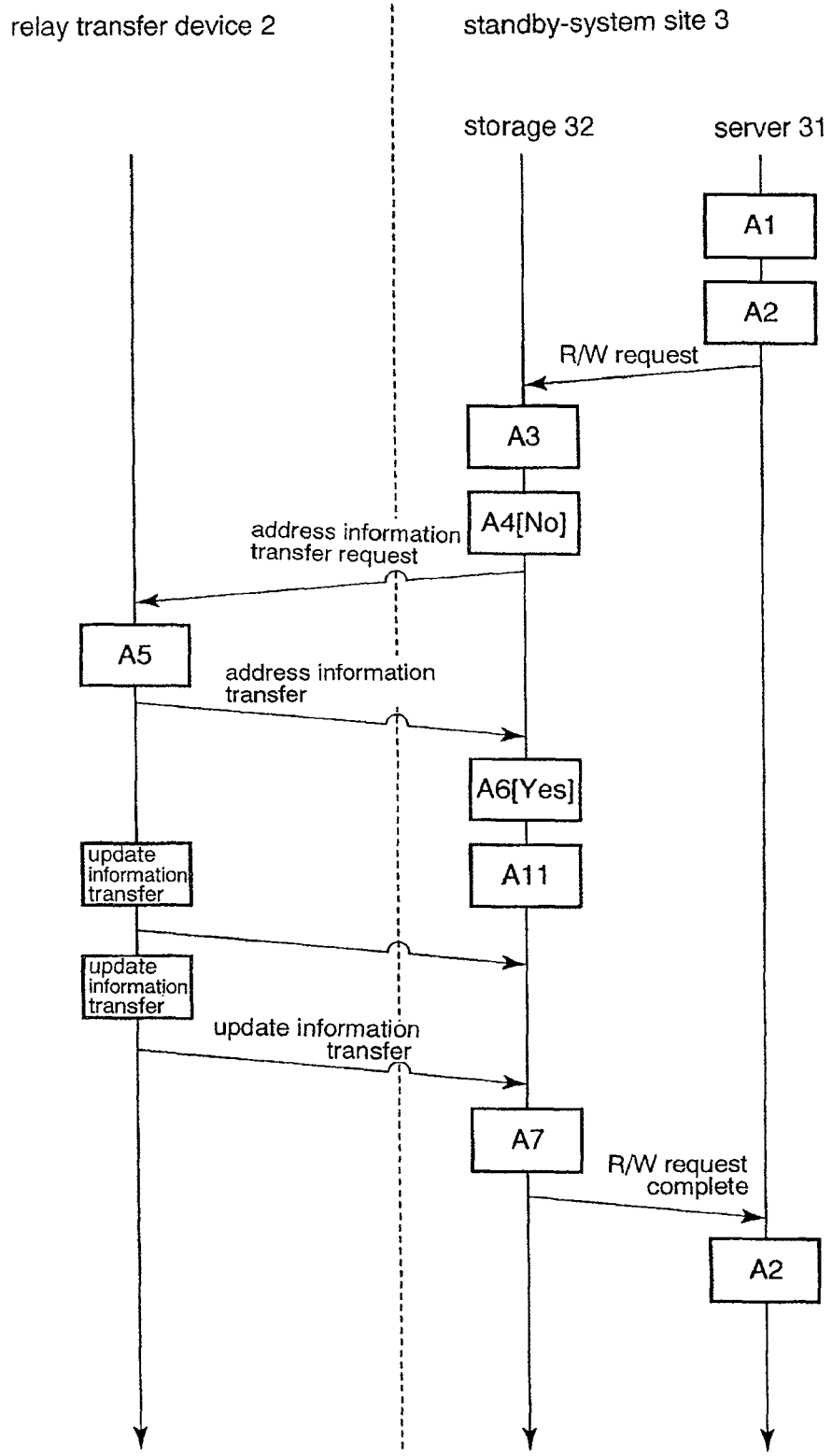
FIG. 24 is a sequence chart showing the inter-device operations when the determination of Step A4 is "NO" and the determination of Step A6 is "YES" in the operations shown in the flow chart of FIG. 23.

FIG. 24 is a sequence chart showing the inter-device operations when the determination in Step A4 is "NO" and the determination of Step A6 is "YES" in the operations that are shown in the flow chart of FIG. 23. Referring to FIG. 24, the processes are the same as those of FIG. 17 as far as the determination of Step A6. In this case, "YES" is determined in Step 6 (i.e., update information of the desired data blocks exists in relay transfer device 2), and storage 32 therefore waits for the transfer of the update information in Step A11, and then executes the requested process in Step A7.

Figure 25:
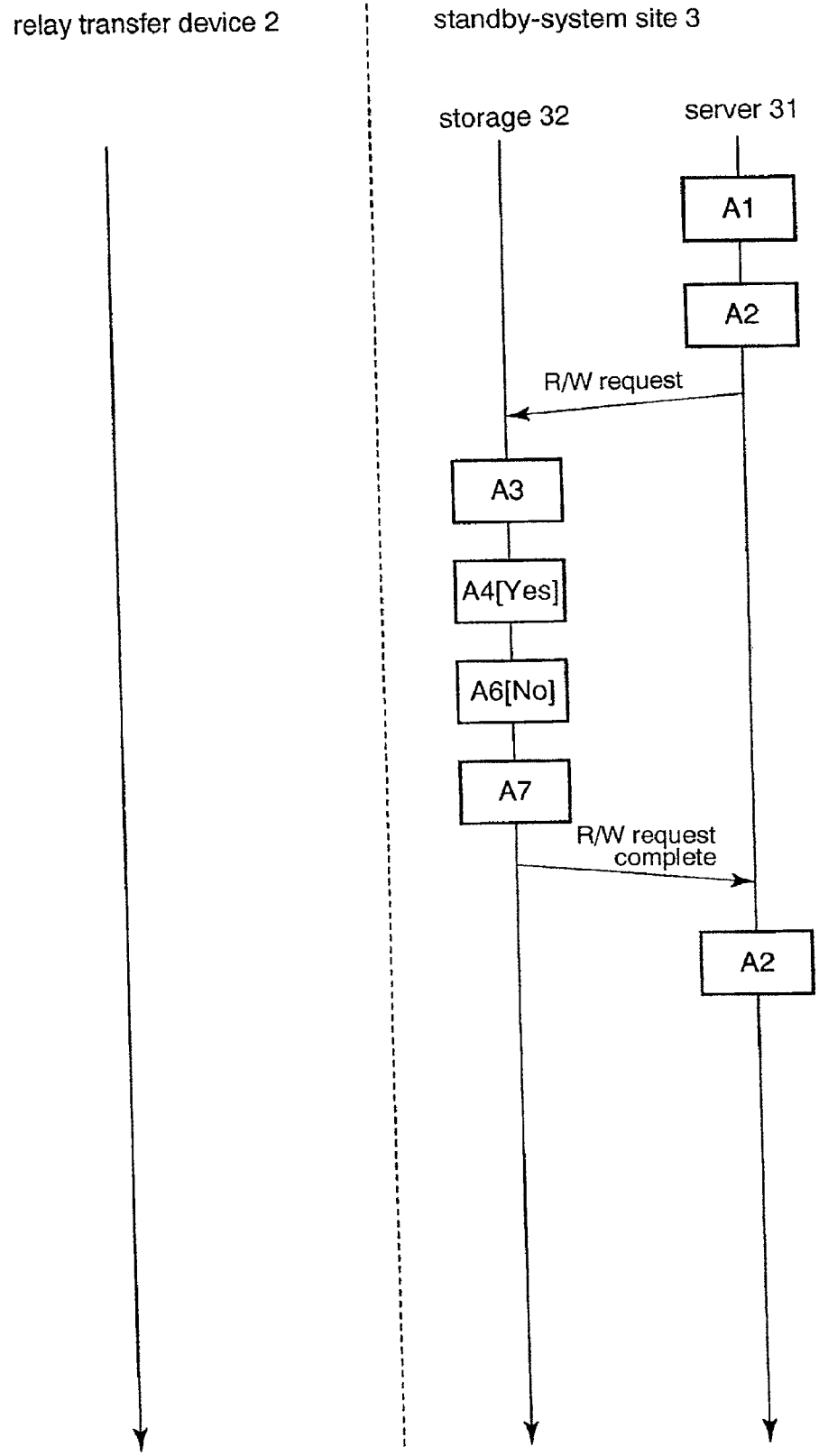
FIG. 25 is a sequence chart showing the inter-device operations when the determination of Step A4 is "YES" and the determination of Step A6 is "NO" in the operations shown in the flow chart of FIG. 23.

FIG. 25 is a sequence chart showing the inter-device operations when the determination of Step A4 is "YES" and the determination of Step A6 is "NO" in the operations that are shown in the flow chart of FIG. 23. When the determination of Step A4 is "YES" in this Modification 3, the processing is the same as that of Modification 1 that is shown in FIG. 19.

Figure 26:
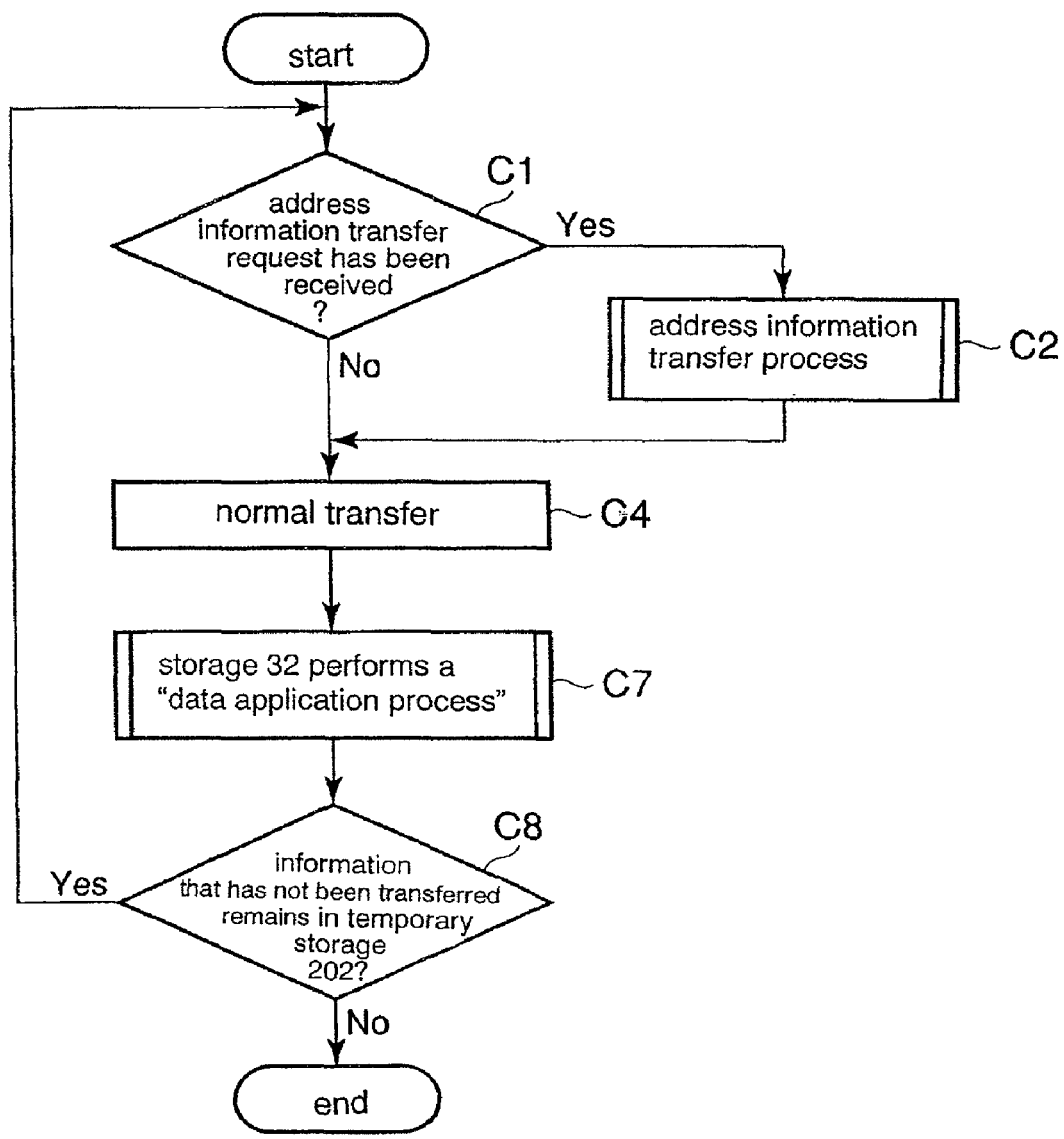
FIG. 26 is a flow chart for explaining the operations of the relay transfer device in Modification 3 of the first embodiment.

FIG. 26 is a flow chart for explaining the operation of a relay transfer device in Modification 3 of the first embodiment. Processing in each step in FIG. 26 is the same as that shown in FIG. 10. The point of difference between the flow chart of FIG. 26 and the flow chart of FIG. 10 is that, when an acquisition request is not received in the determination of Step C1 and after the process of Step C2, the process advances unconditionally to the process of Step C4 without carrying out the determination of Step C3. In other words, an "immediate transfer process" does not occur in the present Modification 3 as shown in FIG. 26, and relay transfer device 2 therefore unconditionally performs data transfer as usual without determining the existence of immediate transfer requests.

Figure 27:
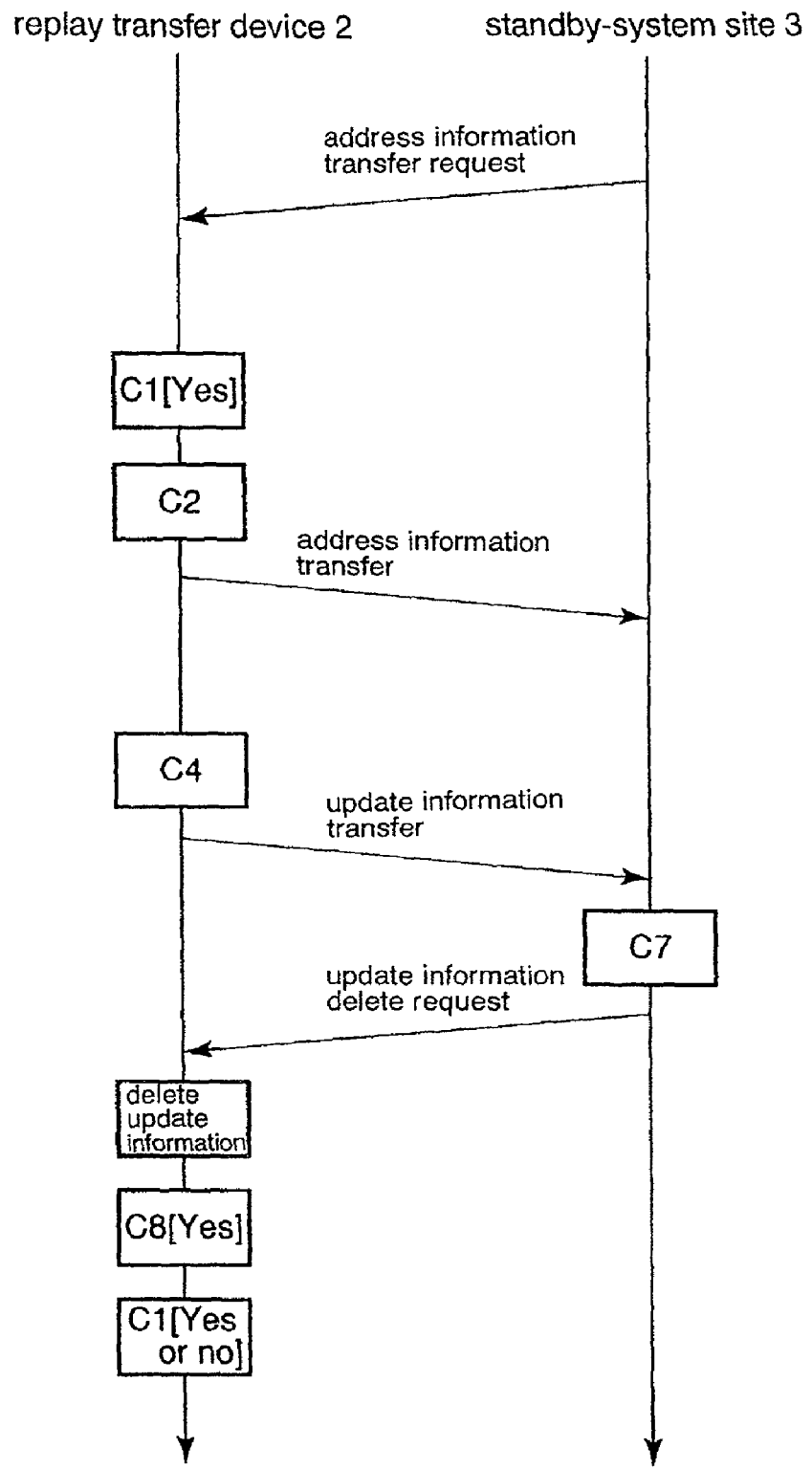
FIG. 27 is a sequence chart of the inter-device operations when the determination of Step C1 is "YES" in the operations that are shown in the flow chart of FIG. 26.

FIG. 27 is a sequence chart showing the inter-device operations when the determination of Step C1 is "YES" in the operations that are shown in the flow chart of FIG. 26. Referring to FIG. 27, in this case, standby-system site 3 sends an address information transfer request to relay transfer device 2 for some reason.

Relay transfer device 2 determines "YES" in the determination of Step C1 (i.e., an address information transfer request has arrived), and therefore performs an address information transfer process in Step C2 to transfer the address information to standby-system site 3.

Relay transfer device 2 further successively transfers update information to standby-system site 3. Standby-system site 3, having received the update information, applies this information to its own site in Step C7 and submits a request to relay transfer device 2 to delete the update information that has been applied. Relay transfer device 2, having received this request, deletes the update information and proceeds to the determination of Step C8.

Figure 28:
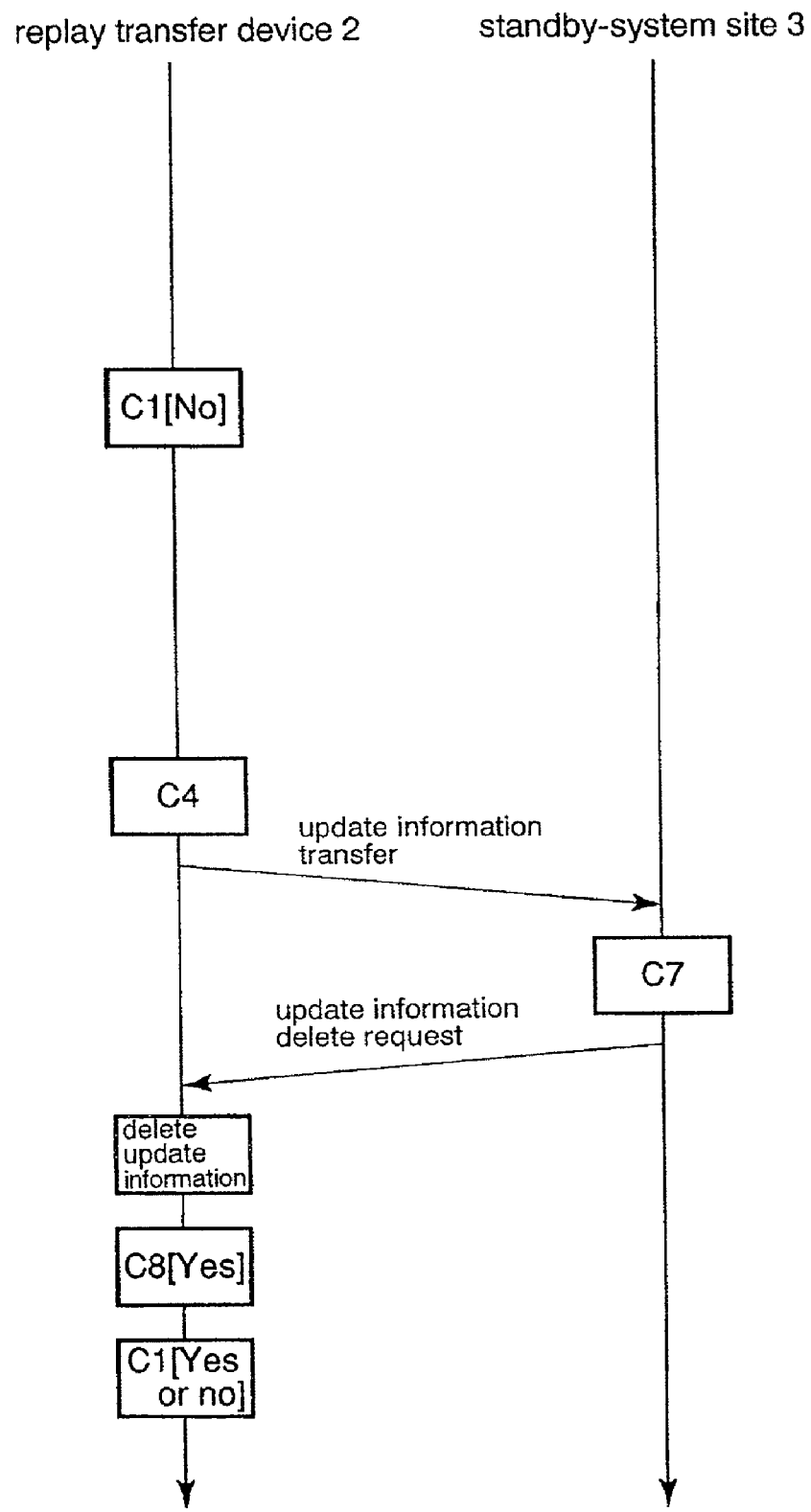
FIG. 28 is a sequence chart of the inter-device operations when the determination of Step C1 is "NO" in the operations that are shown in the flow chart of FIG. 26.

FIG. 28 is a sequence chart showing the inter-device operations when the determination of Step C1 is "NO" in the operations that are shown in the flow chart of FIG. 26. Referring to FIG. 28, in this case, standby-system site 3 does not send an address information transfer request to relay transfer device 2.

Relay transfer device 2 determines "NO" in the determination of Step C1 (in other words, an address information transfer request has not arrived), and therefore advances to the process of Step C4 and thereafter performs the same processes as in FIG. 27.

As described in the foregoing explanation, according to the present modification, a requested process that can be executed without acquiring update information is carried out immediately, and a process that requires the acquisition of update information is processed after waiting for the transfer of the update information, whereby standby-system site 3 can quickly begin a service without carrying out an immediate transfer process and whereby no reduction in access performance due to the congestion of immediate transfer processes occurs.

In addition, the lack of the process by which storage 32 determines a write request or a read request and the process by which relay transfer device 2 determines whether an immediate transfer request has arrived allows a reduction in the amount of processing and an improvement in access performance.

Modification 4 of the First Embodiment

Figure 29:
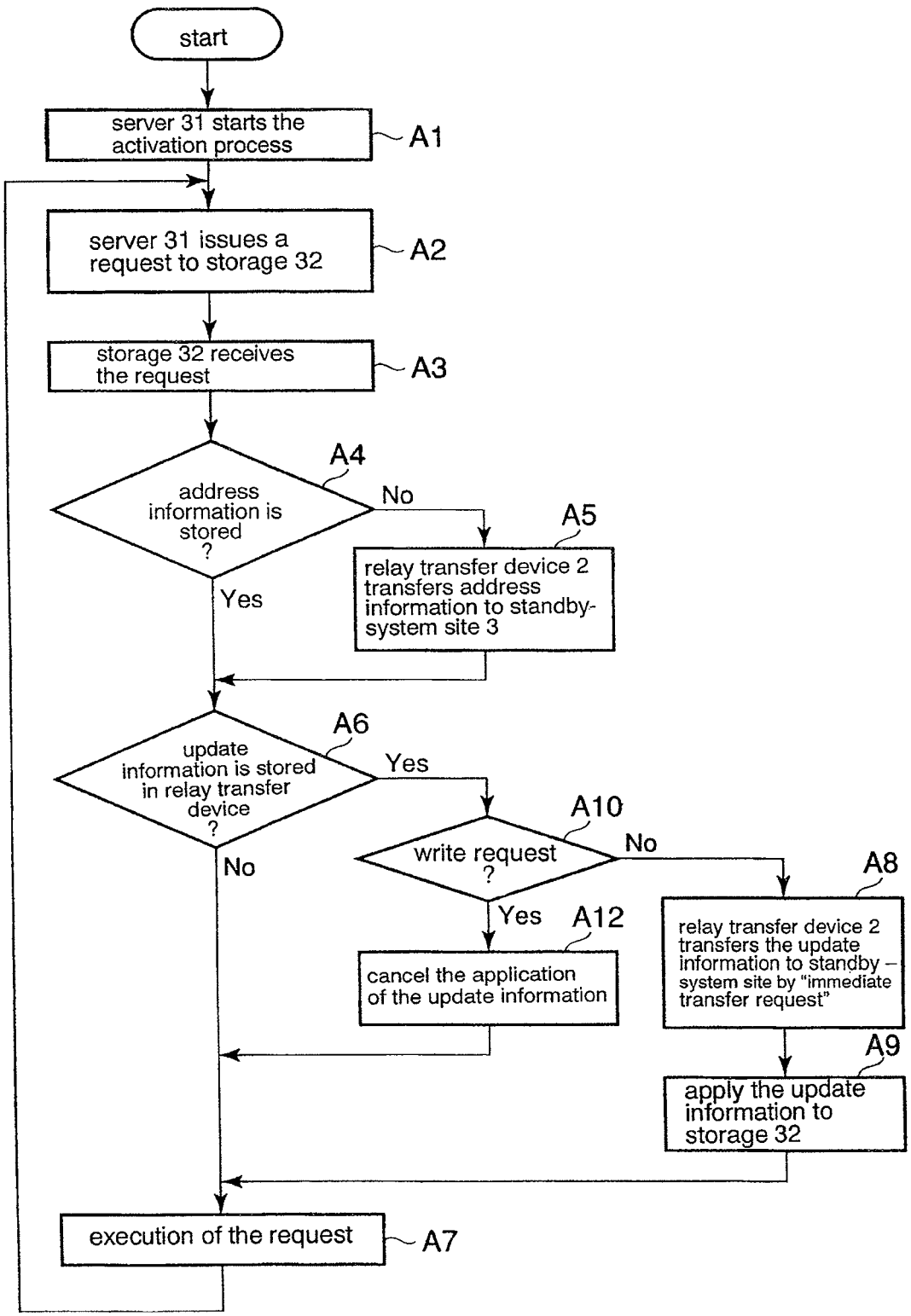
FIG. 29 is a flow chart showing yet another example of the processing in the first embodiment.

FIG. 29 is a flow chart showing yet another example of processing in the first embodiment. Referring to FIG. 29, this modification is the same as Modification 2 that is shown in FIG. 20 from the process of Step A1 up to the process of Step A10. In the flow chart of FIG. 29, if it is found in the determination of Step A10 that the R/W request command is a read request, the operation advances to the process of Steps A8 and A9 as in FIG. 3. On the other hand, if the R/W request command is a write request, standby-system site 3 carries out a prohibition process in which, when the data of the update for the data blocks of addresses that are the target of this write request are transferred in from relay transfer device 2, the application of these data to the portion that is rewritten by the write request (the canceled portion) is canceled and not applied to data storage unit 306 (Step A12), and the process advances to the process Step A7. As an example of the prohibition process, a process can be considered in which request execution processor 302 confers flags, which indicate the prohibition of the application of data that have been transferred in to address information storage unit 303, to data blocks that are the target of a write request. In this case, data application unit 305 checks the flags upon receiving data from data acquisition unit 304 and determines whether or not these data are to be applied to data storage unit 306.

In FIG. 29, if the R/W request command is found to be a read request in the determination of Step A10, updated data that are present in relay transfer device 2 are acquired (Step A8) and applied to data storage unit 306 (Step A9), following which the read process is executed (Step A7). However, the present invention is not limited to this form. As another example, a "transfer waiting process" may be carried out for a read request as in Modification 1.

Figure 30:
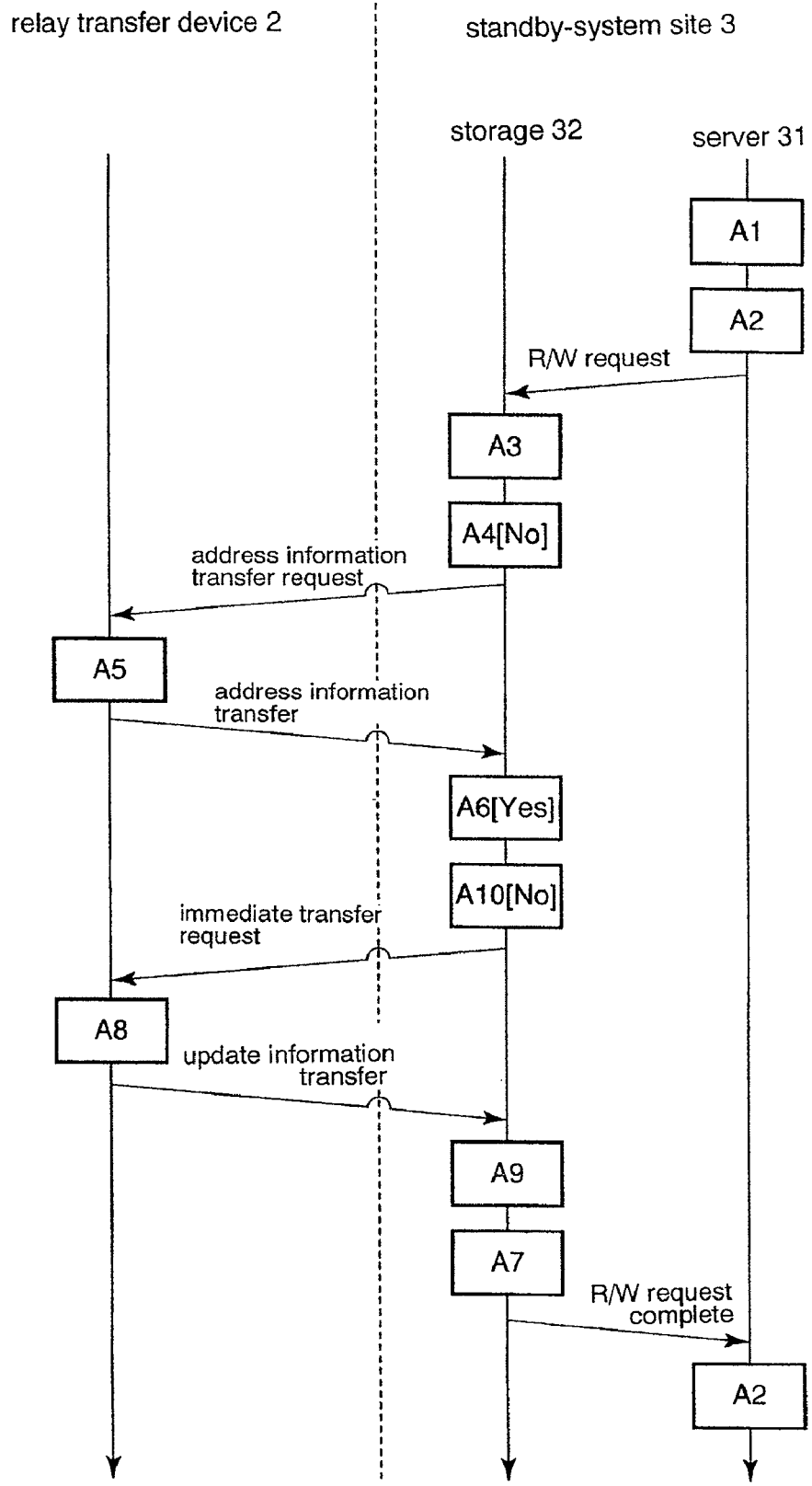
FIG. 30 is a sequence chart of the inter-device operations when the determination of Step A4 is "NO," the determination of Step A6 is "YES," and the determination of Step A10 is "NO" in the operations that are shown in the flow chart of FIG. 29.

FIG. 30 is a sequence chart showing inter-device operations when the determination of Step A4 is "NO," the determination of Step A6 is "YES," and the determination of Step A10 is "NO" in the operations that are shown in the flow chart of FIG. 29. FIG. 30 is an operation that is substantially the same as the operation that is shown in FIG. 17, but differs only in that an immediate transfer of update information is carried out when the determination of Step A10 is "NO."

Figure 31:
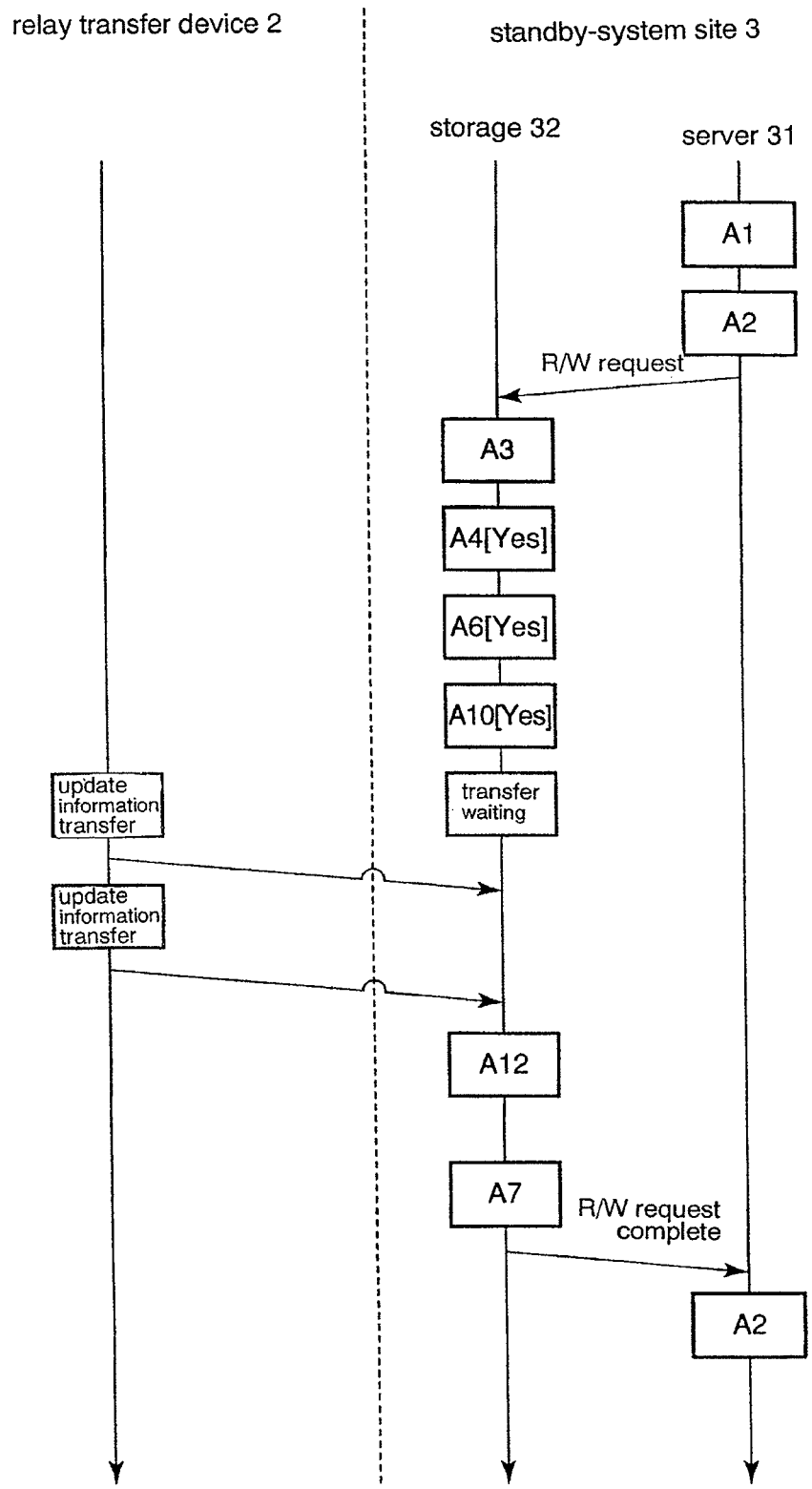
FIG. 31 is a sequence chart of the inter-device operations when the determination of Step A4 is "YES," the determination of Step A6 is "YES," and the determination of Step A10 is "YES" in the operations that are shown in the flow chart of FIG. 29.

FIG. 31 is a sequence chart of the inter-device operations when the determination of Step A4 is "YES," the determination of Step A6 is "YES," and the determination of Step A10 is "YES" in the operations that are shown in the flow chart of FIG. 29. In FIG. 31, the processing up to Step A6 is the same as in FIG. 18. In this case, "YES" is determined in Step A10, and storage 32 therefore cancels the application of the update information of the target data blocks in Step A12. In FIG. 30, the update information of target data blocks is transferred in two transfers of update information, and storage 32 does not apply this update information to itself. Storage 32 then executes the requested process in Step A7 and sends notification of the completion of the R/W request to server 31.

Figure 32:
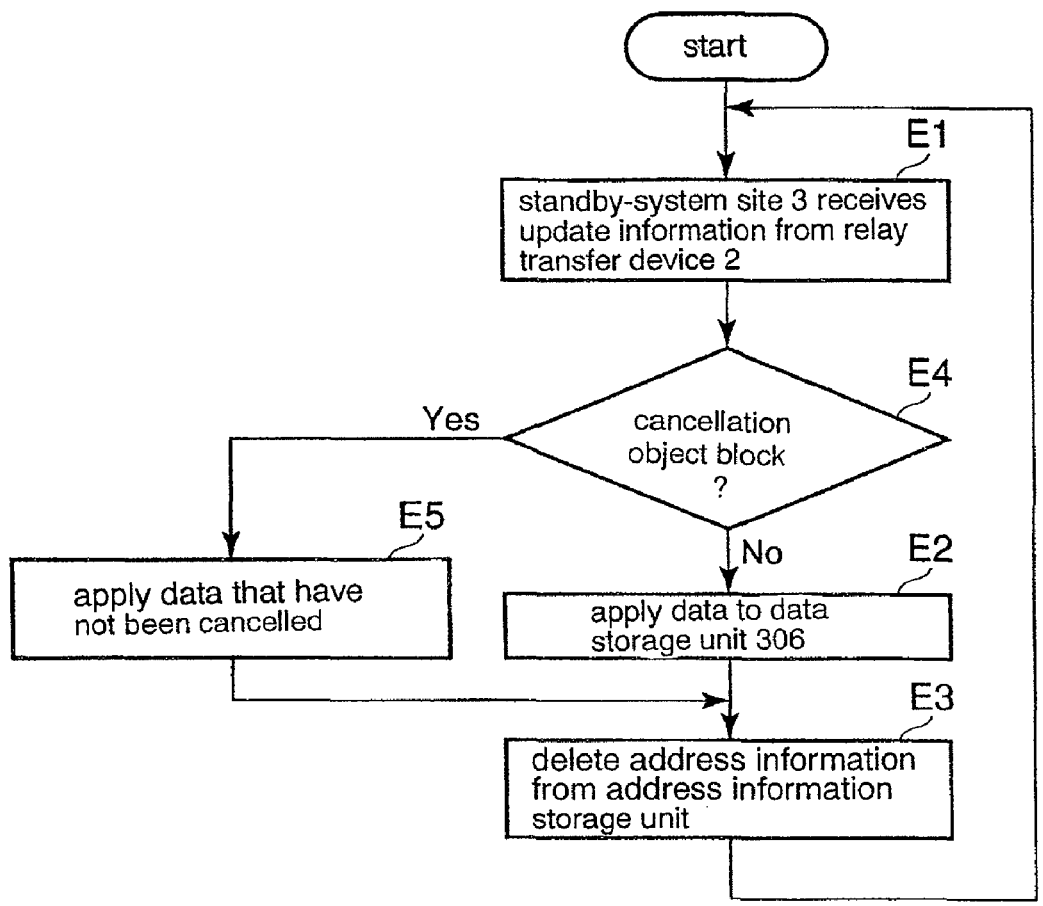
FIG. 32 is a flow chart for explaining the data application process in Modification 4 of the first embodiment.

FIG. 32 is a flow chart for explaining the data application process in Modification 4 of the first embodiment. In FIG. 32, the processing of Steps E1-E3 is the same as that shown in FIG. 15. In the flow chart of FIG. 32, in contrast to FIG. 15, after data acquisition unit 304 has received update information from relay transfer device 2 in Step E1, data application unit 305 determines whether a prohibition process has been carried out on target data blocks on which the data of this update information are to be applied, i.e., whether these data are the object of cancellation or not (Step E4). This determination can be realized by checking for flags. If these data are not the object of cancellation, the process advances to Step E3. On the other hand, if these data are the object of cancellation, the data are applied only to portions that have not been cancelled and are not applied to canceled portions (Step E5), following which the process advances to Step E3.

Figure 33:
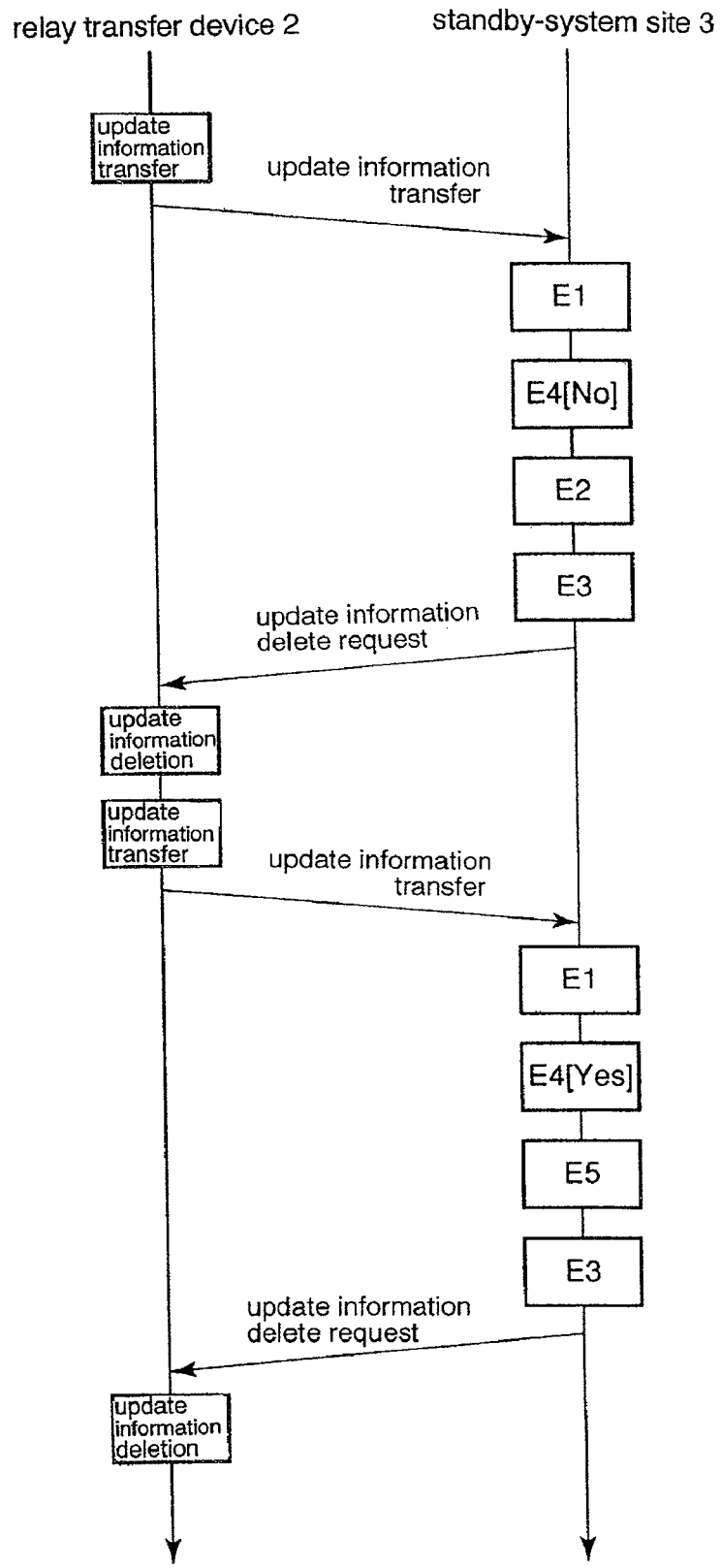
FIG. 33 is a sequence chart showing the inter-device operations when the determination of the first Step E4 is "NO" and the determination of the second Step E4 is "YES" in the operations that are shown in the flow chart of FIG. 32.

FIG. 33 is a sequence chart showing the inter-device operations when the determination of the first Step E4 is "NO" and the determination of the second Step E4 is "YES" in the operations that are shown in the flow chart of FIG. 32. Referring to FIG. 33, relay transfer device 2 transfers update information to standby-system site 3 for some reason. Standby-system site 3 receives the update information in Step E1 and determines whether these data are for a data block that is the object of cancellation in Step E4. In this case, the first determination is "NO," and standby-system site 3, after applying the update information to itself in Step E2, submits a request in Step E3 to relay transfer device 2 to delete the update information. Relay transfer device 2 deletes the update information in accordance with the request.

Relay transfer device 2 again transfers update information to standby-system site 3. Standby-system site 3 again receives the update information in Step E1, and carries out the determination of Step E4. This time, "YES" is determined in the determination of Step E4, and standby-system site 3 therefore, of the update information, applies to itself only data other than the cancelled portion in Step E5, and then submits a request to relay transfer device 2 in Step E3 to delete the update information. Relay transfer device 2 deletes the update information in accordance with this request.

As described in the foregoing explanation, according to the present modification, standby-system site 3, in response to a write request command, performs the write request process after prohibiting the application of data that are subsequently transferred if update information for data blocks that are the target of the write request exist in relay transfer device 2. This modification therefore does not cause a drop in the performance of writing from server 31 to storage 32 and is advantageous when there are numerous write requests.

Modification 5 of the First Embodiment

Modification 5 is directed to, when there has been a write request in standby-system site 3, submitting a request from standby-system site 3 to relay transfer device 2 to cancel the transfer of that portion of update information, and the configuration of standby-system site 3 and relay transfer device 2 is therefore different from the configuration shown in FIG. 2.

Figure 34:
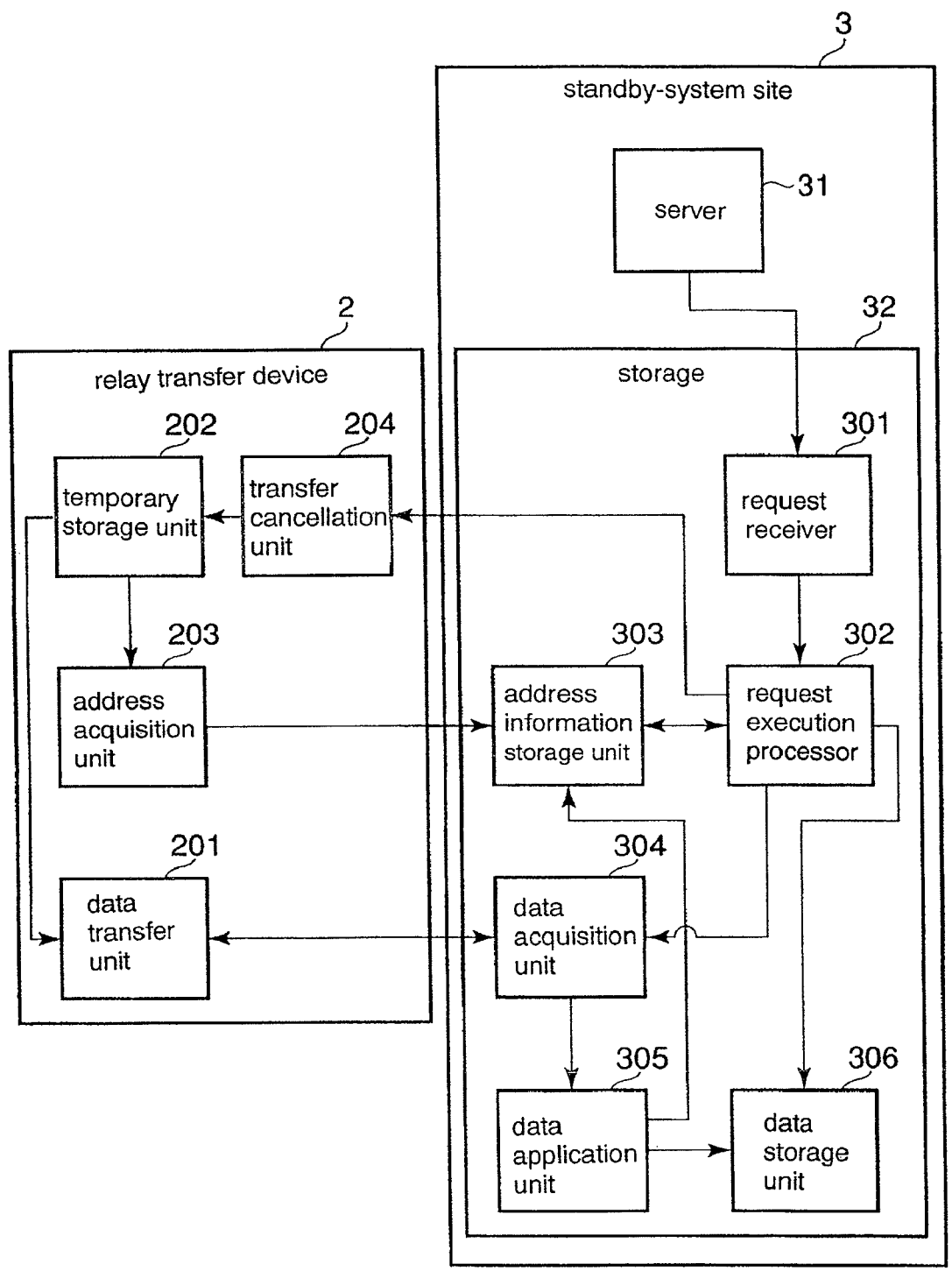
FIG. 34 is a block diagram showing details of the relay transfer device and standby-system site in Modification 5 of the first embodiment.

FIG. 34 is a block diagram showing the details of the configuration of the relay transfer device and the standby-system site in Modification 5 of the first embodiment. Relay transfer device 2 of the present modification differs from the device shown in FIG. 2 in that it includes transfer cancellation unit 204 in addition to data transfer unit 201, temporary storage unit 202, and address acquisition unit 203. Data transfer unit 201, temporary storage unit 202, and address acquisition unit 203 are equivalent to the components shown in FIG. 2.

As with the site shown in FIG. 2, standby-system site 3 of the present modification includes server 31 and storage 32. In addition, as with the component shown in FIG. 2, storage 32 includes: request receiver 301, request execution processor 302, address information storage unit 303, data acquisition unit 304, data application unit 305, and data storage unit 306.

As the points of difference between the present modification and FIG. 2, in response to a write request command in standby-system site 3, standby-system site 3 applies this command to data storage unit 306, and relay transfer device 2 cancels the transfer to standby-system site 3 of the update information of data blocks that are the target of this command.

For this purpose, request execution processor 302 of storage 32 of standby-system site 3, in the processing for a write request, sends to transfer cancellation unit 204 of relay transfer device 2 the address information that is the target of the write request and a request indicating cancellation of the data transfer that takes this address as the object.

Transfer cancellation unit 204 cancels the transfer of data that are the object of address information that has been received from request execution processor 302. As an example of cancellation, transfer cancellation unit 204 may delete the update information of the target address from temporary storage unit 202. Alternatively, transfer cancellation unit 204 may for example confer a flag indicating that transfer is not to be carried out to update information that corresponds to the address information that has been received from standby-system site 3. In this case, data transfer unit 201 does not perform transfer of update information to which such a flag has been conferred.

Figure 35:
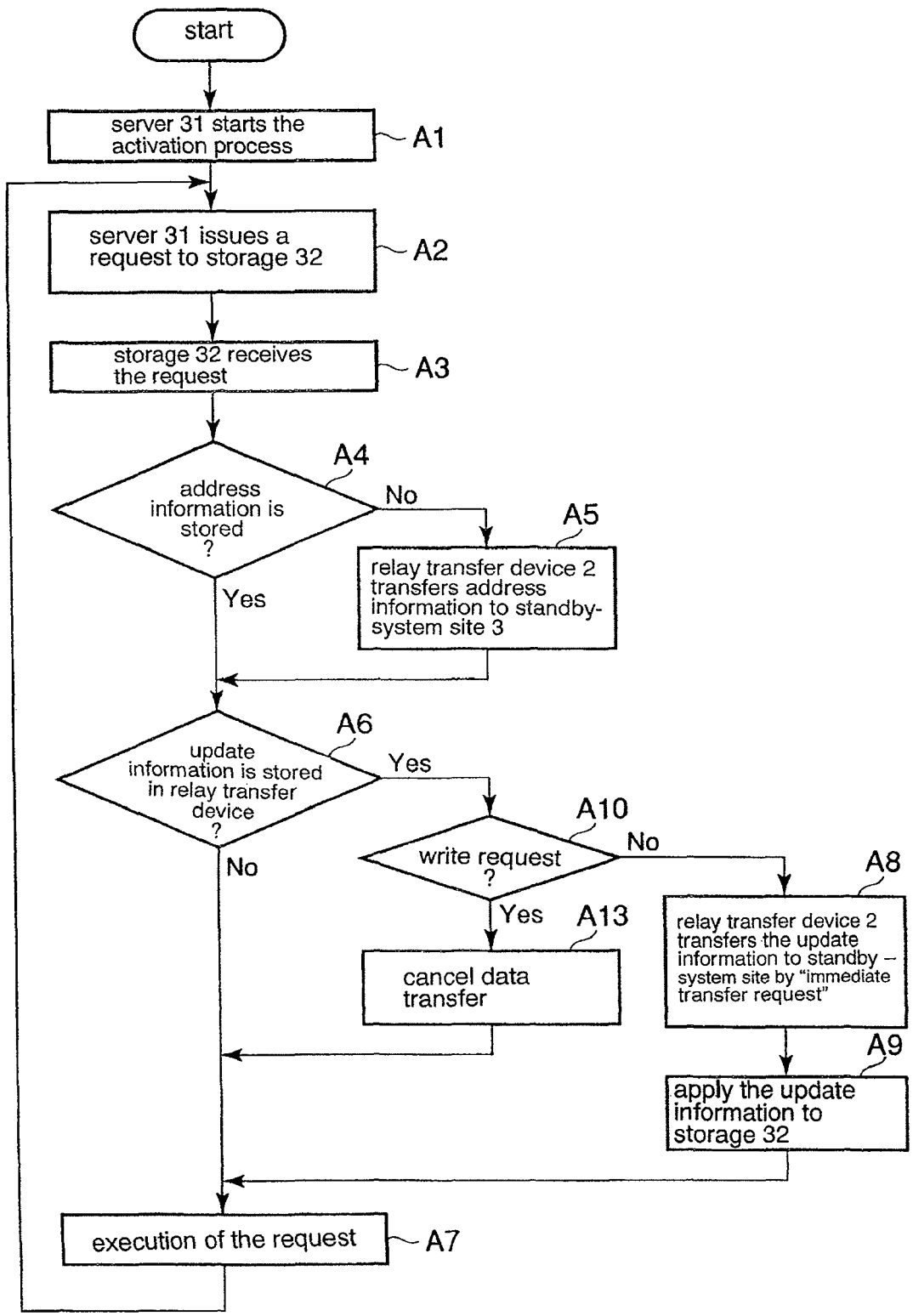
FIG. 35 is a flow chart for explaining the operations of the replication system of Modification 5 in the first embodiment.

FIG. 35 is a flow chart for explaining the operations of the replication system of this Modification 5 in the first embodiment. For a read request in Modification 5, a "transfer waiting process" may be performed as in Modification 1, or an "immediate transfer process" may be performed as in Modification 2, but in FIG. 35, an "immediate transfer process" is performed as an example.

Referring to FIG. 35, the processes of Steps A1-A10 are similar to the processes shown in FIG. 20. In the flow chart of FIG. 35, if a read request is determined in Step A10, the process advances to the processes of Steps A8 and A9 that are similar to FIG. 20 and the update information of relay transfer device 2 is immediately applied in standby-system site 3.

On the other hand, if the request is determined to be a write request command, request execution processor 302 of storage 32 in Step A13 sends to transfer cancellation unit 204 of relay transfer device 2 the address information that is the target of this command and a request to cancel transfer. Transfer cancellation unit 204 of relay transfer device 2 then cancels the transfer of data blocks that correspond to these addresses.

Figure 36:
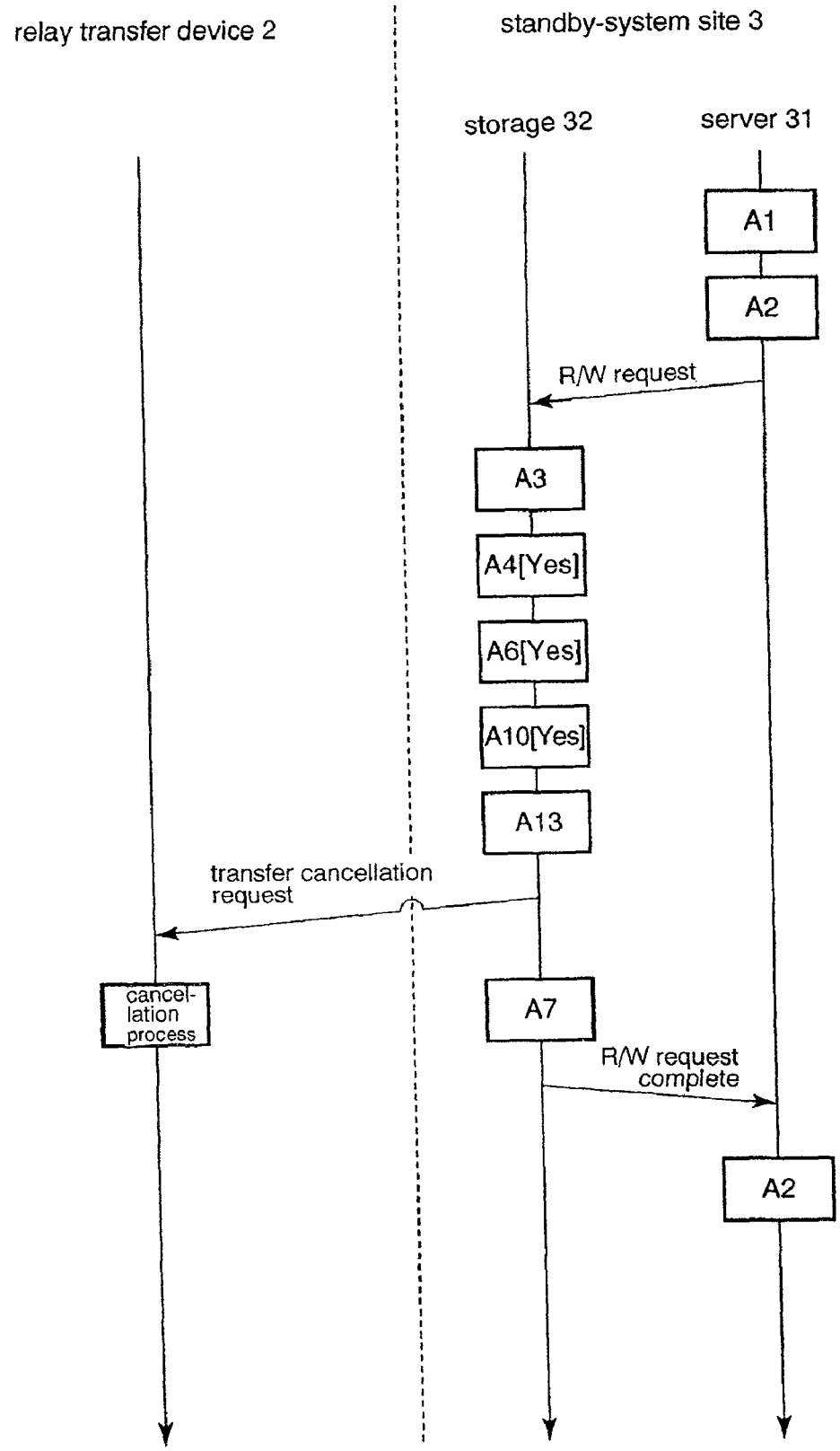
FIG. 36 is a sequence chart showing the inter-device operations when the determination of Step A4 is "YES," the determination of Step A6 is "YES," and the determination of Step A10 is "YES" in the operations that are shown in the flow chart of FIG. 35.

FIG. 36 is a sequence chart showing inter-device operations when the determination of Step A4 is "YES," the determination of Step A6 is "YES," and the determination of Step A10 is "YES" in the operations that are shown in the flow chart of FIG. 35. Referring to FIG. 36, the processes up to Step A10 are the same as the processes in FIG. 31. In this case, "YES" is determined in the determination of Step A10, and storage 32 therefore sends a request in Step A13 to relay transfer device 2 to cancel transfer. Storage 32 then executes the requested process in Step A7 and sends notification of the completion of the R/W request to server 31.

Relay transfer device 2, having received the request to cancel transfer, cancels the transfer of, of the update information that is to be transferred to standby-system site 3, the update information of the addresses that are the object of the command.

As described in the foregoing explanation, according to the present modification, when server 31 of standby-system site 3 issues a write request command, storage 32 of standby-system site 3 submits a request to relay transfer device 2 not to transfer update information that is the target of this command, transfer cancellation unit 204 of relay transfer device 2 cancels the transfer of the update information, and the update information is thus not transferred, whereby the pointless transfer of information from relay transfer device 2 to standby-system site 3 can be prevented and the transmission bandwidth of the communication network can be more efficiently utilized. As a result, the present modification can be applied in situations in which the transmission bandwidth is limited, and further, the present modification can complete the transfer of update information in a shorter time interval.

Moreover, in response to a write request command that is issued by server 31 of standby-system site 3 in the present modification, the write request process can be carried out immediately when update information that corresponds to the target blocks of the command is present in relay transfer device 2, and as a result, no drop will occur in the write performance from server 31 to storage 32.

Further, the present modification prevents cases in which, for blocks for which a write request command has already been issued from server 31 and executed, old update information is sent in and the data of storage 32 then overwritten by the old update information.

Modification 6 of the First Embodiment

In the first embodiment and in Modifications 1-5, a configuration was shown in which address information storage unit 303 was provided in storage 32 of standby-system site 3, but the present invention is not limited to this configuration. As an example of another configuration, address information storage unit 303 is provided in relay transfer device 2 in Modification 6. The overall configuration of the replication system of this modification is similar to that shown in FIG. 1.

Figure 37:
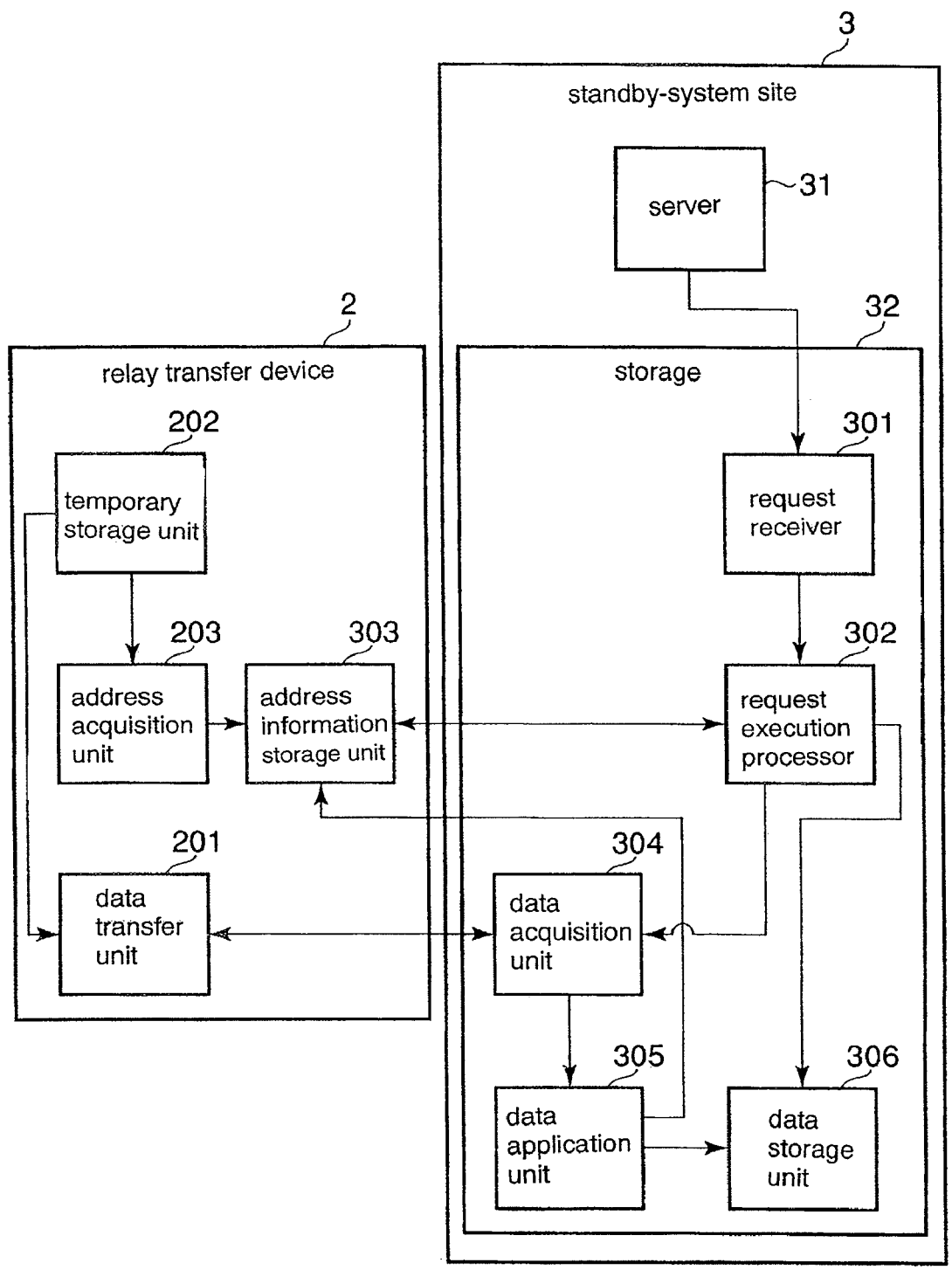
FIG. 37 is a block diagram showing details of the relay transfer device and the standby-system site in Modification 6 of the first embodiment.

FIG. 37 is a block diagram showing the details of the configuration of the relay transfer device and the standby-system site in Modification 6 of the first embodiment. Referring to FIG. 37, relay transfer device 2 includes address information storage unit 303 in addition to data transfer unit 201, temporary storage unit 202, and address acquisition unit 203. On the other hand, storage 32 of standby-system site 3 includes request receiver 301, request execution processor 302, data acquisition unit 304, data application unit 305, and data storage unit 306; and does not include address information storage unit 303.

The operation of each of the parts of relay transfer device 2 and standby-system site 3 is as in the first embodiment and Modifications 1-5 of this embodiment. The configuration of the present modification can be applied to all of the first embodiment and modifications 1-5 of this embodiment.

According to the present modification described above, there is no need for transfer from relay transfer device 2 to standby-system site 3 in order to make the address information of update information that is stored in temporary storage unit 202 of relay transfer device 2 usable in storage 32, and the amount of transfer on the communication network can therefore be limited.

Modification 7 of the First Embodiment

In the first embodiment and in Modifications 1-5 of this embodiment, a request for the transfer of address information of update information was submitted by address information storage unit 303 of storage 32 of standby-system site 3 to address acquisition unit 203 of relay transfer device 2. However, the present invention is not limited to this form. As another example, the address information of update information is only actively sent by relay transfer device 2 to standby-system site 3 in the present modification.

The replication system of the present modification has the same configuration as the system shown in FIGS. 1 and 2. The present modification differs from the above-described system in that address information is actively transferred from address acquisition unit 203 of relay transfer device 2 to address information storage unit 303 of storage 32 of standby-system site 3. Accordingly, address information storage unit 303 does not request address acquisition unit 203 to transfer address information.

As an example, address acquisition unit 203 may examine the information of temporary storage unit 202 at regular periods (for example, at periods of 10 seconds or one minute), send address information to storage 32, and update the information of address information storage unit 303.

Alternatively, as another example, each time new update information is added in temporary storage unit 202 in relay transfer device 2, address acquisition unit 203 may transfer the address of the update information that has been added to storage 32 and then update the information of address information storage unit 303.

Further, as yet another example, when new update information does not arrive in relay transfer device 2 from normal-system site 1 within a fixed interval (for example, of five minutes), address acquisition unit 203 may transmit the address information of update information that is stored in temporary storage unit 202 to address information storage unit 303. This is because, when new update information does not arrive in the fixed time interval, the possibility exists that some problem has occurred in normal-system site 1, and in such a case, the possibility exists that an activation process is to be carried out in standby-system site 3. In such a case, if new update information should arrive after address information has been transmitted, address acquisition unit 203 preferably notifies address information storage unit 303 that the address information is not in the most recent state.

As yet another example, relay transfer device 2 checks the state of normal-system site 1 by a method such as the "heartbeat method," and when normal-system site 1 is not operating normally, address acquisition unit 203 may transfer address information to address information storage unit 303.

If relay transfer device 2 actively sends address information to standby-system site 3 as in the present modification, the processes of Steps A4 and A5 of FIG. 3 become unnecessary.

Figure 38:
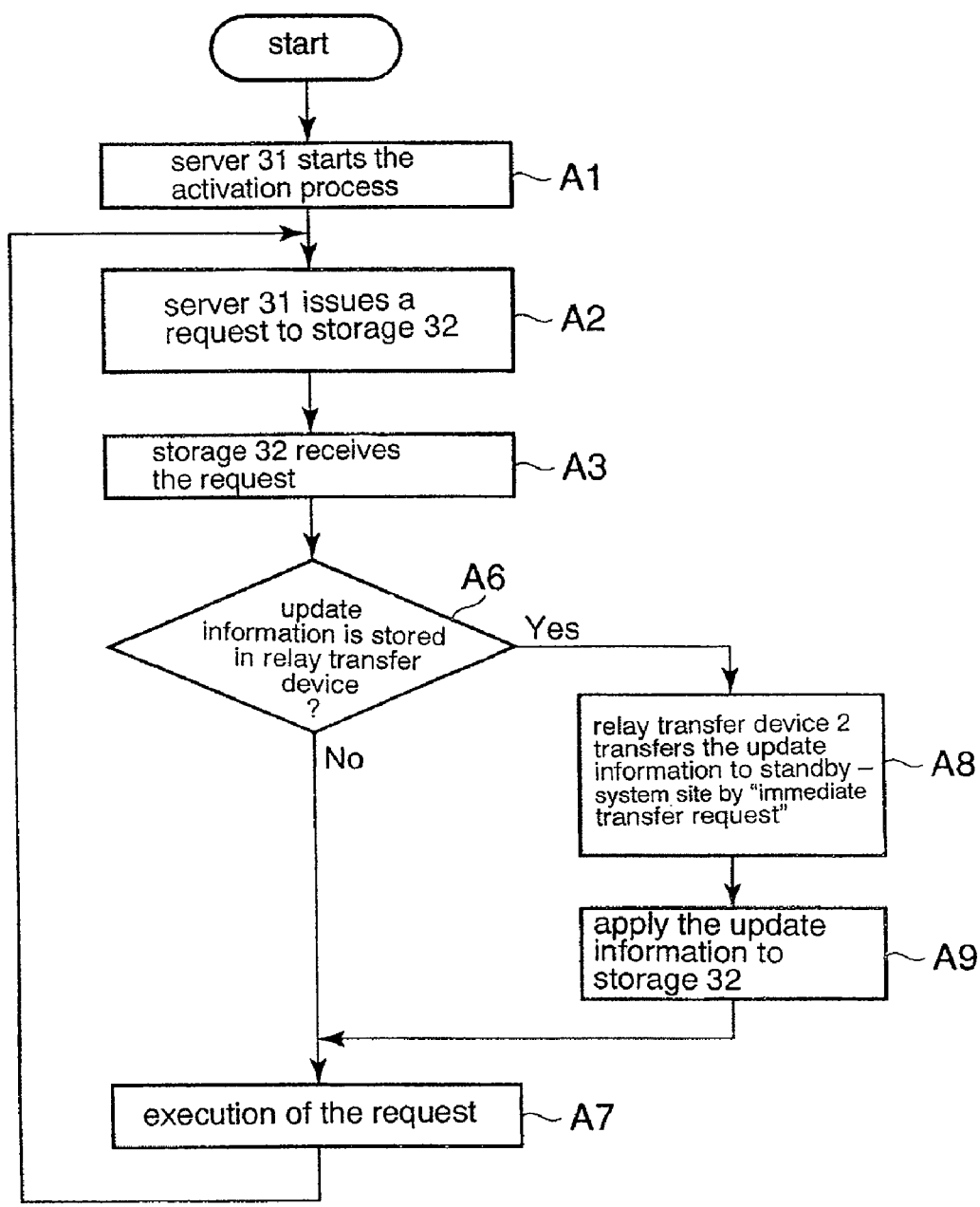
FIG. 38 is a flow chart for explaining the operations of the replication system in Modification 7 of the first embodiment.

FIG. 38 is a flow chart for explaining the operations of the replication system in Modification 7 of the first embodiment. An example was here shown in which relay transfer device 2 transfers address information to standby-system site 3, but the same form can be similarly applied in Modifications 1-5.

Referring to FIG. 38, the processes of Steps A1-A3 and A6-A9 are similar to the processes shown in FIG. 3. In the flow chart of FIG. 38, after the process of Step A3, processing proceeds to the determination of Step A6 without determining whether storage 32 has acquired the address information of relay transfer device 2.

Figure 39:
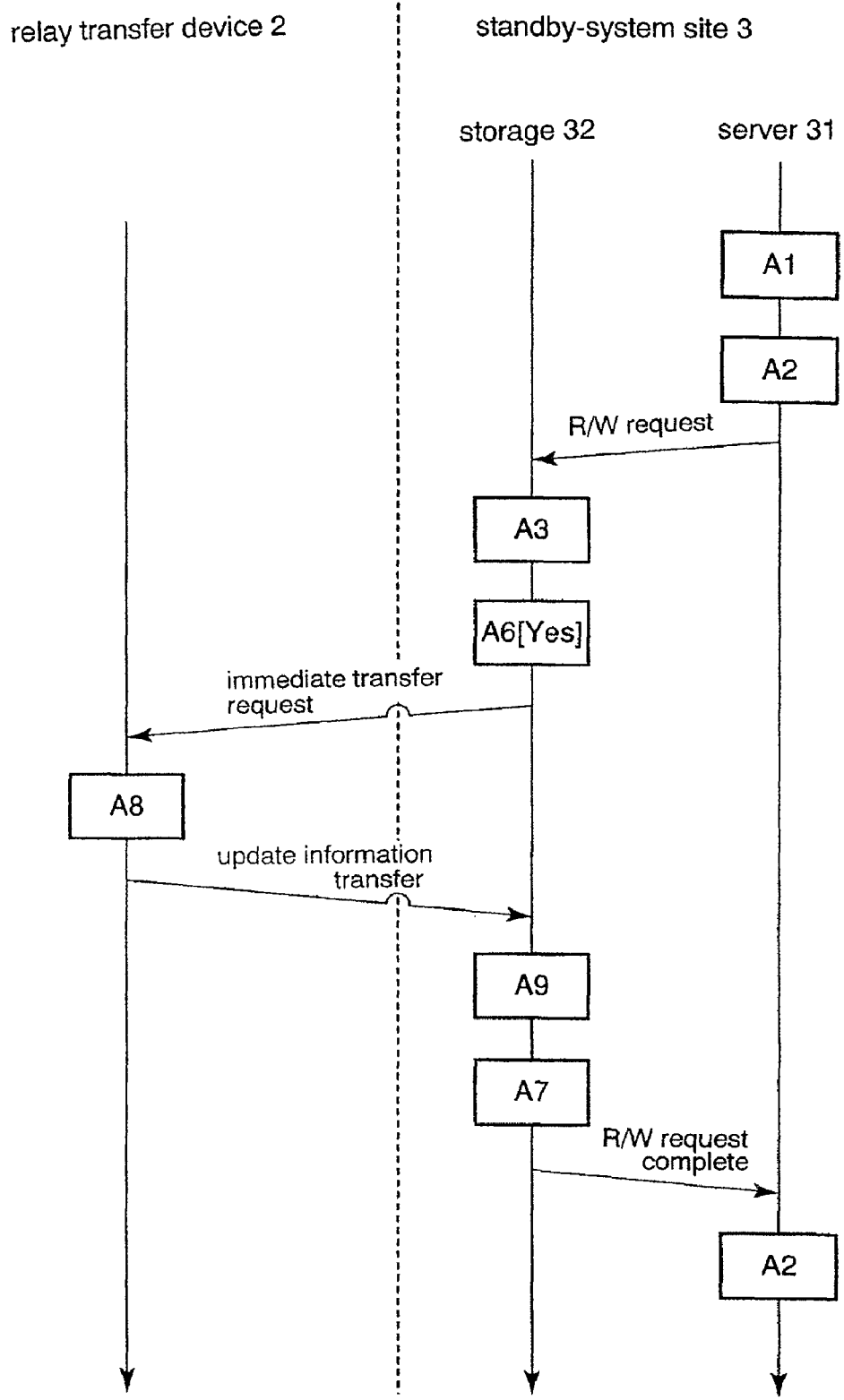
FIG. 39 is a sequence chart showing the inter-device operations in the operations that are shown in the flow chart of FIG. 38.

FIG. 39 is a sequence chart showing the inter-device operations in the operations that are shown in the flow chart of FIG. 38. FIG. 39 differs from FIG. 17 in that there is no transfer of address information by Steps A4 and A5. As described hereinabove, a wide variety of cases can be considered as the prompt for relay transfer device 2 to actively send address information to standby-system site 3, and this prompt is therefore not shown in FIG. 39.

According to this Modification as described in the foregoing explanation, there is no need for processes in storage 32 of standby-system site 3 for determining whether address information has been acquired, and if address information has not been acquired, for submitting a request to relay transfer device 2 to acquire the address information. As a result, the amount of processing can be reduced and the processing time can be shortened.

Modification 8 of the First Embodiment

In the first embodiment and in Modifications 1-6 of the first embodiment, request execution processor 302 of standby-system site 3, in response to R/W requests, verified each time whether update information that had not been transferred remained in temporary storage unit 202 of relay transfer device 2 by the information of address information storage unit 303. However, the present invention is not limited to this form. As another example, relay transfer device 2 in the present modification communicates to standby-system site 3 that update information does not remain.

The replication system of the present modification has the same configuration as the system shown in FIGS. 1 and 2. The present modification differs from the above-described system in that relay transfer device 2 communicates to storage 32 of standby-system site 3 that update information does not remain in temporary storage unit 202.

As an example, in Step A5 of FIG. 3, address acquisition unit 203 may make settings to temporary storage unit 202 such that when all update information that is present at that time point has been transferred, a message is sent to storage 32 to report that all update information has been transferred. More specifically, temporary storage unit 202 is assumed to be configured to sequentially store update information as a queue. Then, when address acquisition unit 203 sends address information to address information storage unit 303 in Step A9 of FIG. 3, it adds a message communicating that all update information has been transferred at the very end of the queue of temporary storage unit 202. In this case, the message reports only that all update information that existed at the time the address information was transferred has been transferred to standby-system site 3, and if update information subsequently arrives in relay transfer device 2, temporary storage unit 202 is no longer empty. However, in such a case, update information that arrives after address information has been transferred is transferred after the communication message, and standby-system site 3 can therefore recognize that temporary storage unit 202 of relay transfer device 2 is not empty. If update information is not transferred in following a communication message, standby-system site 3 can determine that temporary storage unit 202 of relay transfer device 2 is empty.

As another example, address acquisition unit 203 may send a communication message to address information storage unit 303 when temporary storage unit 202 no longer contains update information. When update information arrives in relay transfer device 2 after the communication message has been sent, the update information is transferred after the communication message and standby-system site 3 is therefore able to recognize that temporary storage unit 202 is not empty, as described above.

As yet another example, in a configuration in which relay transfer device 2 transmits address information to standby-system site 3 when new update information does not arrive within a fixed interval (of, for example, 5 minutes) as in one example in Modification 7, address acquisition unit 203 may make settings to temporary storage unit 202 such that temporary storage unit 202 sends a message reporting that all update information has been transferred after this address information has been transferred. More specifically, a message may be added to the very end of a queue as in the above-described system. For example, if no new update information arrives in an interval as long as five minutes, the possibility arises that some problem has occurred in normal-system site 1, and if a communication message is sent at this timing, there is believed to be little chance for the subsequent arrival of update information.

As yet another example, in a configuration in which relay transfer device 2 transmits address information to standby-system site 3 upon detecting a problem in normal-system site 1 by the heartbeat method as in one example in Modification 7, after the transfer of this address information, address acquisition unit 203 may set a message in the queue of temporary storage unit 202 to communicate that all update information has been transferred, as described above.

As described in the foregoing explanation, according to the present modification, it is possible to communicate from relay transfer device 2 to standby-system site 3 that all update information that is stored in temporary storage unit 202 of relay transfer device 2 has been transferred to standby-system site 3. As a result, standby-system site 3, after recognizing that all update information has been transferred, is able to immediately execute a R/W request command without checking for the existence of update information.

In addition, the absence of any update information in temporary storage unit 202 of relay transfer device 2 strongly suggests the possibility that some problem has occurred in normal-system site 1, and standby-system site 3 is therefore able to use this as a stimulus to begin preparation for the switching process.

Second Embodiment

The second embodiment of the present invention is a system in which, when there is a plurality of types of data, a transfer priority is assigned to each data type in accordance with a fixed policy, and data are then transferred from relay transfer device 2 to standby-system site 3 in accordance with the transfer priority. This form can be widely applied, including in the first embodiment and in Modifications 1-8 of the first embodiment. An example is here shown in which this form is applied to the first embodiment.

Figure 40:
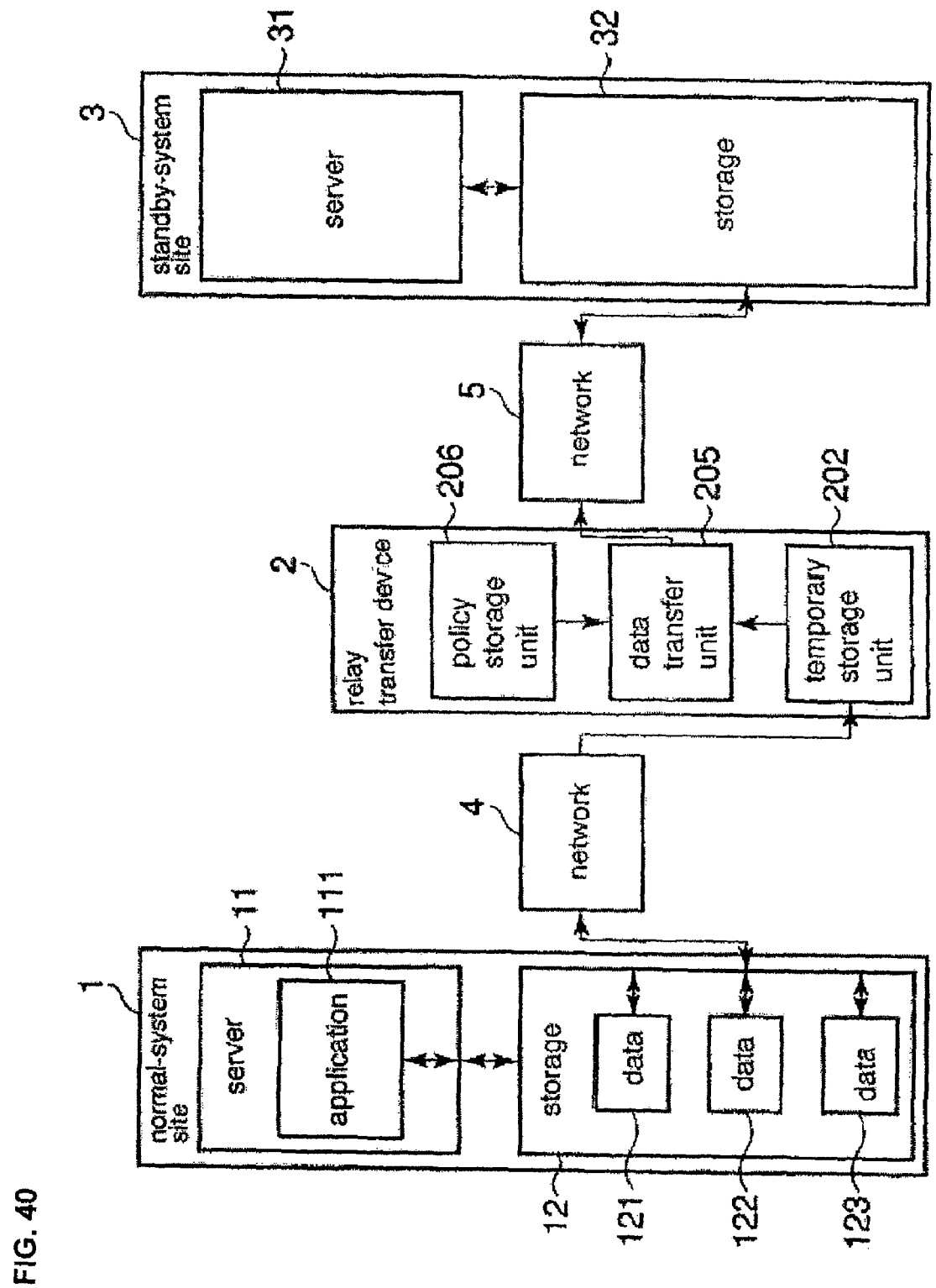
FIG. 40 is a block diagram showing the replication system of the second embodiment.

FIG. 40 is a block diagram showing the configuration of the replication system of the second embodiment. Referring to FIG. 40, the replication system of the second embodiment includes normal-system site 1, relay transfer device 2, standby-system site 3, and networks 4 and 5, as in the first embodiment. In addition, normal-system site 1 includes server 11 and storage 12. Standby-system site 3 includes server 31 and storage 32.

In the second embodiment, server 11 is provided with application 111. In addition, storage 12 stores data 121, 122, and 123. Relay transfer device 2 includes temporary storage unit 202, data transfer unit 205, and policy storage unit 206.

Temporary storage unit 202 is the same as the component in the first embodiment shown in FIG. 2. Temporary storage unit 202 temporarily retains data for transferring data of normal-system site 1 to standby-system site 3. For this purpose, temporary storage unit 202 may retain a complete replication of the data of normal-system site 1, or may retain only a partial replication of the data. Alternatively, temporary storage unit 202 may retain a record of the state of changes, or may retain request commands that have been executed at normal-system site 1.

Data transfer unit 205 differs from data transfer unit 201 of the first embodiment and transfers data (or update information of these data) from normal-system site 1 to standby-system site 3 in accordance with a policy that is recorded in policy storage unit 206.

Application 111 that is provided in server 11 of normal-system site 1 is a program such as a database, an application, or an operating system that operates on server 11. Data items 121, 122, and 123 that are stored in storage 12 are data of different types. Although data occur in three types in this case, the number of types of data is not limited to three, this embodiment being widely applicable to cases having a plurality of types. The policy for determining the transfer priority for each of these types of data is recorded in policy storage unit 206 of relay transfer device 2.

The data types are categorized according to the physical, virtual, or logic storage position. For example, sorting by volume unit, file unit, or the range of block address can all be considered. As a specific example, the data may be classified in a database system into each of the data types of update log (journal) files, archive files of update logs, and data files, and then handled as data of these three types. Alternatively, as another example, data files in a similar database system may be classified among a portion that is chiefly consulted in the normal-system site, a portion that is chiefly consulted in the standby-system site, and a portion that is consulted by both sites, and then handled as data of three types. As yet another example, data in a journal file system may be classified between a journal portion and a portion other than the journal portion and then handled. Alternatively, data in a file system may be classified as the data types of a control structure portion and a portion other than the control structure portion. Still further, data may be classified according to data type and the availability, the necessity at the time of activating the standby-system site, and the degree of possibility of being accessed in the standby-system site.

Figure 41:
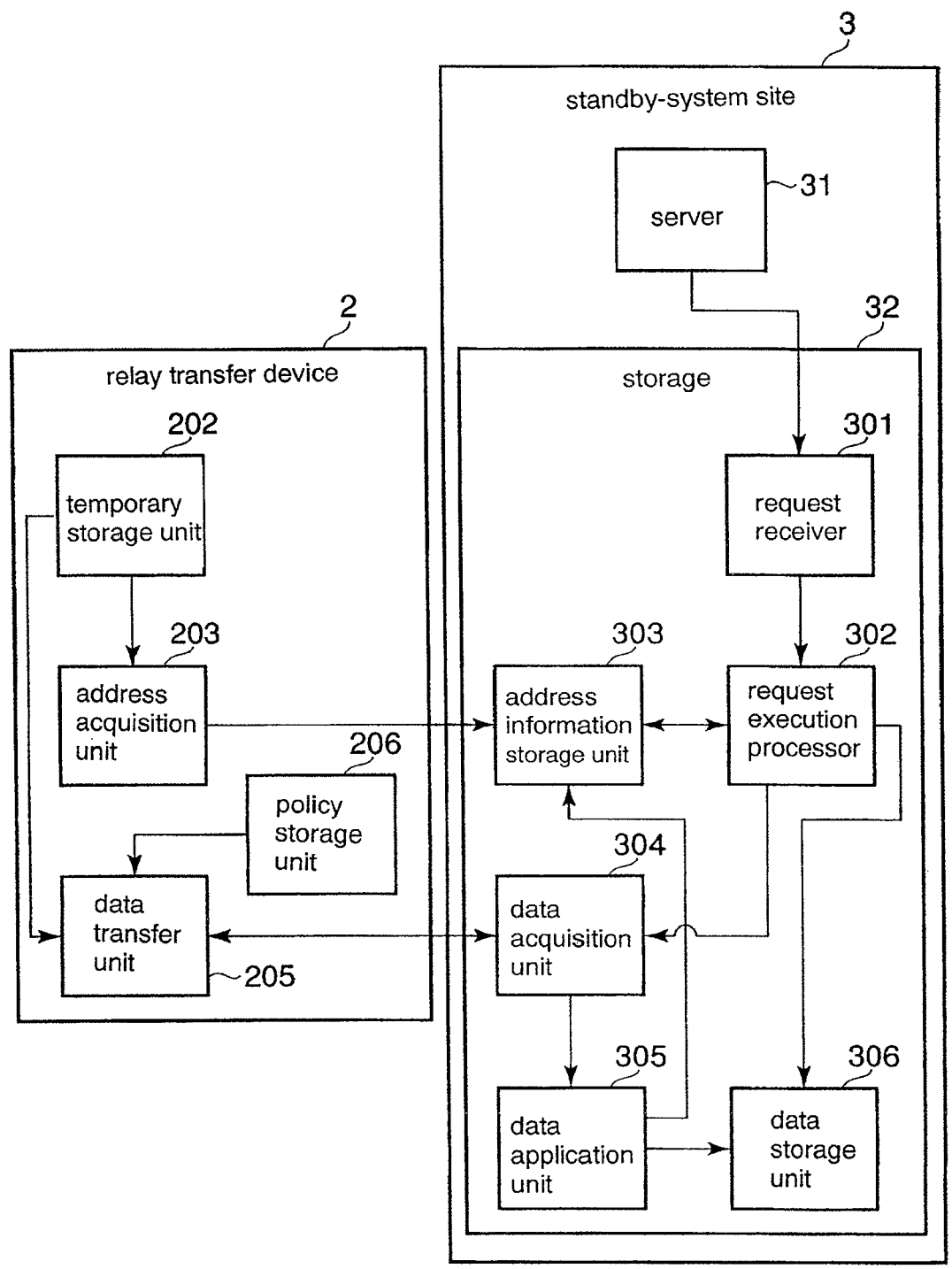
FIG. 41 is a block diagram showing details of the relay transfer device and standby-system site in the second embodiment.

FIG. 41 is a block diagram showing details of the configuration of relay transfer device and standby-system site in the second embodiment. Referring to FIG. 41, relay transfer device 2 includes: data transfer unit 205, temporary storage unit 202, address acquisition unit 203, and policy storage unit 206. As described hereinabove, temporary storage unit 202 is the same component as in the first embodiment, and address acquisition unit 203 is further the same component as in the first embodiment. As in the first embodiment, storage 32 of standby-system site 3 includes: request receiver 301, request execution processor 302, address information storage unit 303, data acquisition unit 304, data application unit 305, and data storage unit 306.

Explanation next regards the operations for data transfer from relay transfer device 2 to standby-system site 3 in the second embodiment.

FIG. 42 is a flow chart for explaining the operations of the relay transfer device in the replication system of the second embodiment. Referring to FIG. 42, data transfer unit 205 of relay transfer device 2 first determines whether data that should be transferred to standby-system site 3 are present in temporary storage unit 202 (Step F1). If there are no data that should be transferred, data transfer unit 205 waits for new data to be transferred from normal-system site 1 (Step F2).

If the determination of Step F1 determines that there are data that should be transferred, data transfer unit 205 extracts the data that are to be transferred next from temporary storage unit 202 in accordance with the policy that has been set in advance in policy storage unit 206 (Step F3).

Data transfer unit 205 then transfers the extracted data to standby-system site 3 by way of network 5 (Step F4). Relay transfer device 2, having transferred the data, returns to the process of Step F1 and performs the transfer process for data that are to be transferred next.

FIG. 43 is a flow chart for explaining the operations of the standby-system site in the replication system of the second embodiment. Referring to FIG. 43, data acquisition unit 304 of standby-system site 3 receives data from relay transfer device 2 in Step F5. Data application unit 305 next applies these data to data storage unit 306 in Step F6. Data application unit 305 of standby-system site 3 next instructs relay transfer device 2 in Step F7 to place the data that have been transferred in a "transfer completed" state (Step F7). At this time, relay transfer device 2 may for example delete the data that have been transferred to standby-system site 3 from temporary storage unit 202. Alternatively, instead of deleting the data, a process may be carried out for conferring an indication showing that transfer is not necessary, such as by conferring a flag indicating that transfer has been completed.

The policy that is used in the process of Step F3 is next described in greater detail.

In Step F3, data transfer unit 205 performs a transfer process in accordance with the policy that has been set in advance. In this policy, settings such as the transfer priority, transfer necessity/non-necessity, and transfer method are described in accordance with the type of data. In this case, it is assumed that there are three types of data: data 121, 122, and 123.

To present a specific example, the transfer priority for each type of data is described in the policy. Here, data 121 are assumed to be data for application 111 that operates on server 11 and are files that are indispensable to the activation and use of application 111. Data 122 are assumed to be files that are archives of data 121. Data 123 are assumed to be files that application 111 can produce from data 121 but that are preferably produced and then retained for accelerating or facilitating application 111. Data that are necessary for the operation of application 111 are classified into each of the data types of these data 121-123 and then stored.

FIG. 44 shows policy settings in the second embodiment. Data 122, which are archives, are data that are not absolutely necessary for starting service on standby-system site 3. In addition, data 123 can be produced in standby-system site 3 and are not data necessary for activating service. Thus, referring to FIG. 44, data 121 in the second embodiment are data that should be sent with the highest priority and are therefore set to a high level of transfer priority. The transfer priority of data 123 is set to the next highest level, and the transfer priority of data 122 is set to the lowest level.

As the operation in Step F3, if data 121 are stored in temporary storage unit 202, data transfer unit 205 preferentially extracts these data and transfers these data to standby-system site 3. As an example of a specific configuration, data transfer unit 205 may be provided with a queue for accumulating update information for each data type, and temporary storage unit 202 may preferentially extract update information from the queue for the data type having the highest transfer priority and then transfer the extracted data to standby-system site 3. As for the classification of data, the types of data that are set in normal-system site 1 may be communicated from normal-system site 1 to relay transfer device 2 and relay transfer device 2 may then use these data types. As another example, when update information is transferred from normal-system site 1 to relay transfer device 2, information may be added for indicating the data type to which the update information belongs.

Figure 45:
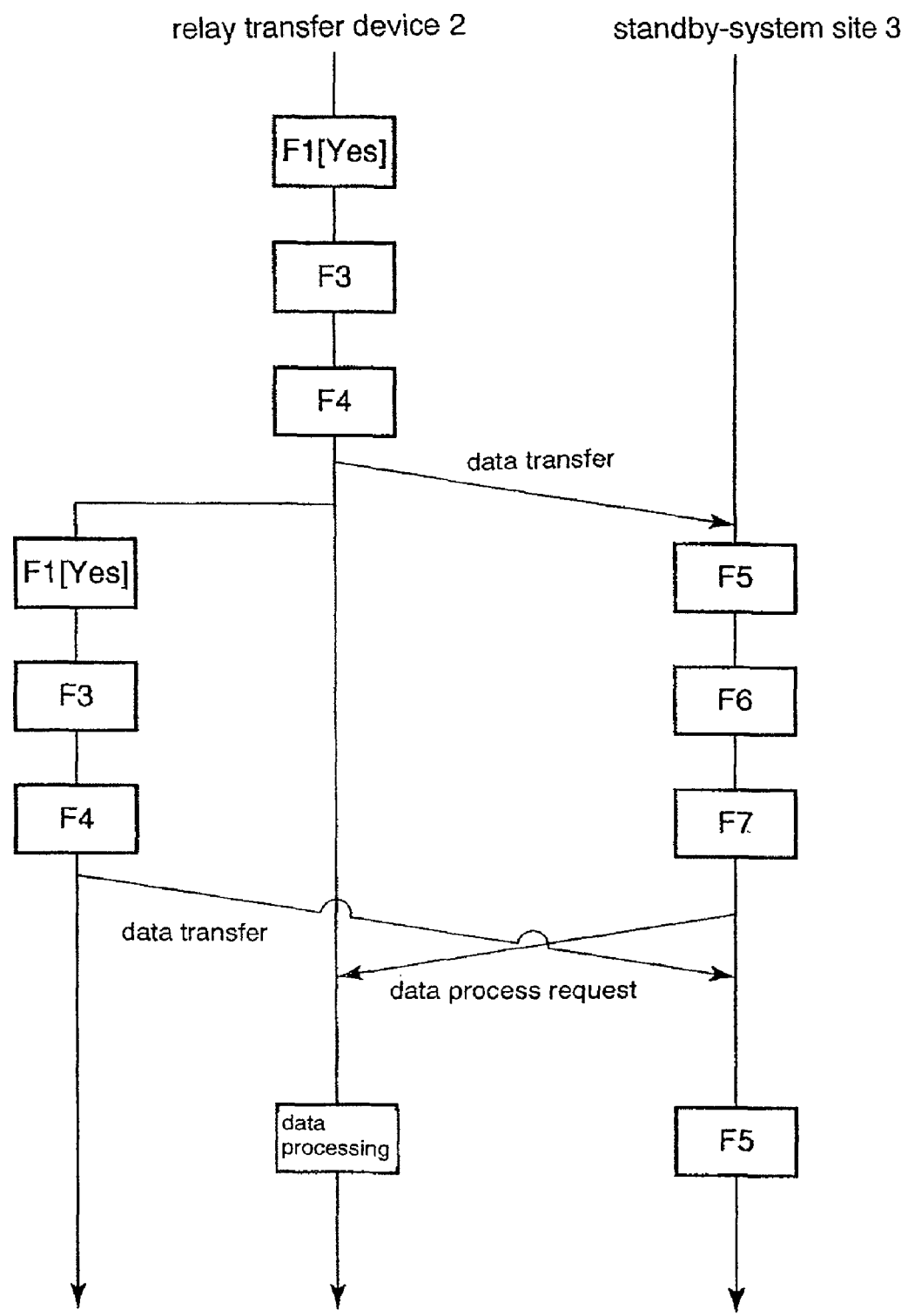
FIG. 45 is a sequence chart showing inter-device operations when the determination of Step F1 is "YES" in the operations that are shown in the flow chart of FIGS. 42 and 43.

FIG. 45 is a sequence chart showing the inter-device operations when determination of Step F1 is "YES" in the operations that are shown in the flow chart of FIGS. 42 and 43. Referring to FIG. 45, if the determination of Step F1 is "YES," i.e., if there are data (or update information) that should be transferred to temporary storage unit 202, these data are extracted according to the policy in Step F3 and transferred to standby-system site 3 in Step F4.

Standby-system site 3, having received the transfer of data in Step F5, applies the data to storage 32 in Step F6, and in Step F7 submits a request to relay transfer device 2 for a process such as deleting the data or conferring a "transfer completed" flag. Relay transfer device 2, having received this request, performs the process on the data.

In addition, relay transfer device 2, after performing the data transfer in Step F4, may begin processing relating to the next transfer of data in parallel with processing in standby-system site 3, and the operations for such a case are shown in FIG. 45.

As described in the foregoing explanation, according to the second embodiment, data transfer unit 205 uses transfer priority that is set by a policy when transferring data, and as a result, data that are necessary for switching to standby-system site 3 and starting services when a problem occurs in normal-system site 1 and that therefore should be transferred preferentially can be transferred before other data, the process for starting services in standby-system site 3 can be accelerated, and service can be resumed in a shorter time after the occurrence of a problem in normal-system site 1.

In addition, when applied to the first embodiment and Modifications 1-8, data that are necessary for restarting service are transferred preferentially to standby-system site 3, whereby the number of times that standby-system site 3 must submit a request for transfer to relay transfer device 2 or the number of times that standby-system site 3 must wait for transfer can be decreased in the process of resuming services and the restarting process can be completed in a shorter time.

Modification 1 of the Second Embodiment

Modification 1 of the second embodiment is a form that allows alteration of the data transfer policy of relay transfer device 2.

Figure 46:
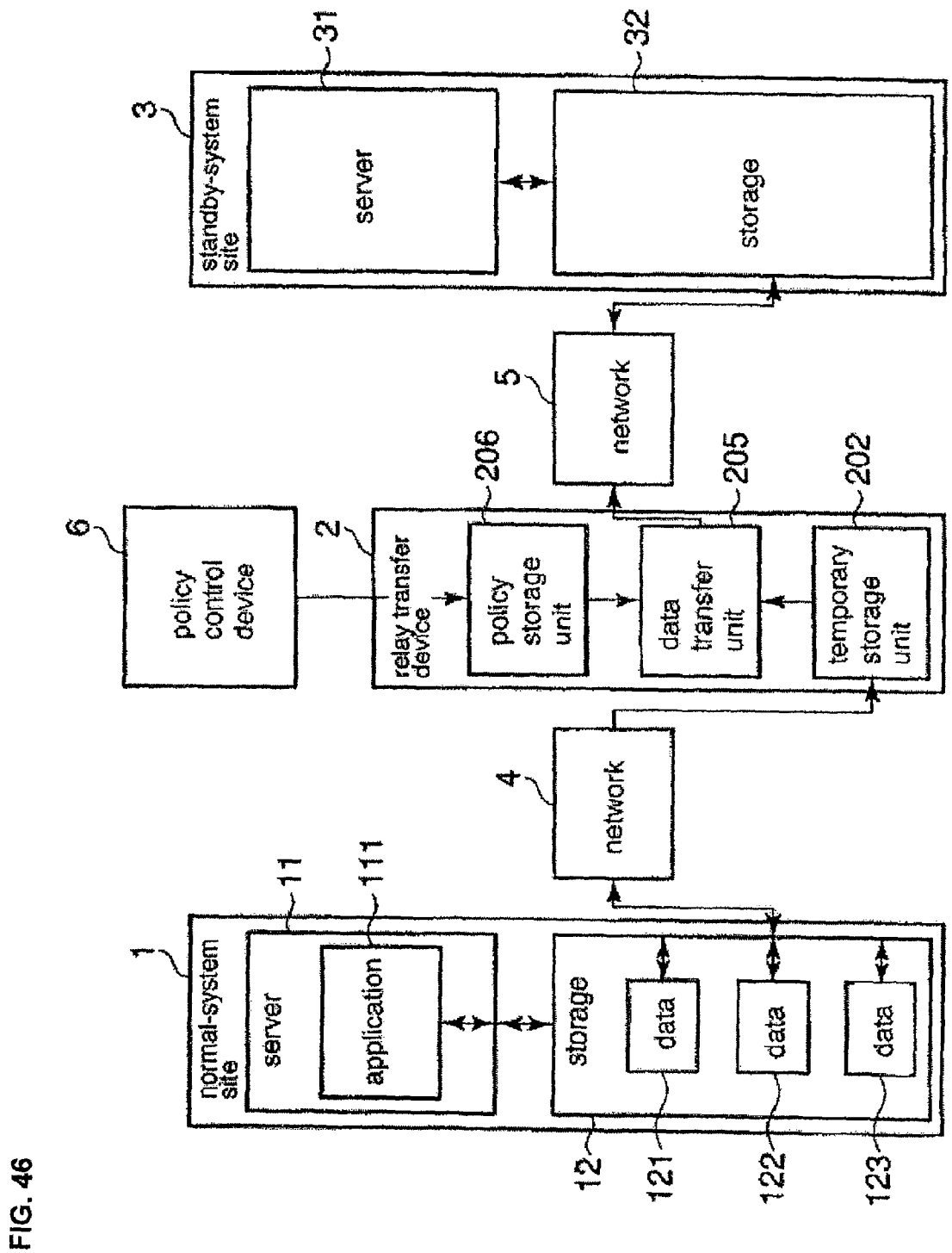
FIG. 46 is a block diagram showing the replication system in Modification 1 of the second embodiment.

FIG. 46 is a block diagram showing the configuration of the replication system in Modification 1 of the second embodiment. Referring to FIG. 46, the replication system of the present modification includes policy control device 6 in addition to normal-system site 1, relay transfer device 2, standby-system site 3, and networks 4 and 5. Normal-system site 1, relay transfer device 2, standby-system site 3, and networks 4 and 5 are all equivalent to the second embodiment shown in FIG. 40.

Policy control device 6 supplies instructions to relay transfer device 2 for controlling the policy of policy storage unit 206 of relay transfer device 2 during operation or during a halt in operation. For example, policy control device 6 detects the states of normal-system site 1, relay transfer device 2, standby-system site 3 or other system components and changes the policy in accordance with these states. Alternatively, policy control device 6 receives policy change requests from normal-system site 1, relay transfer device 2, standby-system site 3, or other outside device and then changes the policy.

Figures 47, 48, 49:
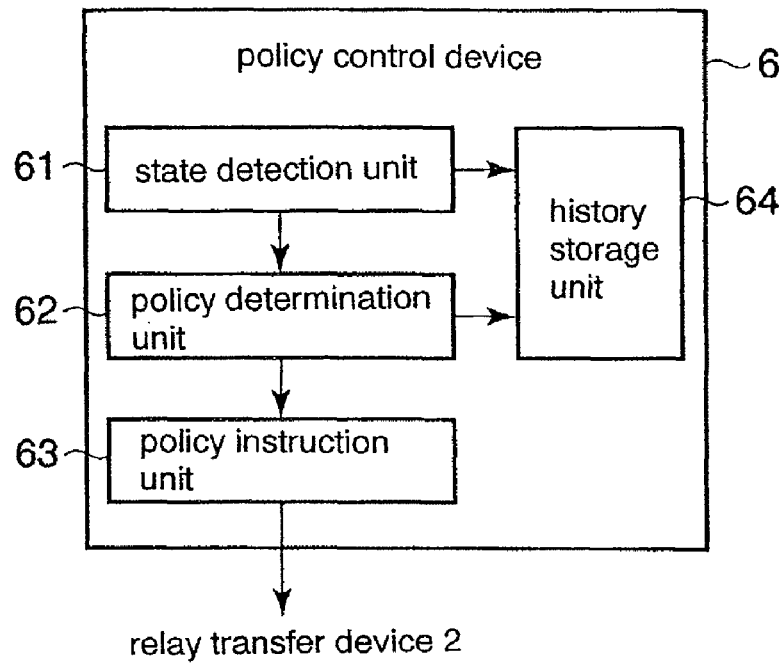
FIG. 47 is a block diagram showing the policy control device that is shown in FIG. 46.
FIG. 48 shows normal policy settings in Modification 1 of the second embodiment.
FIG. 49 shows policy settings when a logical error occurs in Modification 1 of the second embodiment.

FIG. 47 is a block diagram showing the configuration of the policy control device that is shown in FIG. 46. Referring to FIG. 47, policy control device 6 includes: state detection unit 61, policy determination unit 62, policy instruction unit 63, and history storage unit 64.

State detection unit 61 detects the states of normal-system site 1, relay transfer device 2, standby-system site 3 and other system components and communicates with policy determination unit 62 and history storage unit 64. In addition, state detection unit 61 receives policy change requests from relay transfer device 2, standby-system site 3, or other outside devices and communicates with policy determination unit 62 and history storage unit 64. Policy determination unit 62 determines the appropriate policy based on the information that has been communicated from state detection unit 61 and communicates with policy instruction unit 63 and history storage unit 64. Policy instruction unit 63 sets the policy that has been determined by policy determination unit 62 in policy storage unit 206 of relay transfer device 2. History storage unit 64 accumulates the information that is communicated from state detection unit 61 and policy determination unit 62 together with the time of communication as history.

As an example, data 121 is assumed to be the data type that is necessary for standby-system site 3 to activate application 111 that is operated on normal-system site 1. Data 122 is assumed to be the data type that can be consulted after resumption of service. Data 123 is assumed to be the data type that is not absolutely necessary.

During normal operation, a replica of all of data 121, 122, and 123 is preferably retained in standby-system site 3, and throughput is therefore prioritized and the transfer priority of all of data 121, 122, and 123 is assumed to be the same. More specifically, the transfer priority of data 121, data 122, and data 123 should be set to the same value in the policy settings.

During normal operation, data transfer unit 205 performs data transfer such that throughput is maximized by transferring data collectively.

At this point, it is assumed that a problem occurs in normal-system site 1 and that policy control device 6 detects this event. Policy control device 6 thereupon sets the policy of policy storage unit 206 of relay transfer device 2 such that data 121 is prioritized and data 122 has the next priority. In this way, the resumption of service by standby-system site 3 can be speeded up.

According to the present modification as explained above, policy control device 6 dynamically controls the policy of data transfer from relay transfer device 2 to standby-system site 3 in accordance with the state, and data transfer can therefore be performed by the optimum policy according to the state at that time.

Ordinarily, throughput is prioritized and settings are therefore made to raise transfer efficiency, but when hastening the resumption of service by standby-system site 3 due to the occurrence of a problem in normal-system site 1, settings are made to prioritize the transfer of data that are necessary for this process. Thus, by ordinarily reducing data that have been accumulated in relay transfer device 2 but that have not been transferred, the amount of data that are to be transferred upon the occurrence of a problem can be reduced; and by prioritizing data that are necessary for resuming service at the time of an occurrence of a problem, service can be resumed in a shorter time.

When the present modification is applied to the first embodiment and to Modifications 1-8 of the first embodiment, raising the setting of the transfer priority of data type by which standby-system site 3 carries out an immediate transfer request can reduce the number of immediate transfer requests.

When the present modification is applied to the first embodiment and to Modifications 1-8 of the first embodiment, the number of immediate transfer requests or transfer waiting processes of standby-system site 3 can be reduced by means of the transfer priority settings, whereby the time required for resumption of services can be shortened.

In addition, according to the present modification, policy control device 6 is configured such that policy control device 6 can detect the state of normal-system site 1 or receive policy change requests from normal-system site 1 and then change the policy. As a result, when a logical error occurs in normal-system site 1, policy control device 6 can detect the error, or policy control device 6 can receive notification from normal-system site 1, and then set the policy such that data that succeed the occurrence of the error are not transferred. Thus, the present modification can prevent the application of data that follow the occurrence of a logical error caused by the application of an operation error to normal-system site 1.

As a specific example, transfer priority, permissible transfer times, and prohibited transfer times can be set as policy settings for each data type. The "permissible transfer time" refers to the time interval from the arrival of data from normal-system site 1 in relay transfer device 2 up to the permission for data transfer to standby-system site 3. Data for which this permissible transfer time has elapsed can be transferred to standby-system site 3. The "prohibited transfer time" refers to the time of prohibition of the transfer to standby-system site 3 of data that have subsequently arrived in relay transfer device 2. As an example, the prohibited transfer time is ordinarily not set, but when a logical error occurs in normal-system site 1, the time of this occurrence should be set as the prohibited transfer time.

FIG. 48 shows policy settings during normal operation in Modification 1 of the second embodiment, and FIG. 49 shows policy settings at the time of the occurrence of a logical error.

Referring to FIG. 48, the permissible transfer time is set to five minutes, and the prohibited transfer time is not set. In this case, data of each data type are not transferred to standby-system site 3 until the passage of five minutes after reaching relay transfer device 2.

It is assumed that in this state, a logical error occurs at normal-system site 1 at midnight of Jan. 1, 2004. Data subsequent to the occurrence of the logical error are discarded, and a process for restarting at standby-system site 3 is carried out. For this purpose, the transfer from relay transfer device 2 to standby-system site 3 of data that succeed midnight of Jan. 1, 2004 must be prohibited within five minutes from the occurrence of the logical error.

Here, policy control device 6 changes the policy settings as shown in FIG. 49. Referring to FIG. 49, midnight of Jan. 1, 2004 is set in the prohibited transfer time, and data that have subsequently arrived in relay transfer device 2 are therefore not transferred to standby-system site 3. The policy settings may be changed by a system manager, or policy control device 6 may detect the logical error and automatically change the settings. Here, as one example, the permissible transfer time has been set to five minutes, but the present invention is not limited to this form. The permissible transfer time may be set as appropriate to, for example, one hour or half of a day, depending on the characteristics of the system.

Further, policy control device 6 may record changes in the detected system state or the history of changes in the policy settings as a log, whereby the analysis of, for example, the locations and causes of the occurrence of problems or changes in the operating state of the system can be facilitated and used in system operation.

Modification 2 of the Second Embodiment

In Modification 1 that is shown in FIG. 46, policy control device 6 is configured separately from normal-system site 1, relay transfer device 2, and standby-system site 3, but the present invention is not limited to this form. As an example of another configuration, the functions of policy control device 6 may be constituted as a single unit with normal-system site 1, relay transfer device 2, or standby-system site 3. Alternatively, policy control device 6 may be configured within another device.

Modification 2 of the second embodiment is configured such that a program that serves the role of policy control device 6 is provided within any of normal-system site 1, relay transfer device 2, or standby-system site 3. The functions of each device and each part of the replication system of the present modification are the same as shown in FIG. 46. Configuring the functions of policy control device 6 in any of the devices limits the cost of the system without complicating the configuration of the replication system. Further, configuring the functions of policy control device 6 inside normal-system site 1 can shorten the time for detecting change in the state of normal-system site 1, and moreover, facilitates detection of details in changes in state.

Modification 3 of the Second Embodiment

In Modifications 1 and 2 of the second embodiment, a system configuration was shown with a single policy control device 6, but the present invention is not limited to this form. As another example, in the present modification, a plurality of policy control devices 6 exist in the replication system. For example, policy control devices 6 may be configured for each of relay transfer device 2 and normal-system site 1.

According to the present modification, a plurality of policy control devices 6 exists as described in the foregoing explanation, whereby, even in the event of a problem in any of the policy control devices 6, changes in policy settings can be realized by the other policy control device and the operation of the system will be unaffected.

Modification 4 of the Second Embodiment

The replication system in Modification 4 of the second embodiment has a configuration that is similar to that of Modification 2. In the present modification, a database is assumed to operate as application 111. Data 121 are assumed to be an update log (journal) of the database. Data 122 are assumed to be the data region of the database, and data 123 are assumed to be the past update log (archive log).

In normal-system site 1, when data are updated, the database writes the information preceding update and the information following update in the update log of data 121 and updates the data region of data 122. In addition, when the update log reaches a fixed amount, a new archive log is produced in data 123 and the update log at that time is preserved in the archive log.

The data region can be restored based on information of the data region at a particular past time and the update log (or update log and archive log) from that time until the time that is to be restored. This restoration process is referred to as a "roll forward process."

An update log up to a particular first time in the past and information of the data region of the first time are assumed to be stored in storage 32 of standby-system site 3. The update information of all of data 121, 122, and 123 from the first time up to a second time are assumed to be stored in temporary storage unit 202 of relay transfer device 2.

When a problem occurs in normal-system site 1 in this state and the need arises for standby-system site 3 to operate services in place of normal-system site 1, standby-system site 3 preferably resumes service in the shortest time possible.

As one method for resuming service in standby-system site 3, restoration can be realized by carrying out a roll-forward process in standby-system site 3 based on the data region at a first time and a subsequent update log that have already been applied in standby-system site 3. Alternatively, as another method, all of an update log and a data region from relay transfer device 2 can be transferred to standby-system site 3 and applied. To speed the resumption of service, the method that can be completed in the shorter time must be selected and executed.

For example, if the roll-forward process is faster, the transfer priority of data 121, which are the update log (if necessary, including data 123 that are the archive log) should be made higher, and priority should be given to sending data that are necessary for the roll-forward process to standby-system site 3.

Figure 50:
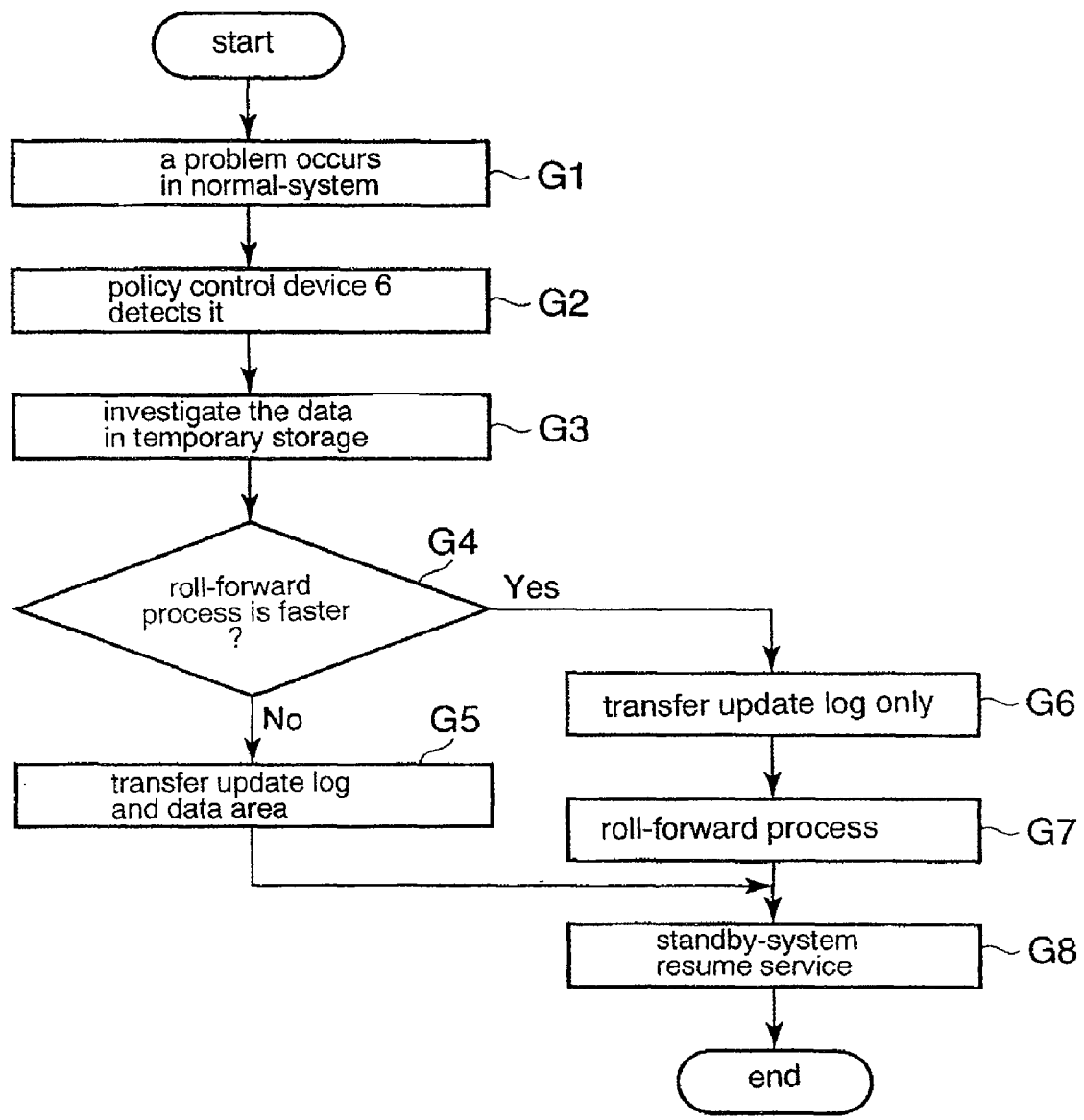
FIG. 50 is a flow chart for explaining the operations of the replication system in Modification 4 of the second embodiment.

FIG. 50 is a flow chart for explaining the operations of the replication system in Modification 4 of the second embodiment. Referring to FIG. 50, a problem is assumed to occur in normal-system site 1 for some reason (Step G1). Reasons for the occurrence of a problem that can be considered include a power outage, a hardware disorder, a software glitch, or a natural disaster. This problem in the normal-system site 1 is detected by policy control device 6 (Step G2).

Policy control device 6 investigates information in temporary storage unit 202 of relay transfer device 2 and examines the time of information of transfer completion, the amount of update information of data 121 (update log) that remains in temporary storage unit 202, and the amount of update information of data 122 (data region) (Step G3).

Policy control device 6 next calculates the time spent in the transfer of the update information of data 122 based on information obtained in Step G3 and the transfer bandwidth of network 5. The time expended in transfer can be calculated from (log capacity×throughput in the network bandwidth at the current time). Alternatively, policy control device 6 estimates the time expended when a roll-forward process is carried out in standby-system site 3 based on the amount of data 121. The time expended in a roll forward process can be calculated from (recovery time per capacity×log capacity). Finally, policy control device 6 compares the time expended in transfer and the time expended in the roll-forward process and determines whether the roll-forward process is faster (Step G4).

If the time expended in transfer is found to be shorter than the time expended in the roll-forward process in the determination of Step G4, policy control device 6 sets (or maintains) the policy such that all transfer priorities are the same and all data are transferred and carries out the transfer of data 121 and 122 (Step G5). Further, if the archive logs are not required for the resumption of service, the transfer priority of data 123 may be set to a low level.

On the other hand, if the time expended in the roll-forward process is found to be shorter, policy control device 6 raises the transfer priority of data 121 (and if necessary, of data 123 as well) and preferentially transfers only update logs (Step G6). Standby-system site 3 then restores the data region by means of the roll-forward process (Step G7).

When the update log and data region are in a stored state in standby-system site 3 by means of Step G5 or Step G7, standby-system site 3 carries out processing to resume service (Step G8).

Figure 51:
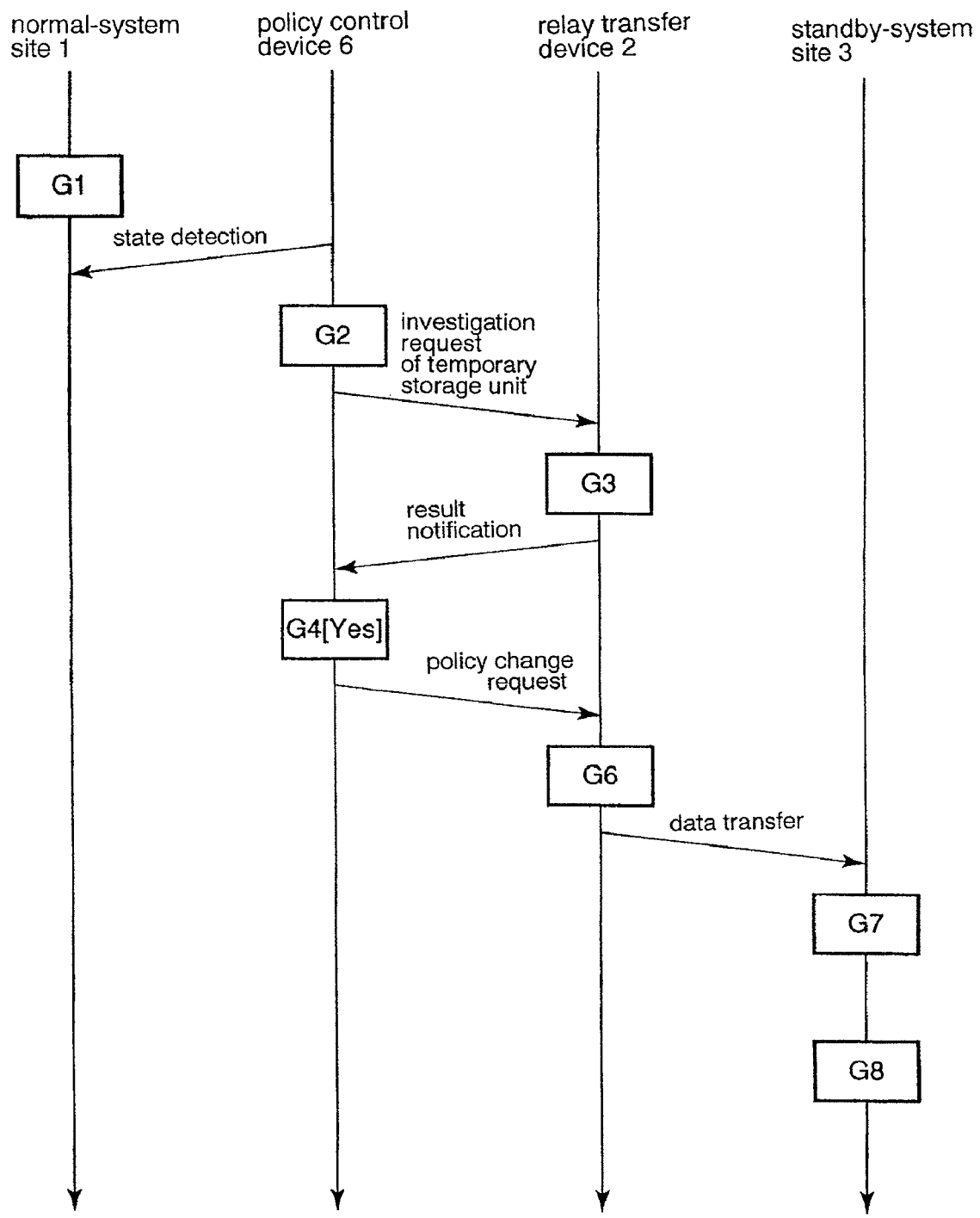
FIG. 51 is a sequence chart showing inter-device operations when the determination of Step G4 is "YES" in the operations shown in the flow chart of FIG. 50.

FIG. 51 is a sequence chart showing the inter-device operations when the determination of Step G4 is "YES" in the operations that are shown in the flow chart of FIG. 50. Referring to FIG. 51, the problem that occurred in normal-system site 1 in Step G1 is detected by policy control device 6 in Step G2, and relay transfer device 2 is requested to investigate the data that are stored in temporary storage unit 202. In Step G3, relay transfer device 2 investigates temporary storage unit 202 and reports the results to policy control device 6.

In Step G4, policy control device 6 determines from the obtained information whether the roll-forward process is the faster process. In this case, "YES" is determined in Step G4, and policy control device 6 therefore submits a request to relay transfer device 2 to change the policy such that the transfer priority of data that are required for the roll-forward process is raised. Relay transfer device 2 changes the policy according to this request in Step G6 and transfers data to standby-system site 3.

Standby-system site 3 uses the obtained data to carry out the roll-forward process in Step G7, and begins services in Step G8.

Figure 52:
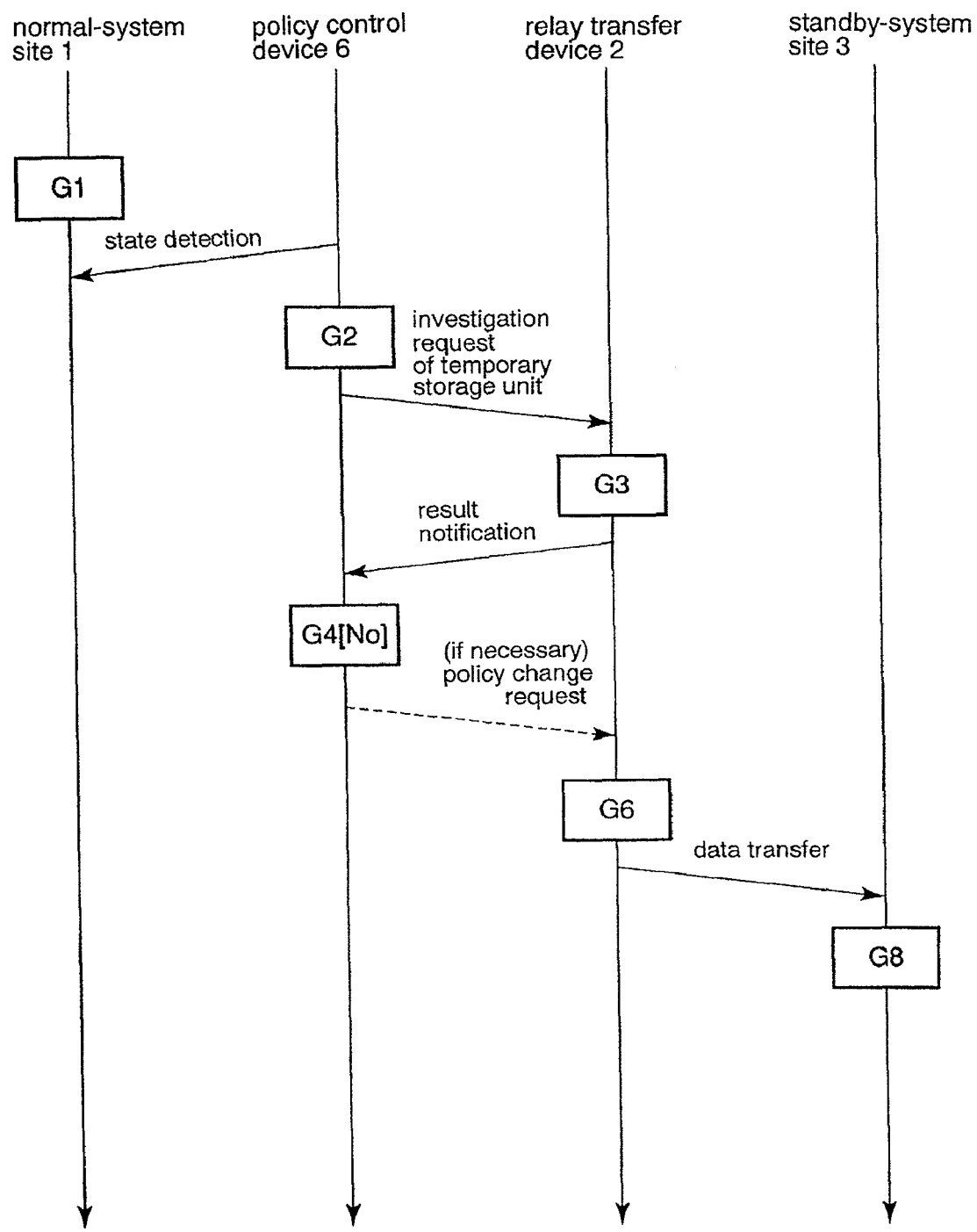
FIG. 52 is a sequence chart showing inter-device operations when the determination of Step G4 is "NO" in the operations that are shown in the flow chart of FIG. 50.

FIG. 52 is a sequence chart showing the inter-device operation when the determination of Step G4 is "NO" in the operations that are shown in the flow chart of FIG. 50.

In contrast to FIG. 51, "NO" is determined in Step G4 in FIG. 52, and policy control device 6 therefore submits a request to relay transfer device 2 to change the policy as necessary. For example, in a state in which a policy is set such that each data type is treated similarly, a change in policy is not necessary. Relay transfer device 2 transfers data to standby-system site 3 in accordance with the policy in Step G5, and standby-system site 3 begins service in Step G8.

In the present modification, an example was shown in which a database was operated as application 111, but the present invention is not limited to this form. As another example, the present invention may be similarly applied to a journal file system. In such a case, the journal files may be data 121. The configuration and operation of the present modification can be widely applied to other applications that have journal logs and that can recreate other data from these data.

Typically, networks 5 having low throughput due to narrow bandwidth or long distance are used in replication systems, and the resumption of service of standby-system site 3 is therefore usually faster when carrying out a roll-forward process, and the present modification enables a more rapid resumption of service in standby-system site 3 of a typical replication system.

Modification 5 of the Second Embodiment

The replication system in Modification 5 of the second embodiment is a system in which policy control device 6 in the replication system that was shown in FIG. 46 also detects the state of network 4 or network 5 and reflects the detected state in the policy of relay transfer device 2.

For example, in the determination of Step G4 in the flow chart of Modification 4 that was shown in FIG. 50, the time expended in data transfer was calculated from the throughput of the network, but strictly speaking, throughput changes with the state of the network. However, if policy control device 6 monitors the state of network 5 and measures the throughput, the accuracy of the calculation of the time expended in data transfer can be improved.

In addition, a network can be more efficiently utilized by, for example, transferring only data that are highly necessary when the usable transfer bandwidth is limited and transferring other data when the usable transfer bandwidth is broader.

Alternatively, setting the policy such that during normal operation data transfer decreases when the amount of data that are being transferred increases, and such that data transfer increases when the amount of data that are transferred decreases can smooth the used bandwidth and limit charges for use in cases such as in a charge system in which fees for using the network depend on the used bandwidth. In such a case, moreover, if the policy settings are controlled in accordance with the amount of data of update information that is stored in temporary storage unit 202 of relay transfer device 2 such that the amount of data transfer increases if the data of temporary storage unit 202 increases, the bandwidth usage charges can be limited and the storage of a large amount of update information in temporary storage unit 202 can be prevented.

Finally, when policy control device 6 detects the occurrence of a problem in normal-system site 1, changing the policy settings such that limits on the bandwidth use of network 5 are relaxed can both limit the amount of use of the network bandwidth in cases other than emergencies and enable data transfer in a shorter time interval during emergencies.

Modification 6 of the Second Embodiment

Figure 53:
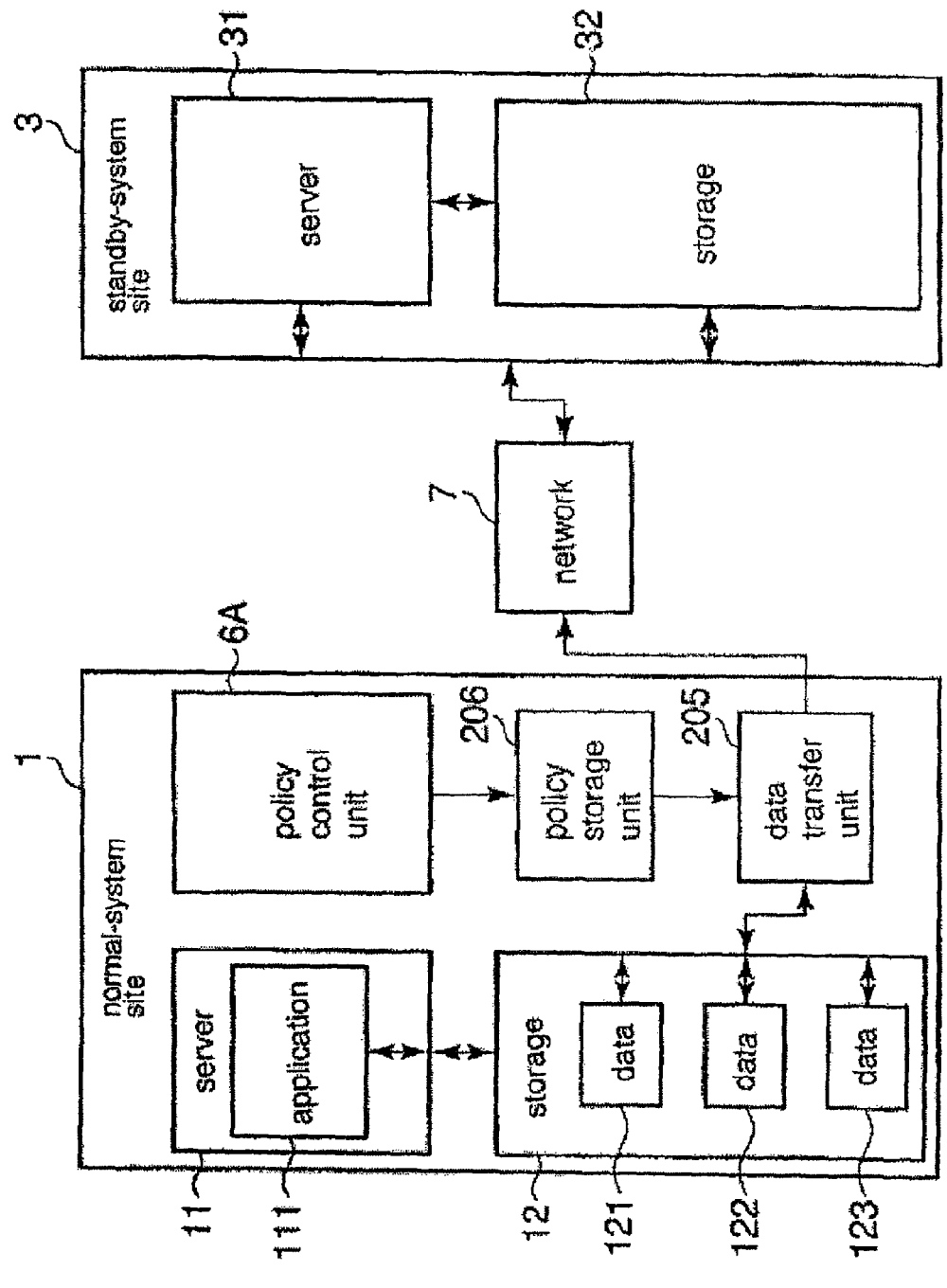
FIG. 53 is a block diagram showing the replication system in Modification 6 of the second embodiment.

Modification 6 of the second embodiment is a case in which the policy control function is realized in a replication system in which a relay transfer device does not exist. FIG. 53 is a block diagram showing the configuration of the replication system in Modification 6 of the second embodiment. Referring to FIG. 53, the replication system of the present modification includes normal-system site 1 and standby-system site 3, these two entities being connected by network 7. Standby-system site 3 is the same as the standby-system site 3 shown in FIG. 40.

Normal-system site 1 includes server 11, storage 12, policy control unit 6A, policy storage unit 206, and data transfer unit 205.

Similar to the application that is shown in FIG. 40, application 111 that is provided in server 11 is a program such as a database, an application, or an operating system that operates on server 11. Data 121-123 of storage 12 are updated by the operation of application 111. Data (or update information) that have been updated are first retained in storage 12 without being transferred immediately to standby-system site 3.

As with data transfer unit 205 in relay transfer device 2 that was shown in FIG. 40, data transfer unit 205 extracts data (or update information) that are to be transferred from storage 12 and transfers the data to storage 32 of standby-system site 3 in accordance with policy settings that are recorded in policy storage unit 206. Policies in which transfer priority is determined for each type of data are recorded in policy storage unit 206.

As with policy control device 6 of Modification 1 that was shown in FIG. 46, policy control unit 6A detects the states of normal-system site 1, standby-system site 3, or other devices and changes the policy settings of policy storage unit 206 in accordance with these states. In addition, policy control unit 6A receives requests for policy setting changes from normal-system site 1, standby-system site 3, or other devices and implements these changes in policy settings.

Figure 54:
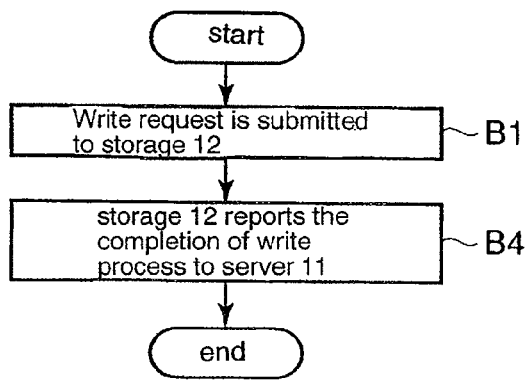
FIG. 54 is a flow chart for explaining the operations of the normal-system site in Modification 6 of the second embodiment.

Explanation next regards the operation of the normal-system site in the present modification. FIG. 54 is a flow chart for explaining the operation of the normal-system site in Modification 6 of the second embodiment. In FIG. 54, the processes of Steps B1 and B4 are operations similar to the processes shown in FIG. 8. FIG. 54 differs from FIG. 8 in that Steps B2 and B3 are absent. These steps are unnecessary because the functions of the relay transfer device are realized in normal-system site 1 and data transfer between the relay transfer device and the normal-system site is therefore unnecessary.

Referring to FIG. 54, when a write request is issued from server 11 to storage 12 (Step B1), storage 12 applies this write request to itself. After applying the write request to itself, storage 12 then reports to server 11 that the write process has been completed (Step B4).

Explanation next regards the operation for data transfer from normal-system site 1 to standby-system site 3 in Modification 6 of the second embodiment.

Figure 55:
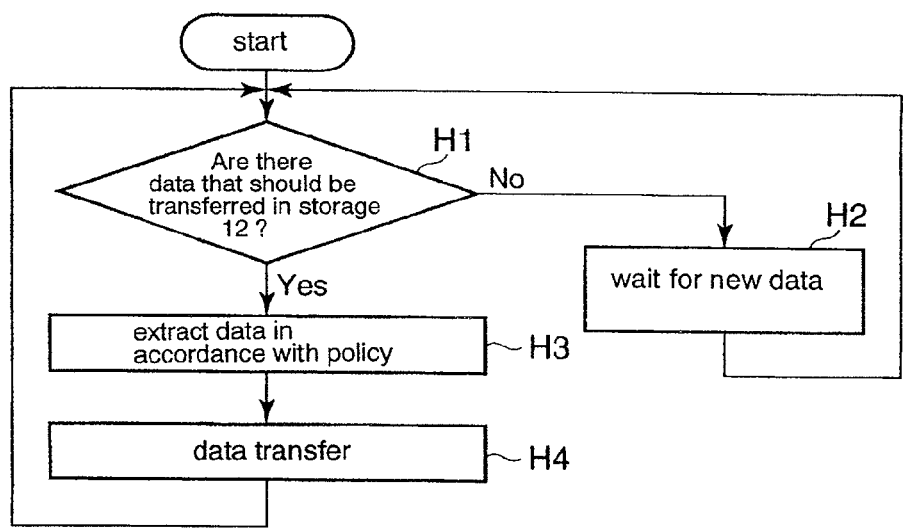
FIG. 55 is a flow chart for explaining the operations of the normal-system site in Modification 6 of the second embodiment.
Figure 56:
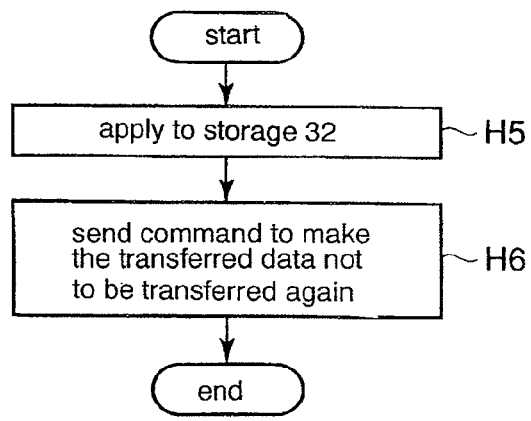
FIG. 56 is a flow chart showing the operations of the standby-system site in Modification 6 in the second embodiment.

FIG. 55 is a flow chart for explaining the operation of the normal-system site in Modification 6 of the second embodiment, and FIG. 56 is a flow chart showing the operations of the standby-system site in Modification 6 of the second embodiment.

Referring to FIG. 55, data transfer unit 205 of normal-system site 1 first determines whether or not data exist within storage 12 that are to be transferred to standby-system site 3 (Step H1). If there are no data that should be transferred, data transfer unit 205 waits for new data to be created by a write request (Step H2).

If it is found in the determination of Step H1 that there are data to be transferred, data transfer unit 205 extracts the data that should be transferred next from storage 12 in accordance with the policy that has been set in advance in policy storage unit 206 (Step H3). Data transfer unit 205 then transfers the data that have been extracted to standby-system site 3 by way of network 7 (Step H4). Normal-system site 1, having transferred the data, returns to the process of Step H1 and carries out the transfer process for the data that are to be transferred next.

Referring to FIG. 56, standby-system site 3, to which the data have been transferred from normal-system site 1 by the process of Step H4, applies the data that have been transferred to itself (Step H5).

Standby-system site 3 next issues a command to normal-system site 1 to carry out a process for placing the data that have been transferred to standby-system site 3 in the "transfer completed" state (Step H6). In response, normal-system site 1 may carry out a process of conferring to data that have been transferred to standby-system site 3 some indication that transfer is no longer necessary, such as by conferring a flag showing that transfer is completed.

Figure 57:
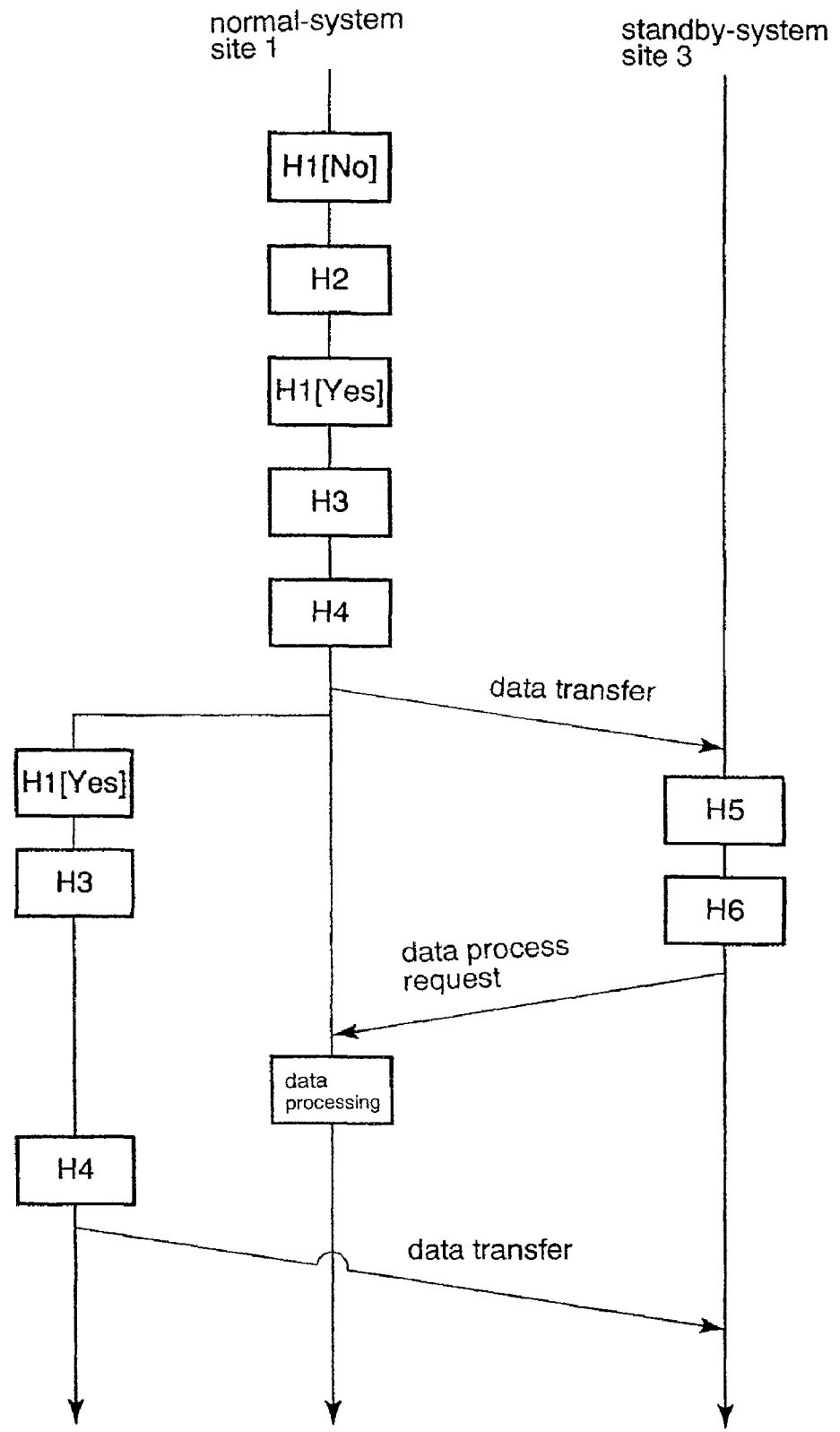
FIG. 57 is a sequence chart showing the inter-device operations in the operations that are shown in the flow charts of FIGS. 55 and 56.

FIG. 57 is a sequence chart showing the inter-device operations in the operations that are shown in the flow chart of FIGS. 55 and 56. In Step H1, normal-system site 1 determines whether data that should be transferred are present in storage 12. If "NO" is determined in Step H1, normal-system site 1 waits for the appearance of data that should be transferred in Step H2.

When data that should be transferred appear, normal-system site 1 extracts the data in accordance with the policy in Step H3 and transfers the data to standby-system site 3 in Step H4. Upon transferring the data, normal-system site 1 returns to the determination of Step H1.

Standby-system site 3, to which data have been transferred from normal-system site 1, applies the data to its own storage 32 in Step H5, and then issues a command to normal-system site 1 in Step H6 to carry out the "transfer completed" process.

In this process, as shown in FIG. 57, the series of processes of Steps H1, H3, and H4 of normal-system site 1 and the series of processes of Steps H5 and H6 of standby-system site 3 can be executed simultaneously in parallel, this method in fact being superior from the standpoint of performance.

As an example, it is here assumed that standby-system site 3 is a device for serving both as the substitute site for normal-system site 1 at the time of a problem and, during normal operation, for distributing the load of read processes such as data browsing and data accumulation. Because standby-system site 3 also carries out read processes during normal operation, the replication of the data of normal-system site 1 is necessary in standby-system site 3.

In a read process, standby-system site 3 reads data from its own storage 32 if the most recent data to be read are stored in storage 32. However, if the most recent data that are to be read have not yet been transferred from normal-system site 1, standby-system site 3 must read the most recent data from storage 12 of normal-system site 1, a process that entails more time for the read process and causes a drop in performance.

As a result, the data in storage 12 of normal-system site 1 are classified into a plurality of data types (here, data 121, 122, and 123), and a transfer priority is conferred to each of these data types by a policy that is recorded in policy storage unit 206.

As one example of the classification of data, data 121 are chiefly read from normal-system site 1 and are data that are not often read from standby-system site 3. Data 122 are data that are chiefly read from standby-system site 3. Data 123 are data that are not often read. Accordingly, the data type for which read processes are carried out in standby-system site 3 is chiefly data 122. In the policy, the transfer priority of data 122 is therefore set higher than the other data types.

The trends in read processes of standby-system site 3 may change during operation of the system, and, for example, when the chief target of the read processes of standby-system site 3 changes from data 122 to data 121, policy control unit 6A detects the operation state of standby-system site 3 or receives a transfer request from standby-system site 3, and then raises the transfer priority of data 121 and lowers the transfer priority of data 122.

As described in the foregoing explanation, according to the present modification, the functions of the relay transfer device are configured within normal-system site 1, whereby there is no need to provide a relay transfer device separately in the replication system, the system configuration can be simplified, and moreover, the amount of data that are transferred on the network can be reduced.

Further, according to the present modification, priority is given to transferring data that are frequently used in standby-system site 3 from normal-system site 1 to standby-system site 3, whereby no drop in performance occurs when load is distributed by standby-system site 3.

Further, according to the present modification, data transfer unit 205, policy storage unit 206, and policy control unit 6A are all provided within normal-system site 1, and as a result, transfer priority can be conferred by a policy despite the elimination of the relay transfer device.

Further, according to the present modification, policy control unit 6A changes policy settings in accordance with the state of the system, and an appropriate transfer priority can therefore be selected despite changes in the trends of read request commands that occur in standby-system site 3 during system operation.

According to the present modification, moreover, the loss of data is conceivable when a serious problem occurs in normal-system site 1 because a relay transfer device is not physically constructed. However, when providing the functions of an application that uses journal logs, raising the transfer priority of the journal logs can reduce the number of journal logs that have not been transferred to standby-system site 3 and can limit the data that are lost when a problem occurs in normal-system site 1.

Modification 7 of the Second Embodiment

Modification 7 in the second embodiment is a modification in which, in a system in which the functions of a relay transfer device are provided in normal-system site 1, the choice of synchronous transfer or asynchronous transfer of a write request in normal-system site 1 to standby-system site 3 is determined for each data type in the policy settings.

The replication system of the present modification is similar to the configuration shown in FIG. 53. In addition, the operations for data transfer from normal-system site 1 to standby-system site 3 are also similar to the operations of modification 6 that are shown in FIGS. 55 and 56.

The present modification differs from Modification 6 in that, in operations for a write request in normal-system site 1, data are sent by synchronous transfer or asynchronous transfer in accordance with a policy. Consequently, synchronous transfer or asynchronous transfer is set as a policy setting for each data type in policy storage unit 206.

Figure 58:
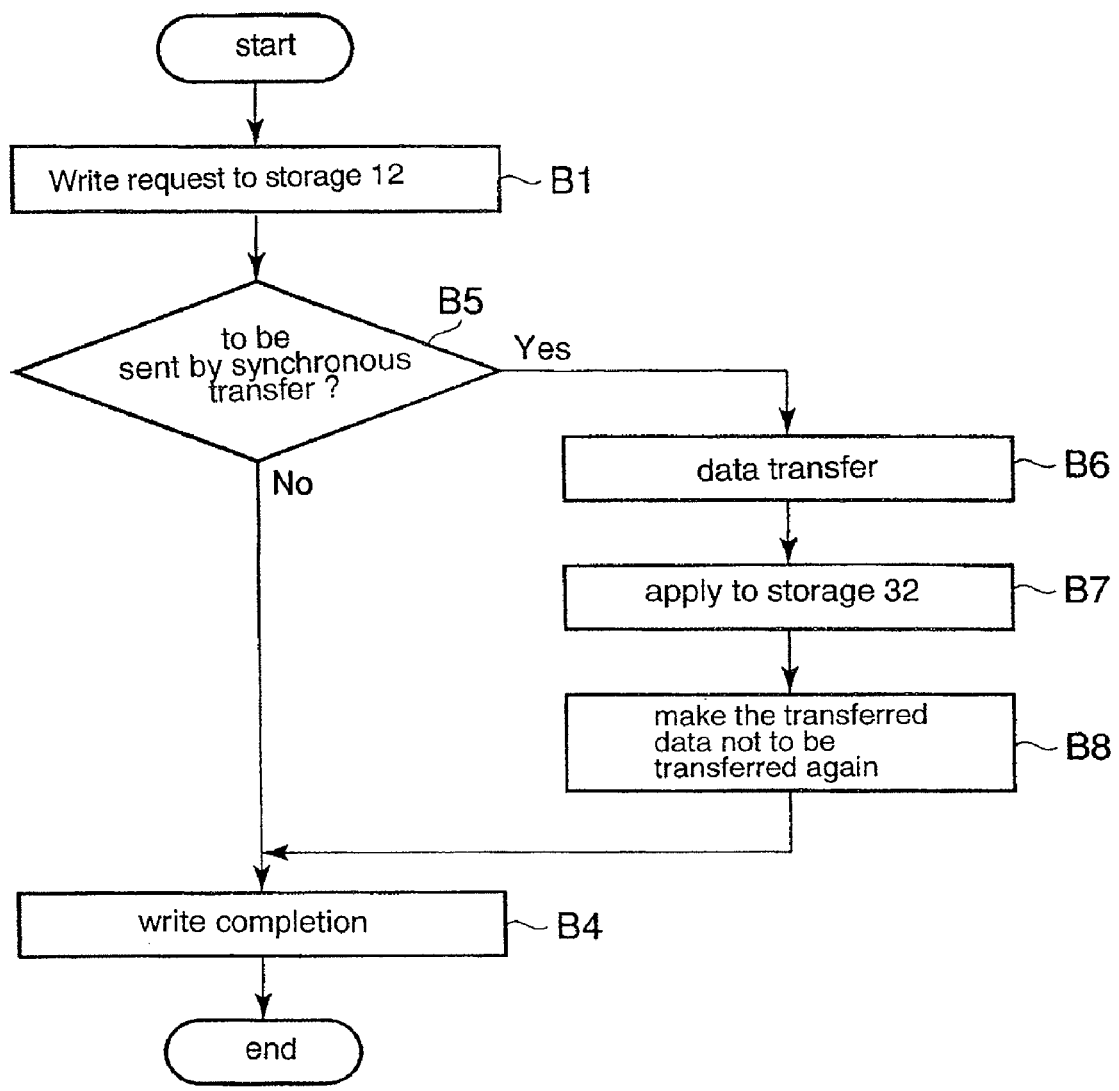
FIG. 58 is a flow chart for explaining the operation of the replication system in Modification 7 of the second embodiment.

FIG. 58 is a flow chart for explaining the operation of the replication system in Modification 7 of the second embodiment. Referring to FIG. 58, when a write request is first issued from server 11 to storage 12 (Step B1), storage 12 applies this write request to itself.

Data transfer unit 205 next determines by means of the policy settings of policy storage unit 206 whether the data type that is the target of the write request is to be sent by synchronous transfer (Step B5). If the target of the write request is not a data type for synchronous transfer, data transfer unit 205 does not perform synchronous transfer.

If the target of the write request is a data type for synchronous transfer, data transfer unit 205 transfers the data that have been written to standby-system site 3 (Step B6). In standby-system site 3, the data that have been transferred from normal-system site 1 are received and applied to storage 32 (Step B7). Next, in normal-system site 1, a process is carried out to place the data in storage 12 that have been applied to storage 32 of standby-system site 3 in a state such that these data will not later be transferred to standby-system site 3 again (Step B8).

When the determination of Step B5 finds that the data are not for synchronous transfer, or after the process of Step B8, storage 12 notifies server 11 that the write process has been completed (Step B4).

Figure 59:
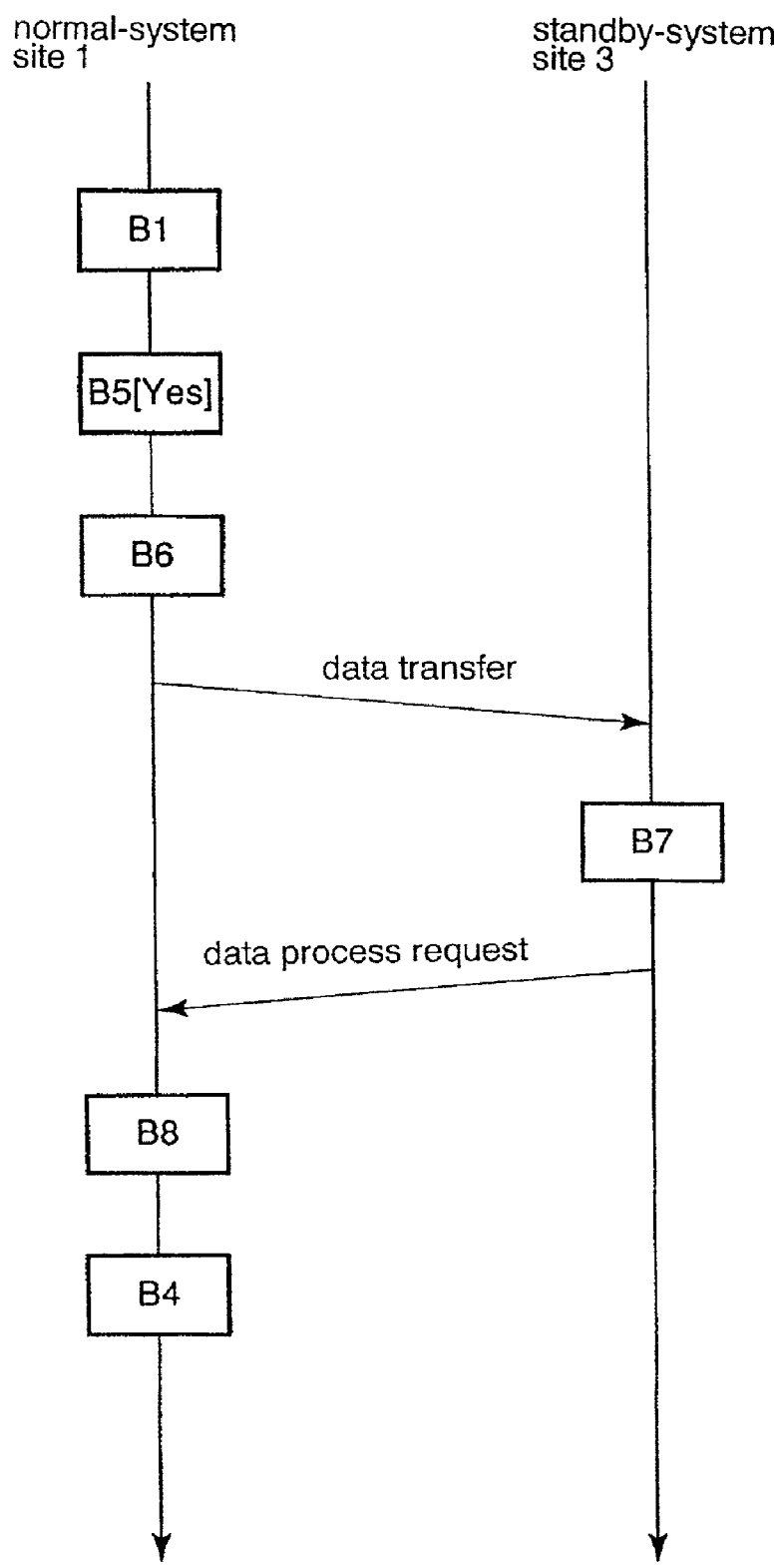
FIG. 59 is a sequence chart showing inter-device operations when the determination of Step B5 is "YES" in the operations that are shown in the flow chart of FIG. 58.

FIG. 59 is a sequence chart showing inter-device operations when the determination of Step B5 is "YES" in the operations shown in the flow chart of FIG. 58. Referring to FIG. 59, when a write request is generated to storage 12 in Step B1, normal-system site 1 determines whether data are to be sent by synchronous transfer in Step B5. In this case, "YES" is determined in Step B5, and normal-system site 1 therefore transfers the data to standby-system site 3.

Standby-system site 3, having received the data transfer, applies the data to itself in Step B7 and submits a request to normal-system site 1 to perform a process for placing the data in a "transfer completed" state. Normal-system site 1, having received this request, carries out the process in Step B8, and completes the write process in Step B4.

Figure 60:
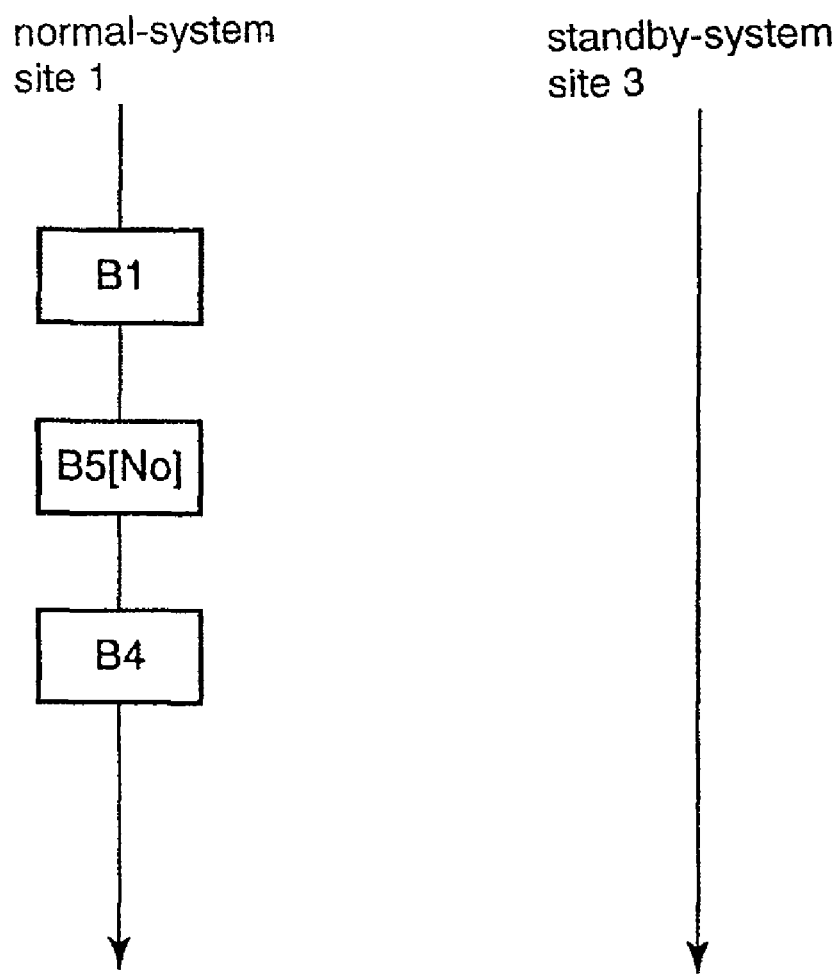
FIG. 60 is a sequence chart showing inter-device operations when the determination of Step B5 is "NO' in the operations that are shown by the flow chart of FIG. 58.

FIG. 60 is a sequence chart showing the inter-device operations when the determination of Step B5 is "NO" in the operations that are shown in the flow chart of FIG. 58. Referring to FIG. 60, "NO" is determined in Step B5, and normal-system site 1 therefore does not transfer the data to standby-system site 3 at that time, but rather, simply ends the write process at that point. The write data at this time will subsequently be sent to standby-system site 3 by asynchronous transfer, recreated in standby-system site 3, or not transferred to standby-system site 3.

Here, as an example of the classification of data, data 121 are data that can recreate other data of application 111 if these data are not lost. The other data 122 and 123 are data that can be recreated from data 121. As another example of classification of data, only data 121 may be updated, and data 122 and 123 may be data that are not updated. In these cases, setting only data 121 for synchronous transfer in the policy settings can prevent the loss of data.

As described in the foregoing explanation, when writing to normal-system site 1 according to the present modification, only the minimum necessary amount of data that cannot be recreated in standby-system site 3 are sent by synchronous transfer, whereby the load upon the network due to data transfer can be suppressed to the minimum, and further, the loss of data can be prevented when a disaster occurs at normal-system site 1 without lowering the write performance of data that can be sent by asynchronous transfer.

Modification 8 of the Second Embodiment

Although policy control unit 6A was configured in normal-system site 1 in Modifications 6 and 7, the present invention is not limited to this form. As an example of another configuration, in Modification 8, policy control unit 6A is configured in standby-system site 3, or in both normal-system site 1 and standby-system site 3. The operation of each of the parts in the present modification is the same as in Modifications 6 and 7.

According to the present modification, configuring policy control unit 6A inside standby-system site 3 enables a reduction of the time for detection of changes in the state of standby-system site 3, and further, facilitates the detection of details in the changes in state.

In addition, according to the present modification, policy control unit 6A is present in each of normal-system site 1 and standby-system site 3. Thus, even should a problem occur in either policy control unit 6A, changes in policy settings can be realized by the other policy control unit 6A and the operation of the system will be unaffected.

Modification 9 of the Second Embodiment

Modification 9 of the second embodiment is a case in which, in the policy settings, data are classified without fixing the classification of data types by the physical, virtual, or logical storage locations, the data being classified into data types that differ for each application or command that executes a program, process, or thread that generates a write request, or for each server or user that invoked the application or command. For example, even when the write request is for the same file, the data are treated as different data types according to the application, server, or user that generated the request. In addition, data types in which classification is realized by these factors may also be combined with classification realized according to storage location. As a specific example, in order to enable identification of data type when applying each request command, information such as the program, process, thread, application, server, or user may be embedded in the write request command to storage 12.

As described in the foregoing explanation, in the present modification, classifying a policy by the application, command, server, or user that generates a write request can, for example, raise the transfer priority of a write request that is submitted by a user having a high degree of importance even for write requests for data of the same region, and can reduce the possibility of losing data that have been written by a user having high degree of importance even when a large number of write requests are generated by other users.

According to the present modification, moreover, the process or thread of a write request of an application that issues a write request for temporarily retaining data and a write request of an application that issues a write request for absolute retention can be distinguished in the policy settings, and setting the transfer priority such that the transfer of the write request for absolute retention can be prioritized to reduce the possibility of losing data that are to be retained over a long term.

Further, when determining a policy such as the transfer priority according to the present modification, the policy can be determined based on the importance of the application or the user, and because there is no need for fixing the retention location, the freedom for storing data can be improved.

Modification 10 of the Second Embodiment

Modification 10 of the second embodiment is a form in which the data type is classified according to the block address, and moreover, in which, when there is a read request to storage 12 of normal-system site 1, policy control unit 6A raises the transfer priority of blocks in the vicinity of the target block.

A read request to a particular block address raises the probability of subsequent read requests for blocks in the vicinity of this address. In such a case, giving priority to the transfer of these blocks can shorten the average process time for read requests in standby-system site 3. In addition, data that have been read in normal-system site 1 are frequently the target of read requests by standby-system site 3 in a resumption process, and giving priority to the transfer of these blocks can therefore shorten the average processing time of a resumption process in standby-system site 3.

In addition, transfer priority is set according to block address in the present modification, and storage 12 is therefore able to classify data into data types when storing data without obtaining information of the host layer (such as the file system or process).

While preferred embodiments of the present invention have been described using specific terms, such description is for illustrative purposes only, and it is to be understood that changes and variations may be made without departing from the spirit or scope of the following claims.

What is claimed is:

1. A replication system for replicating data between sites, comprising:
   a first site for providing system functions that accompany writing or reading of data;
   a second site:
      that receives update information of said first site and that retains a replica of data of said first site by applying this update information to itself;
      that can receive a write request command or a read request command for providing at least a portion of said system functions in place of said first site or as assistance to said first site even when all update information of said first site has not been applied; and
      when executing said command, that acquires the necessary update information if the most recent data that are the target of this command have not yet been retained, and then executes said command; and
      when executing said command, that executes said command without acquiring the update information if said most recent data that are the target of this command have already been retained; and
   a transfer device having the functions of receiving said update information from said first site, causing completion of processing for replication in said first site, and continuously executing processes for successively transferring said update information to said second site;
   wherein if said second site, when executing said command, still has not retained said most recent data that are the target of the command, and moreover, if the command is the write request command, said second site executes said command without acquiring from said transfer device the most recent data that are the target of said command, and after executing said command, does not apply to itself update information of the data that are the target of said command even if the update information are transferred in.

2. A replication system for replicating data between sites, comprising:
   a first site for providing system functions that accompany writing or reading of data;
   a second site:
      that receives update information of said first site and that retains a replica of data of said first site by applying this update information to itself;
      that can receive a write request command or a read request command for providing at least a portion of said system functions in place of said first site or as assistance to said first site even when all update information of said first site has not been applied; and
      when executing said command, that acquires the necessary update information if the most recent data that are the target of this command have not yet been retained, and then executes said command; and
      when executing said command, that executes said command without acquiring the update information if said most recent data that are the target of this command have already been retained; and
   a transfer device having the functions of receiving said update information from said first site, causing completion of processing for replication in said first site, and continuously executing processes for successively transferring said update information to said second site;
   wherein if said second site, when executing said command, still has not retained said most recent data that are the target of the command, and moreover, if the command is the write request command, said second site executes said command without acquiring from said transfer device the most recent data that are the target of said command, and instructs said transfer device not to transfer the update information of the data that are the target of said command.

3. The replication system of claim 1, wherein said second site determines whether said command is said write request command or said read request command,
   wherein if said second site, when executing said command, still has not retained said most recent data that are the target of the command, and moreover, if said second site determines that the command is the write request command, said second site executes said command without acquiring from said transfer device the most recent data that are the target of said command, and after executing said command, does not apply to itself update information of the data that are the target of said command even if the update information are transferred in, and
   wherein if said second site, when executing said command, still has not retained said most recent data that are the target of the command, and moreover, if said second site determines that the command is the read request command, said second site transmits an immediate transfer request to said transfer device to immediately transfer the update information to said second site.

4. The replication system of claim 2, wherein said second site determines whether said command is said write request command or said read request command,
   wherein if said second site, when executing said command, still has not retained said most recent data that are the target of the command, and moreover, if said second site determines that the command is the write request command, said second site executes said command without acquiring from said transfer device the most recent data that are the target of said command, and instructs said transfer device not to transfer the update information of the data that are the target of said command, and
   wherein if said second site, when executing said command, still has not retained said most recent data that are the target of the command, and moreover, if said second site determines that the command is the read request command, said second site transmits an immediate transfer request to said transfer device to immediately transfer the update information to said second site.

* * * * *